United States Patent
Abed et al.

(10) Patent No.: US 12,234,157 B2
(45) Date of Patent: Feb. 25, 2025

(54) ELECTROCATALYSTS COMPRISING TRANSITION METALS AND CHALCOGEN FOR OXYGEN EVOLUTION REACTIONS (OER) AND MANUFACTURING THEREOF

(71) Applicants: THE GOVERNING COUNCIL OF THE UNIVERSITY OF TORONTO, Toronto (CA); TOTALENERGIES ONETECH, Courbevoie (FR)

(72) Inventors: Jehad Abed, Toronto (CA); Steven Thorpe, Picton (CA); Edward Sargent, Toronto (CA)

(73) Assignees: THE GOVERNING COUNCIL OF THE UNIVERSITY OF TORONTO, Toronto (CA); TOTALENERGIES ONETECH, Courbevoie (FR)

( * ) Notice: Subject to any disclaimer, the term of this patent is extended or adjusted under 35 U.S.C. 154(b) by 973 days.

(21) Appl. No.: 17/109,948

(22) Filed: Dec. 2, 2020

(65) Prior Publication Data
US 2021/0162392 A1    Jun. 3, 2021

Related U.S. Application Data

(60) Provisional application No. 63/116,486, filed on Nov. 20, 2020, provisional application No. 62/943,037, filed on Dec. 3, 2019.

(51) Int. Cl.
| | |
|---|---|
| *C01G 53/00* | (2006.01) |
| *B82Y 40/00* | (2011.01) |
| *C01B 19/00* | (2006.01) |
| *C25B 1/04* | (2021.01) |
| *C25B 3/26* | (2021.01) |
| *C25B 11/091* | (2021.01) |
| *H01M 4/90* | (2006.01) |

(52) U.S. Cl.
CPC .............. *C01G 53/00* (2013.01); *B82Y 40/00* (2013.01); *C01B 19/002* (2013.01); *C25B 1/04* (2013.01); *C25B 3/26* (2021.01); *C25B 11/091* (2021.01); *H01M 4/9041* (2013.01)

(58) Field of Classification Search
None
See application file for complete search history.

(56) References Cited

U.S. PATENT DOCUMENTS

2004/0178530 A1* 9/2004 Yadav ...................... B01J 19/24
264/5

OTHER PUBLICATIONS

Balaz et al.; Chalcogenide Mechanochemistry in Materials Science: Insight into Synthesis and Applications; J Mater Sci; 52, 11851-11890; 2017.*

(Continued)

*Primary Examiner* — Guinever S Gregorio
(74) *Attorney, Agent, or Firm* — MEDLER FERRO WOODHOUSE & MILLS PLLC

(57) ABSTRACT

The present description relates to metal alloy electrocatalysts, preferably composed of Ni and Co as transition metals and Se as a chalcogen. The electrocatalysts can take the form of nanochalcogenides that can be made using cryogenic milling followed by surfactant-assistant milling. The electrocatalysts can be used in the context of water electrolysis or electroreduction of $CO_2$ gas into carbon based products.

22 Claims, 44 Drawing Sheets

(56) References Cited

OTHER PUBLICATIONS

K. M. Cole, D. W. Kirk and S. J. Thorpe, In Situ Raman Study of Amorphous and Crystalline Ni—Co Alloys for the Alkaline Oxygen Evolution Reaction, J. Electrochem. Soc., 2018, 165, J3122-J3129.
S. Ghobrial, D. W. Kirk and S. J. Thorpe, Solid state amorphization in the Ni—Nb—Y system by mechanical alloying, Journal of Non-Crystalline Solids, 2018, 502, 1-8.
S. Ghobrial, D. W. Kirk and S. J. Thorpe, Amorphous Ni—Nb—Y Alloys as Hydrogen Evolution Electrocatalysts, Electrocatalysis, 2019, 10, 243-252.
J. Abed, et al., Cryomilled Ni—Co—Se Enables Water Oxidation Electrocatalysts Durable at High Current Densities, Sep. 2020.
J. Abed et al., "Promoting Oxygen Evolution Reaction Through the Incorporation of V and Se in Amorphous Nickle-Cobalt Based Electrocatalysts", MRS Fall Meeting 2019 (Oral presentation).

\* cited by examiner

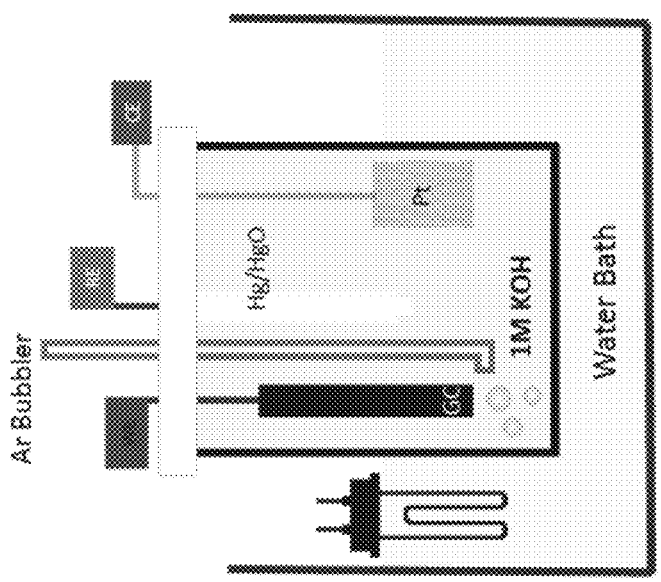
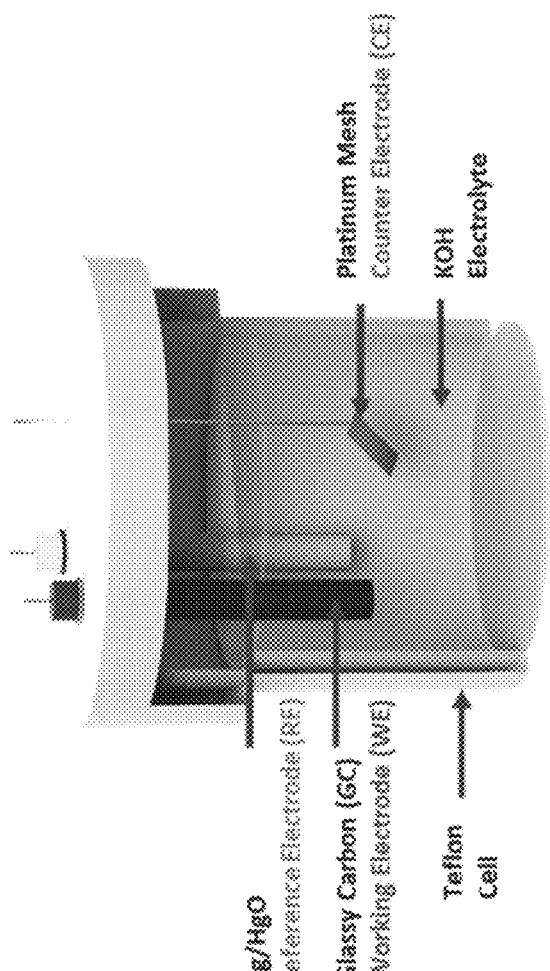
FIG. 2

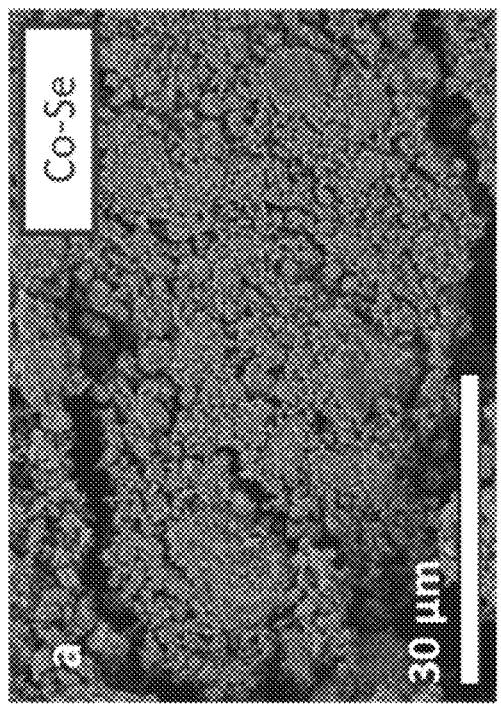
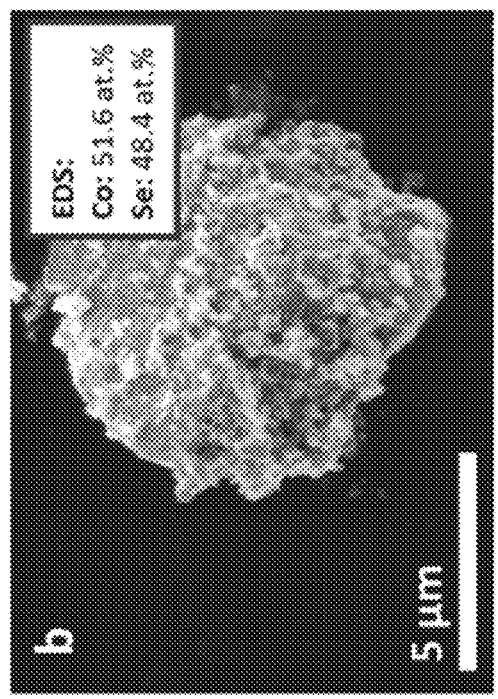
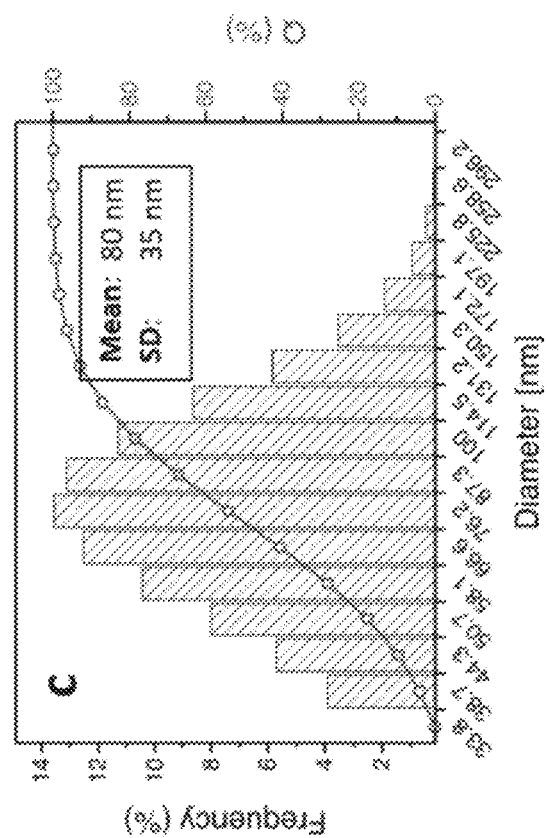
FIG. 6

Oxygen Evolution Reaction (OER)

- Key role in energy conversion devices and biological systems ($CO_2RR$, water electrolysis, photosynthesis)
- The anodic half-cell reaction is complex
  - The number of proposed reaction pathways are numerous
  - Electrochemical reactions are limited by the slow kinetics of OER at the anode
- Oxygen is produced either from water at low pH or from hydroxyl anions at high pH.

$2OH^- \rightarrow 1/2 O_2 + H_2O + 2e^-$  Basic OER $H_2O \rightarrow 1/2 O_2 + 2e^- + 2H^+$  Acidic OER

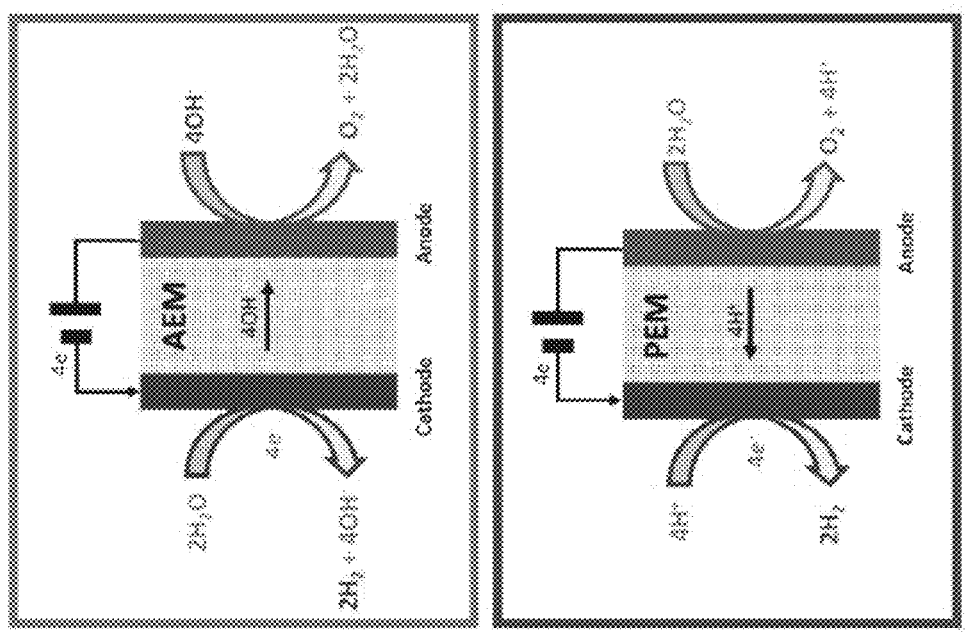

FIG. 23

Catalyst Design
Using Chalcogenides as OER pre-catalysts

1. Se enables the early transformation of oxy-hydroxides in transition metals such as NiOOH, CoOOH, FeOOH, etc.
2. Replacing O in transition metal oxides with Se improves the conductivity: Se can be semi-metallic.
3. Se can be used as a template to develop catalysts with poor crystallinity. Structures with defects has a high number of unsaturated sites and are more hydrous and chemically stable.
4. Having multi-metal alloys with at least two metals favors disordering. More defective sites.

> Milling Se with at least two active transition metals such as Ni and Co could produce catalysts with all the 4 features.

Catalyst Design
Milling

- High melting point intermetallic compositions have a higher tendency to amorphize during milling:

$Ni_{1-x}Se_x$   $50<x<60$ at%
  $Co_{1-x}Se_x$   $50<x<60$ at%

- Substituting more Co in Ni is beneficial for metallic glass formation: Co alloys have higher crystallization temperature.

> $M_{1-x}Se_x \rightarrow Co^{3+}\,Ni^{3+}$
> Where M can be any combination of Ni and Co

FIG. 28

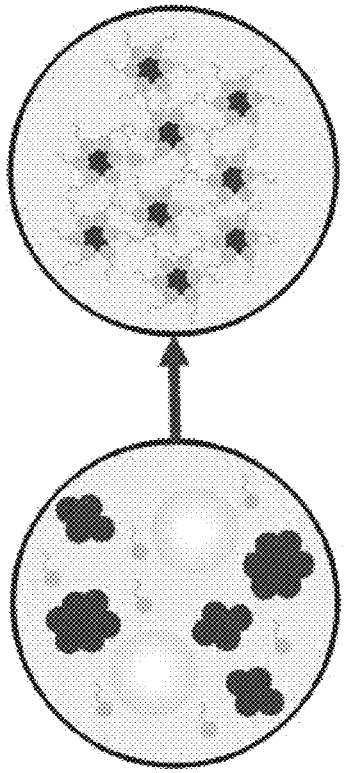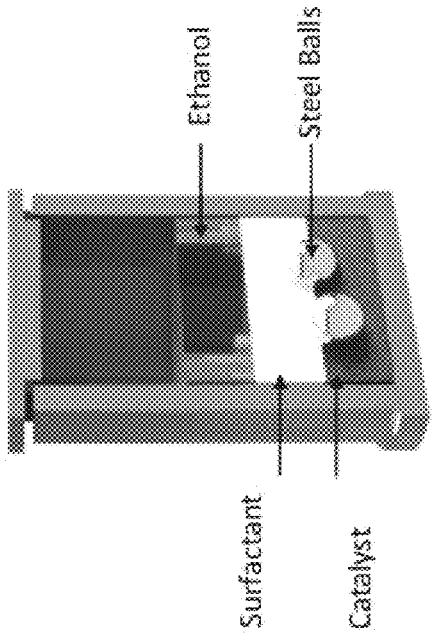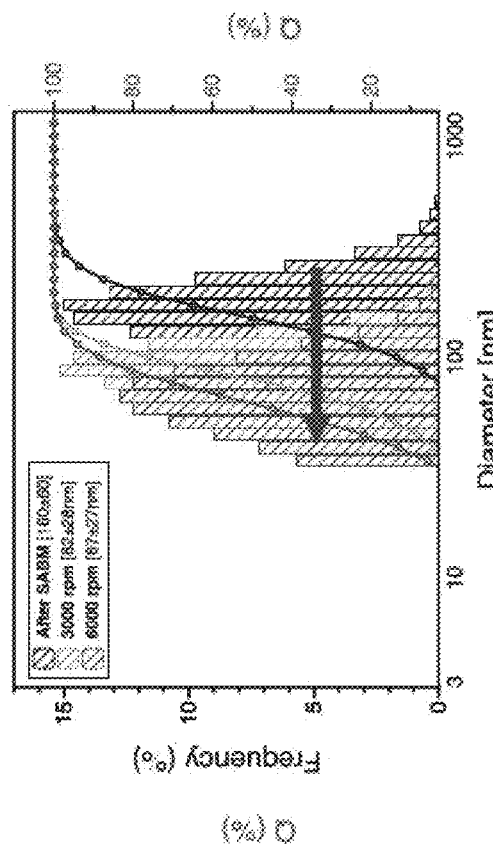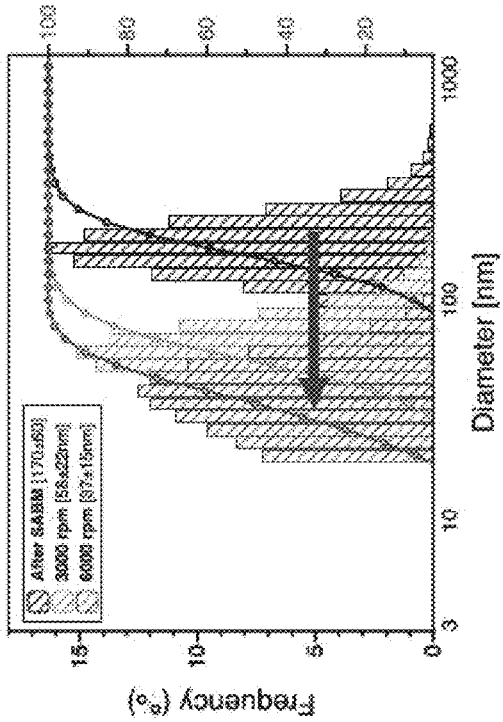
FIG. 31

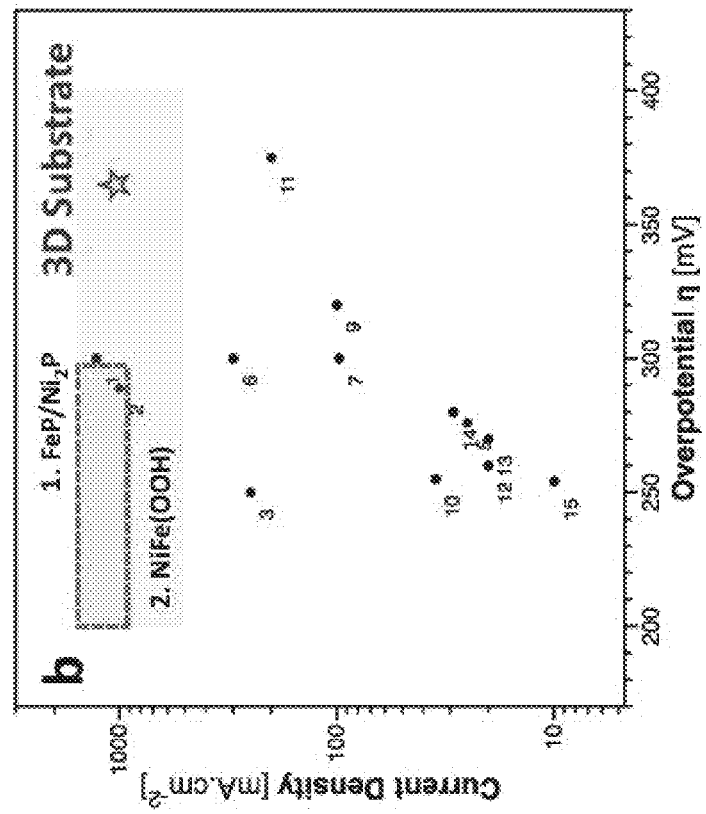
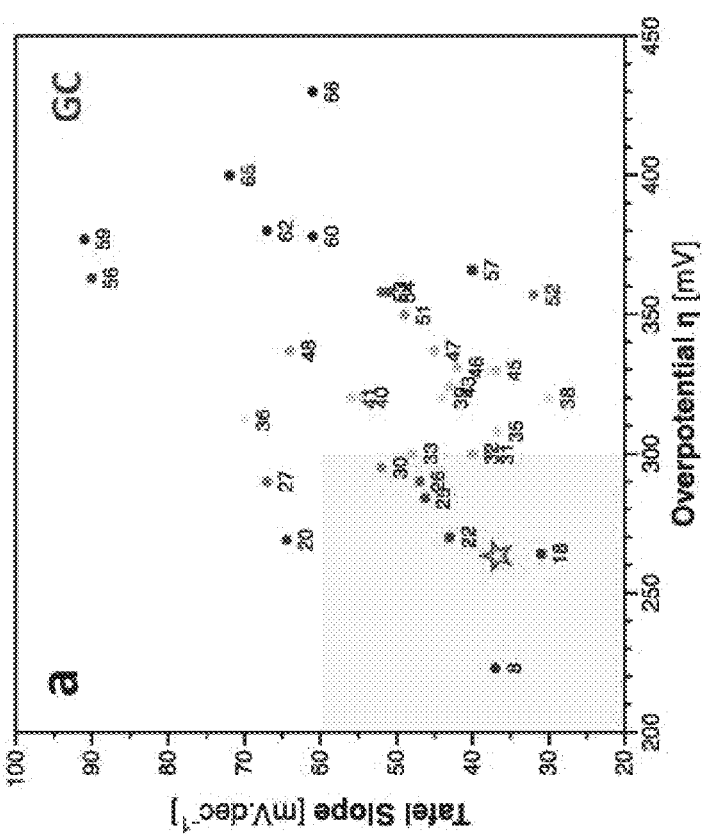
FIG. 34
Comparison of the performance of this work and other best performing alkaline OER catalysts in literature.
a) Catalysts are deposited on glassy carbon (GC) and the overpotentials are noted at 10 mA.cm$^{-2}$
b) Catalysts are deposited on 3D substrates (i.e. NF, Graphite, ...etc.).
The result from this work is marked by a star shape on the figures

ELECTROCATALYSTS COMPRISING TRANSITION METALS AND CHALCOGEN FOR OXYGEN EVOLUTION REACTIONS (OER) AND MANUFACTURING THEREOF

CROSS-REFERENCE TO RELATED APPLICATIONS

The present application claims priority to U.S. provisional application No. 63/116,486 filed on Nov. 20, 2020, and U.S. provisional application No. 62/943,037 filed on Dec. 3, 2019, which are incorporated herein in their entirety.

TECHNICAL FIELD

The technical field generally relates to electrocatalysts as well as their production and use in processes such as the electrocatalytic splitting of water and carbon dioxide reduction to hydrocarbons. In particular, the technical field relates to the use of a two-step milling process to produce electrocatalysts that can include transition metals and a chalcogenide and be useful for anodic oxygen evolution reaction (OER).

BACKGROUND

Stable and affordable electrocatalysts are needed to accelerate the transition from conventional fossil fuels to sustainable energy resources such as hydrogen derived from renewable energy sources such as solar and wind. Over the last two decades, the electrocatalytic splitting of water, and carbon dioxide reduction to hydrocarbons have received great attention, however approximately 90% of the electricity input is consumed in the anodic oxygen evolution reaction (OER) due to poor reaction kinetics. Precious metal-based catalysts (Pt, Ir, Ru) are commonly used as OER catalysts, but prove uneconomic for large scale industrial deployment. There are indeed various challenges to producing and using OER catalysts.

SUMMARY

Various implementations, features and aspects of the technology are described herein, including in the claims.

In some implementations, there is provided a process for producing a nanochalcogenide for use in electrocatalysis, comprising: subjecting at least two transition metals and at least one chalcogen to cryogenic milling to produce an alloyed chalcogenide material; subjecting the alloyed chalcogenide material to surfactant-assisted milling to produce a slurry comprising a nanochalcogenide; and separating the nanochalcogenide from the slurry.

In some implementations, the cryogenic milling comprises cryogenic ball milling. In some implementations, the cryogenic milling is performed in the presence of a continuous flow of an inert gas. The inert gas can include nitrogen. The cryogenic milling can include linear vibrational milling, and the linear vibrational milling can be performed at speeds of 25 Hz to 35 Hz. The cryogenic ball milling can also be performed at a ball-to-powder ratio (BPR) of 8:1 to 12:1 on a mass basis, and/or for at least 5 hours or at least 6 h. The at least two transition metals and at least one chalcogen can be provided as powders to the cryogenic milling. The cryogenic milling can be performed in multiple cycles with cooling stages performed between cycles. In some implementations, the alloyed chalcogenide material produced by cryogenic milling comprises particles having an average size above 700 nm, about 1000 nm, above 1500 nm, about 2000 nm, above 3000 nm, or above 4000 nm; or having an average size between about 500 nm and about 1500 nm or between about 3000 nm and about 5000 nm, measured using DLS or SEM. The alloyed chalcogenide material produced by cryogenic milling can include $M^1M^2E$ and/or $(M^1M^2)_3E_4$, wherein $M^1$ is a first transition metal, $M^2$ is a second transition metal and E is a chalcogen, optionally as a single phase.

In some implementations, the surfactant-assisted milling comprises surfactant-assisted ball milling. The surfactant-assisted milling is performed in the presence of at least one surfactant and a solvent. The solvent can include an alcohol, such as ethanol. In some implementations, the least one surfactant comprises diphenylphosphoryl acid (DPPA), or oleic acid, or CTAB surfactant. The least one surfactant can be present in an amount of 1:3 to 1:5 surfactant-to-powder ratio on a mass basis with respect to the mass of the alloyed chalcogenide material. The surfactant-assisted milling can also be performed at a ball-to-powder ratio (BPR) of 30:1 to 70:1, or 40:1 to 50:1 on a mass basis. The surfactant-assisted milling can further be performed cyclically with milling cycles and rest cycles. The surfactant-assisted milling can be performed for at least 8 hours or at least 10 hours. The surfactant-assisted milling can be performed to produce the nanochalcogenide in the form of chalcogenide nanoparticles. The surfactant-assisted milling produces the slurry comprising the chalcogenide nanoparticles and a milling liquid, and the separating of the slurry to remove at least a portion of the chalcogenide nanoparticles from the liquid can include a single stage or a multiple stage separation. The separating can include centrifuging, which can include a first centrifuging stage to remove larger particles followed by a second centrifuging stage to remove at least a portion of the chalcogenide nanoparticles. The process can also include sonicating the slurry prior to the separating. The chalcogenide nanoparticles separated by centrifuging can have an average size smaller than 100 nm, smaller than 80 nm, smaller than 50 nm or smaller than 30 nm, measured using DLS or SEM. The process can include drying the chalcogenide nanoparticles separated from the slurry.

In some implementations, the at least two transition metals are selected from Ni, Co, and Fe. The at least two transition metals can be two transition metals. One of the at least two transition metals can be Ni. One of the at least two transition metals can be Co. The transition metals can comprise or be Ni and Co. The concentration of the transition metals can be 1:1 with respect to each other.

In some implementations, the at least one chalcogen is selected from S, Se and Te. The at least one chalcogen can be a single chalcogenide. The at least one chalcogenide can also be provided in a concentration stoichiometrically to produce $M^1M^2E$ and/or $(M^1M^2)_3E_4$, wherein $M^1$ is a first transition metal, $M^2$ is a second transition metal and E is the at least one chalcogen.

In some implementations, the cryogenic milling is performed to mix the at least two transition metals and the chalcogen homogenously and/or such that the at least two transition metals and chalcogen are a single phase and display no single element phase segregation or enrichment, based on XRD or electron microscope. In some implementations, the cryogenic milling is performed to produce the alloyed chalcogenide material having an amorphous structure and/or having a nanocrystalline structure with crystallite size below 2 nm, measured using DLS or SEM.

In some implementations, there is provided a process for producing an activated electrocatalyst, comprising activating a nanochalcogenide that comprises at least two transition metals and at least one chalcogen, wherein the activating comprises removing at least a portion of the at least one chalcogen from the nanochalcogenide to produce the activated electrocatalyst.

The nanochalcogenide can be produced by the process as defined above or herein. The activating can include electrochemically activating the allow nanomaterial. The activating can include selectively etching the at least one chalcogen out of the nanochalcogenide. The activating can include leaching the at least one chalcogen out of the nanochalcogenide. The activating can include transforming the at least two transitional metals into active oxyhydroxides thereof.

In some implementations, the process includes, prior to activating: preparing an ink comprising the nanochalcogenide; and depositing the ink onto a substrate; wherein the substrate is then subjected to electrochemical activation. The electrochemical activation can be performed in an electrochemical cell in an Fe-free electrolyte, preferably KOH and preferably at constant current density, until removal of the chalcogen is achieved. The current density can be about 8 to 12 $mA \cdot cm_{geo}^{-2}$ and the activation time can be about 1 to 3 hours. The substrate can include a carbon-based substrate.

In some implementations, there is provided a process for producing an activated electrocatalyst, comprising: subjecting at least two transition metals and at least one chalcogen to cryogenic milling to produce an alloyed chalcogenide material; subjecting the alloyed chalcogenide material to surfactant-assisted milling to produce a slurry comprising a nanochalcogenide; separating the nanochalcogenide from the slurry; and removing chalcogen from the nanochalcogenide to produce the activated electrocatalyst comprising oxyhydroxides of the at least two transition metals. Such a process can include one or more additional features as defined above or herein.

In some implementations, there is provided an electrocatalyst comprising at least two transition metals and at least one chalcogen that are atomically dispersed and has the form of chalcogenide nanoparticles, optionally having an average particle size less than 100 nm, measured using DLS or SEM.

In some implementations, the electrocatalyst includes $M^1M^2E$ and/or $(M^1M^2)_3E_4$, wherein $M^1$ is a first transition metal, $M^2$ is a second transition metal and E is a chalcogen. The nanoparticles can have an average particle size smaller than 80 nm, smaller than 50 nm or smaller than 30 nm, measured using DLS or SEM. The at least two transition metals can be selected from Ni, Co, and Fe. The at least two transition metals can be two transition metals. One of the at least two transition metals can be Ni. One of the at least two transition metals can be Co. The transition metals can comprise or be Ni and Co. The concentration of the transition metals can be about 1:1 with respect to each other. The at least one chalcogen can be selected from S, Se and Te. The at least one chalcogen can be a single chalcogenide. The at least two transition metals and the at least one chalcogen can be homogenous in the electrocatalyst. The electrocatalyst can have an amorphous structure and/or a nanocrystalline structure with crystallite size below 2 nm, measured using DLS or SEM.

In some implementations, there is provided an activated electrocatalyst comprising nanosized oxyhydroxides comprising at least two transition metals and being in the form of chalcogen-depleted alloyed nanoparticles having an average particle size less than 100 nm, measured using DLS or SEM.

In some implementations, the nanoparticles have an average particle size smaller than 80 nm, smaller than 50 nm or smaller than 30 nm, measured using DLS or SEM; he at least two transition metals are selected from Ni, Co, and Fe; the at least two transition metals are two transition metals; one of the at least two transition metals is Ni; one of the at least two transition metals is Co; the transition metals are Ni and Co, and the nanosized oxyhydroxides comprise a mixture of Ni/CoOOH phases; the concentration of the transition metals is about 1:1 with respect to each other; the alloyed chalcogen-depleted nanoparticles are formed by removal of at least one chalcogen by leaching or etching; the electrocatalyst has an amorphous structure and/or has a nanocrystalline structure with crystallite size below 2 nm, measured using DLS or SEM; the activated electrocatalyst comprises coordinately unsaturated sites (CUS) formed by removal of the chalcogen therefrom; and/or the CUS are formed by removal of Se.

In some implementations, there is provided a se of the electrocatalyst as defined herein for an Oxygen Evolution Reaction (OER), in a process for electrocatalytic splitting of water to produce hydrogen, or in an anode electrode in a process for electroreduction of a carbon-containing gas to produce a carbon based product. The carbon-containing gas can include $CO_2$.

In some implementations, there is provided a method for electrolyzing water, comprising: contacting water with an anode and a cathode, wherein the anode comprises an electrocatalyst as define herein or as manufactured by a process as defined herein; and applying a voltage to provide a current density to cause the water to be electrochemically split to form oxygen and hydrogen.

In some implementations, there is provided a method for electrochemical production of a multi-carbon compound from a carbon-containing gas, comprising: contacting the carbon-containing gas and an electrolyte with a cathode comprising a copper containing electroreduction catalyst; contacting the electrolyte with an anode comprises the electrocatayst as defined herein or as manufactured by the process as defined herein; applying a voltage to provide a current density to cause the carbon-containing gas contacting the cathode to be electrochemically converted into the multi-carbon compound, and to cause an oxygen evolution reaction at the anode; and recovering the multi-carbon compound.

In some implementations, the multi-carbon compound comprises an alcohol or a method; the electrolyte comprises an alkaline compound; the electrolyte comprises KOH and/or other alkaline solutions; the carbon-containing gas comprises or is CO; and/or the carbon-containing gas comprises or is $CO_2$. In some implementations, the method includes one or more operating features or conditions and/or is performed using equipment having one or more features, as described or illustrated or claimed herein, and/or within plus or minus 10% of any operating condition values described herein.

In some implementations, there is provided a system for CO and/or $CO_2$ electroreduction to produce a multi-carbon compound, comprising: an electrolytic cell configured to receive a liquid electrolyte and CO and/or $CO_2$ gas; an anode the electrocatalyst as defined herein or as manufactured by the process as defined herein; a cathode comprising a copper containing electroreduction catalyst; and a voltage source to provide a current density to cause the CO and/or $CO_2$ gas contacting the cathode to be electrochemically converted into the multi-carbon compound and to cause an oxygen evolution reaction at the anode. The system can also include one or more operating features, elements, or conditions and/or includes equipment or features thereof having one or more features, as described or illustrated or claimed herein.

In some implementations, there is provided a water electrolyzer, comprising: an electrolytic cell configured to receive water; an anode the electrocatalyst as defined herein or as manufactured by the process as defined hereinin; a cathode; and a voltage source to provide a current density to cause the water to be electrochemically split to form oxygen and hydrogen at the anode and cathode respectively. The water electrolyzer can include one or more operating features, elements, or conditions and/or includes equipment or features thereof having one or more features, as described or illustrated or claimed herein.

In some implementations, there is provided a process for producing a nanochalcogenide for use in electrocatalysis, comprising: subjecting at least two transition metals and at least one chalcogen to a first milling stage to produce an alloyed chalcogenide material having an average particle size above 1 micrometer and a disordered structure including amorphous and nanocrystalline structures; subjecting the alloyed chalcogenide material to a second milling stage to produce a slurry comprising nanochalcogenides having a particle size below 100 nm; and separating the nanochalcogenides from the slurry. The first milling stage can be a cryogenic milling stage and/or can have features or result in properties of the example cryogenic milling stage as described herein. The second milling stage can be a surfactant-assisted milling stage and/or can have features or result in properties of the example surfactant-assisted milling stage as described herein. The first and second milling stages could also be other types of milling.

DESCRIPTION OF DRAWINGS

FIG. 2: Illustration of a) the actual cell used for electrochemical testing b) cross sectional schematic of the cell in water bath and with Argon bubbler.

FIG. 6: structural assessment of CoSe after 15 hours of milling a) SEM of catalyst powder on carbon tape b) isolated cluster of particles, inset is the composition of the catalyst using EDS c) particle size distribution of the catalyst suspended in ethanol as obtained from DLS.

FIGS. 22 to 43 show various aspects and information regarding the technology.

DETAILED DESCRIPTION

Figure 1:
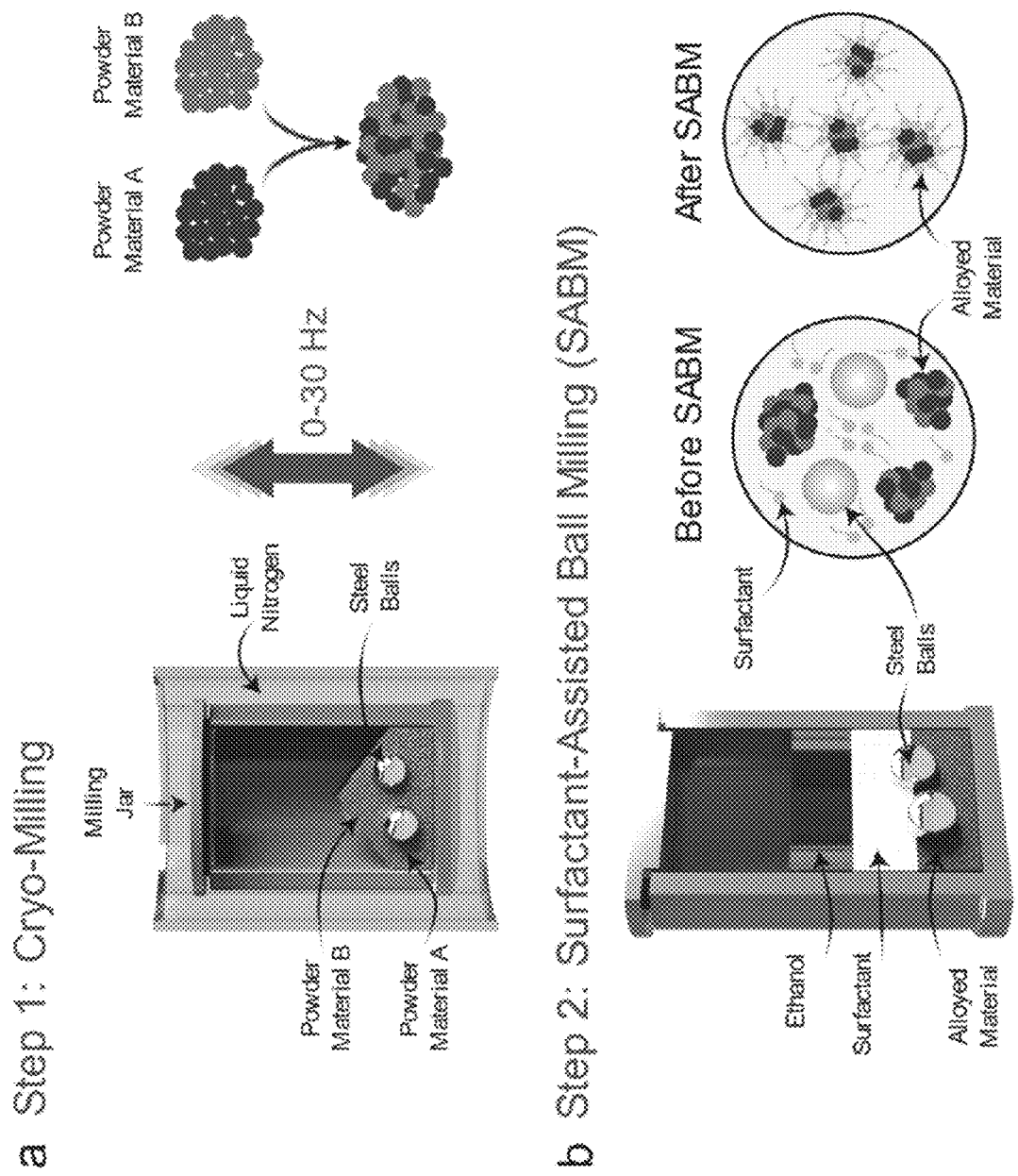
FIG. 1: Illustration of a) step 1: cryo-milling b) step 2: surfactant-assisted ball milling at room temperature.

The present description relates to the production of an electrocatalyst materials. In some implementations, a nanochalcogenide is produced using a two-step process of subjecting at least two transition metals and at least one chalcogenide to cryogenic milling to produce an alloyed chalcogenide material, and then subjecting the alloyed chalcogenide material to surfactant-assisted milling to produce the nanochalcogenide that is part of a slurry. The transition metals can be Ni, Co or Fe, for example, and the chalcogen can be Se or others such as S or Te. The nanochalcogenide can include (NiCo)Se and $(NiCo)_3Se_4$, for example. The nanochalcogenide can then be separated from the slurry as nanoparticles, via centrifugation for example. The separated nanoparticles can then be activated by leaching out the chalcogen and forming oxyhydroxides of the transition metals, thus forming an electrocatalyst material. The electrocatayst material can be disposed on a substrate and used as part of the anode in an electrolysis cell for processes such as water splitting or $CO_2$ electroreduction or other applications of oxygen evolution reactions (OER) in various electrocatalytic applications.

One application of the present disclosure is to employ a controlled ball milling process to facilitate cost-effective electrochemical conversion of water, air, CO and $CO_2$ to fuels and chemicals. Embodiments of the present disclosure include a process that includes two-stage milling and low-cost mass production of highly active and stable nanocatalysts that include a chalcogenide and at least two transition metals, such that the produced catalyst particles are smaller than 100 nm and all elements are atomically dispersed. The two-step milling process can use cryogenic ball milling to mix the elements homogenously at cryogenic temperatures aided by continuous flow of liquid nitrogen around the mixing vessel during linear vibrational milling, for example, while surfactant-assisted ball milling can use surfactant and a wet medium for further size reduction to produce electrocatalyst nanoparticles. The duration and speed of milling, and ball to powder weight and volume ratios, can be varied to control particle size, crystal structure, powder yield and particle morphology. Consequently, amorphous, nanocrytalline, or mixed-structure multi-metal compounds (including oxides, hydroxides and mixed oxide-hydroxides) can be formed electrochemically by cycling the material or during electrochemical reaction, with the chalcogen leaving the initial chalcogenide structure.

It was found that the use of the chalcogen, such as Se, facilitated the yield of nanoparticles produced by ball milling. Embodiments of the nanochalcogenides exhibited enhanced intrinsic activity when compared to other crystal structures on glassy carbon, with for example 400 hours of stability at 10 $mA \cdot cm^{-2}$ on carbon paper and 600 hours of stability at 100, 500, and 1000 $mA \cdot cm^{-2}$ on nickel foam.

The nanochalcogenides can be viewed as pre-catalysts as they can be activated to remove the chalcogen and form oxyhydroxides of the transition metals, e.g., Ni and Co. Activation can be done by leaching or etching of the chalcogen from a deposited layer of the nanochalcogenides on a substrate. The activated catalyst can be in the form of chalcogen-depleted alloyed nanoparticles. It is noted that "chalcogen-depleted" with reference to an activated catalyst as described herein refers to a material where some and preferably most of the chalcogens have been removed from a chalcogenide alloy. Example methods for manufacturing the chalcogenide and for removing the chalcogen to form an activated catalyst are described herein. It is also noted that the chalcogen-depleted activated catalyst has minor or trace amounts of chalcogen atoms remaining in the material; and residual chalcogens in the material can be at levels to contribute to both the mechanical integrity as well as activity characteristics of the catalyst.

The electrocatalysts and pre-catalysts described herein have applicability in various OER catalyst implementations, and possibly catalyst implementations as well.

Developing Earth-abundant and stable Ni—Co—Se electrocatalysts for Oxygen Evolution at high current densities is of interest for various applications. In this work, a two-step novel milling process was used to produce Ni,Co-based amorphous nano-electrocatalysts. Cryo-milling (mechanical milling of precursors at cryogenic temperatures to achieve alloying) followed by surfactant-assisted ball milling (SABM for particle size reduction) created stable amorphous alloys with high surface areas and coordinatively unsaturated active sites for the reaction of OER intermediates.

Two different Ni—Co—Se alloys were milled under various conditions and the structural evolution of the system was monitored using x-ray diffraction (XRD) and electron microscopy. The results confirmed the production of two fully alloyed ternary systems $(NiCo)_3Se_4$ and (NiCo)Se after 6 hours of milling time. The electrocatalytic activity and stability of the catalysts were evaluated by Tafel measurements obtained from linear sweep voltammetry (LSV) and cyclic voltammetry (CV) experiments. It was found that Se in NiCo-based alloys stabilized the amorphous structure by forming non-transitional clusters and significantly facilitated the production of nanoparticles. On flat glassy carbon electrode at 10 $mA \cdot cm^{-2}$, this catalyst has demonstrated stable performance at 268 mV overpotential with a Tafel slope of 42 $mV.dec^{-1}$ for at least 500 hours. Moreover, the performance of the catalyst at higher current densities on NF was stable for 100 hours while delivering 500 $mA \cdot cm^{-2}$ at 320 mV of overpotential. Operando X-ray Absorption Spectroscopy (XAS) was conducted to reveal the role of adding Se on the chemical-structural transformation and bonding environment of surface species during the OER reaction. This work suggests that milling can potentially be used to produce OER catalysts for industrial applications.

In addition, using a material such as $(NiCo)_3Se_4$ as an OER electrocatalyst and anion exchange membrane, the lowest cell voltage for alkaline water splitting delivering 2 $A \cdot cm^{-2}$ at 2 V and for $CO_2$ reduction delivering 1 $A \cdot cm^{-2}$ at 3 V was found.

EXAMPLES & EXPERIMENTATION & FINDINGS

The following section relates to various experiments that were conducted in the course of this work.

Experimental Setup

Synthesis

All materials and chemicals used are listed as-purchased in Table 1:

TABLE 1

List of chemicals and materials used in mechanical alloying electrochemical testing

| Material | Company | Purity (%) | Particle Size (μm) |
|---|---|---|---|
| Ni | Alfa Aesar | 99.9 | 74-149 |
| Co | Alfa Aesar | 99.8 | 44-149 |
| Se | Alfa Aesar | 99.5 | <44 |
| DDPA | Alfa Aesar | — | — |
| NiCl2•6H2O | Sigma Aldrich | 99.9 | — |
| FeCl$_3$ (Anhydrous) | Alfa Aesar | 98 | — |
| Ni NPs | Alfa Aesar | >99 | <100 |
| IrO$_2$-AA | Alfa Aesar | 99.99 | — |
| Nafion-D521 | Ion Power | — | — |

Alloying: Cryo-Milling

The synthesis of catalysts was carried in two milling stages: milling at cryogenic temperatures (−196° C.) to alloy two or more elements, and surfactant-assisted ball milling (SABM) at room temperature to produce nanoparticles as shown in FIG. 1. Milling in both stages was performed in a Retsch Cryomill at a vibrational milling speed of 30 Hz. The elemental powder precursors in addition to two 7 mm diameter stainless steel balls, weighing together 2769 mg on average, were all placed in a 5 mL stainless steel vail to maintain a ball-to-powder ratio (BPR) of 10:1. Cryo-milling was performed in several cycles of 30 minutes each. Between cycles, the vails were pre-cooled by flowing liquid nitrogen (LN$_2$) for 5 minutes to sustain cryogenic temperatures during the entire ball milling process. Before milling, the vials were sealed under Argon environment in a glovebox.

Using cryo-milling, Ni—Co—Se alloy systems were prepared according to quantities and the procedure shown in Table 2 below.

TABLE 2

Weight percentage of Ni—Co—Se alloy system

| | Element (wt. %) | | |
|---|---|---|---|
| Alloy | Ni | Co | Se |
| Ni—Se | 38.5 | — | 61.5 |
| Co—Se | — | 38.5 | 61.5 |
| (NiCo)Se | 21.3 | 21.4 | 57.3 |
| (NiCo)$_3$Se$_4$ | 17.9 | 18 | 64.1 |

Surfactant-Assisted Ball Milling (SABM)

In the second stage, powder is added to a 5 mL vial with a BBR of 50:1 to conduct SABM. In addition, anhydrous ethanol with 1:1 ethanol-to-powder mass ratio and Diphenylphosphoryl Acid (DPPA) as surfactant with 1:4 DPPA-to-powder mass ratio were added to the milling vial to produce nanoparticles suspension. SABM was carried out for 10 hours in total (5 cycles of 30 mins and 80 mins of off time between cycles) for all alloy systems in this study. This procedure was followed based on the optimization of parameters conducted in our previous work. To extract nanoparticles from the suspension, the surfactant must be removed after milling. First, ethanol is added to milling vials and the powder-ethanol slurry mixture is extracted by pipetting into centrifuging tubes until the vials are empty. Then, the tubes are sonicated for 30 min before centrifuging times at 3000 rpm for 30 mins, the large particles should be settled at the bottom of the tube. The suspended nanoparticles in solution is extracted by pipetting into new centrifuging tubes. The tubes are sonicated for 30 mins before centrifuging at 10,000 rpm for 30 mins and then the clear solution is washed and replaced with fresh ethanol, this procedure is repeated at least 3 times until all nanoparticles in the solution precipitate at the bottom of the tube. The tubes are then filled with ethanol and the nanoparticles-ethanol mixture is transferred to 20 mL scintillation vials. Scintillation vials are then heated at 70° C. in a furnace under air flow until all ethanol evaporates. The dry nanoparticle powder is then collected from the vials and stored.

Structural and Elemental Characterization

X-Ray Diffraction (XRD)

The crystal structure of catalysts was determined using X-ray Diffraction (XRD). A Miniflex 600 (Rigaku, Japan) equipped with D/tex Ultra silicon trip detector and Cu Kα radiation (λ=1.5418 Å) was used. Powders were prepared by mixing with acetone and then dropping a small drop of the mixture to fill a 4 mm diameter×100 μm deep groove in a single crystal silicon holder (zero-background). The angle was varied between 20° to 80° with a step size of 0.050.

Dynamic Light Scattering (DLS)

The particle size distribution of catalysts was analyzed using Dynamic Light Scattering (DLS). A LB-500 particle size analyzer (Horiba, Japan) was used. Samples were prepared by dispersing a small amount of the powder in ethanol. Then, solution mixture was loaded into disposable plastic 1.5 mL cuvettes (VWR, U.S.). A 5-mW laser source with a wavelength of 650 nm is directed to the sample in the cuvette to enable the measurement of particles ranging from 3 nm to 6 μm. The incident laser will experience multiple scattering in all directions because of the suspended particles. The scattered light is detected at a specific angle over time to determine the temporal fluctuations, diffusion coefficient, and particle size using Stokes-Einstein equation. Smaller particles will move at higher speeds and therefore will show faster fluctuations than larger particles. The refractive index of the solution and the constitutes elements are required for this analysis. The refractive index of all materials used in this study are shown Table 3 in below.

TABLE 3

Refractive index of elements used in this work

| Material | Refractive index | Reference |
|---|---|---|
| Ni | 2.6-5.83i | [83] |
| Co | 2.9-5.78i | [83] |
| Se | 2.89 | [83] |
| Ethanol | 1.3302 | [83] |

Electron Microscopy

The structural characterization and elemental mapping of the catalysts were done using Scanning Electron Microscopy (SEM) and Transmission Electron Microscope (TEM). TEM experiments were performed in Hitachi HF3300 equipped with a cold field emission electron gun using an accelerating voltage of 300 kV. TEM bright field images were used to determine the size and the shape of nanoparticles. The crystal structure was collected in diffraction mode using a selected area electron diffraction (SAED) aperture. The resultant diffraction patterns (DPs) were analyzed using CrysTBox. Energy X-ray Dispersive Spectroscopy (EDS) detector was used in Scanning Transmission Electron Microscopy (STEM) mode to analyze and quantify the composition of the nanoparticles. Also, Secondary electron (SE) detector was used to collect high resolution images of the morphology of the nanoparticles in the TEM. Powder samples were prepared in ethanol to form an ink, the ink was sonicated for 10 minutes before drop casting 1-2 μL on a 400-mesh copper grid and drying overnight.

The particle and geometry of larger particles were investigated using Scanning Electron Microscopy (SEM). Imaging was conducted using Hitachi SU3500. The composition of particles was determined using an attached EDS detector. Powder samples were prepared by adhering to carbon tape on a SEM aluminum stub. Compressed air is blown over the stub to loosen excess powder. In some cases, thin carbon or gold coating might be needed for poor conducting samples.

Electrochemical Setup

For all electrochemical experiments in this work, a Bio-Logic VSP-300 multi potentiosat was used. All tests were performed in 1 M KOH electrolyte at 30° C. unless indicated otherwise. The electrolyte was pre-electrolyzed using Pt working and counter electrodes at −1.7 V for 48 hours prior using to remove any trace metal impurities in the solution specifically Fe. A cell configuration was used as shown in FIG. 2. The cell is placed in a water bath to control the temperature and the electrolyte is purged with Ar for an hour before the test to remove 02 as shown in FIG. 2b.

Powder samples were prepared by making inks. The inks were produced by mixing 4 mg of the catalyst with 80 μL of Nafion® D521 (IonPower) and 1.25 mL of water-to-ethanol (4:1) solution. The mixture was sonicated for 30 minutes before dropping 5 μL of the ink on a 3 mm diameter glassy carbon (GC) electrode to produce a thin catalyst layer with a loading of 0.21 mg/cm$^{-2}$. The electrode is polished using 0.08 μm colloidal silica every time before applying inks. To load the catalyst on Ni foam (thickness: 1.7 mm, INCO), several drops of the ink are added to achieve a catalyst loading of 2 mg·cm$^{-2}$ on 0.5 cm×0.5 cm piece.

Oxygen Evolution Setup

A protocol to test the activity and stability of electrocatalysts used for OER was established as shown in Table 7. First, open cell voltage (OCV) is recorded for 30 mins to stabilize the material in the solution. The resistance of the solution is measured by electrochemical impedance spectroscopy (EIS). The frequency is scanned from 1 MHz to 1 kHz with an amplitude of 1 mV. Once EIS is completed, cyclic voltammetry (CV) is performed to clean and activate the surface. Each CV measurement is repeated 3 times at a speed of 50 mV·s$^{-1}$ to produce a unique fingerprint of anodic and cathodic peaks in the range from 0-1.6 V vs RHE. This is followed by measuring the electrochemical surface area (ECSA) in a non-Faradaic region using various scanning speeds as explained in the table. Each CV measurement at a specific speed is repeated 3 times. To measure the activity, polarization curves are acquired to conduct Tafel analysis and determine the catalytic properties of OER. This is performed using a Linear Sweep Voltammetry (LSV) with a slow speed 1 mV·s$^{-1}$ to allow the surface to stabilize and reflect the true reaction mechanism. In the last step, the stability can be assessed using chronopotentiometry. A fixed current density will be applied to evaluate the stability of the catalyst on different substrates. For quick stability measurement, the catalyst is tested on glassy carbon electrode at 10 mA·cm$^{-2}$ for 10 hours. Potential catalysts can then be tested for long-term stability on carbon paper and nickel foam for prolonged time and higher current densities as shown in the table. In this study, we used commercial Ni NPs and IrO$_2$ as a baseline, the description of the catalyst is listed in Table 4.

TABLE 4

Reference catalysts materials list

| Materials | Company | Purity (%) | Particle Size (nm) |
|---|---|---|---|
| Ni NPs | Alfa Aesar | >99 | <100 |
| IrO$_2$-AA | Alfa Aesar | 99.99 | — |

TABLE 5

A protocol to assess the electrocatalysts used for oxygen evolution reaction (OER)

| # | Process | Method | Parameters |
|---|---|---|---|
| 1 | Solution Resistance | Electrochemical Impedance Spectroscopy | 1 MHz-1 kHz Amplitude 1 mV |
| 2 | Activation/ Catalyst Fingerprint | Cyclic Voltammetry | Cycles = 3 Potential = 0-1.6 V vs RHE Speed = 50 mV · s$^{-1}$ |
| 3 | ECSA | Cyclic Voltammetry | Potential = 0-0.1 V vs RHE Speed = 20, 40, 60, 100 mV · s$^{-1}$ Cycles = 3 |
| 4 | Activity and Mechanism | Linear Sweep Voltammetry | Potential = 0-1.6 V vs RHE Speed = 1 mV · s$^{-1}$ |
| 5 | Stability | Chronopotentiometry | Current = 10, 100, 500, 1000 mA · cm$^{-2}$ Time = 10, 100 and 1000 hours |

Results and Discussion

Ni—Co—Se System

Binary Alloy Systems

The composition of the alloy systems is systemically controlled by varying milling time, temperature and medium. This will also result in changes in the microstructure and the morphology of the particles. Two control samples were investigated: Ni—Se and Co—Se. Both alloy systems were milled under cryogenic conditions for 3, 6, 9 and 15 hours as shown in XRD patterns in FIG. 3a and FIG. 4a. Milling was stopped after 15 hours because the crystal structure didn't change. When pure Se is cryo-milled, it amorphized just after 2.5 hours of milling. In the case of Ni—Se, Ni and Se started to form a mixture of different phases after 3 hours of milling. Three phases were present: NiSe, $NiSe_2$ and $Ni_3Se_4$. The compound converges on a singular crystal structure (HCP) after 6 hours of milling to only form NiSe.

Unlike Ni—Se, Co—Se didn't form any phases within the first 6 hours of milling. Instead, the sharp peaks in FIG. 4a can be attributed to elemental Co and the background (hump) between $2\theta=50°$ to $2\theta=70°$ corresponds to amorphous Se. However, after 6 hours of milling new weak peaks between $2\theta=30°$ to $2\theta=40°$ start to emerge indicating alloying. The system starts to exhibit clear XRD features after 9 hours of milling with the dominance of $CoSe_2$ phase. It took longer milling time to form phases Co—Se compared to Ni—Se. This could be because of the essential transformation in crystal structure from hexagonal to orthorhombic. Further milling for 15 hours, changed the phase to from orthorhombic $CoSe_2$ to monoclinic CoSe indicating that the former phase was metastable. Also, the intensity of the XRD signal almost halved, this can be attributed to the formation of smaller crystallites in the system. Cryo-milling has demonstrated so far great a capability in tailoring the crystal structure of difficult compounds such as metal chalcogenides.

Figure 5:
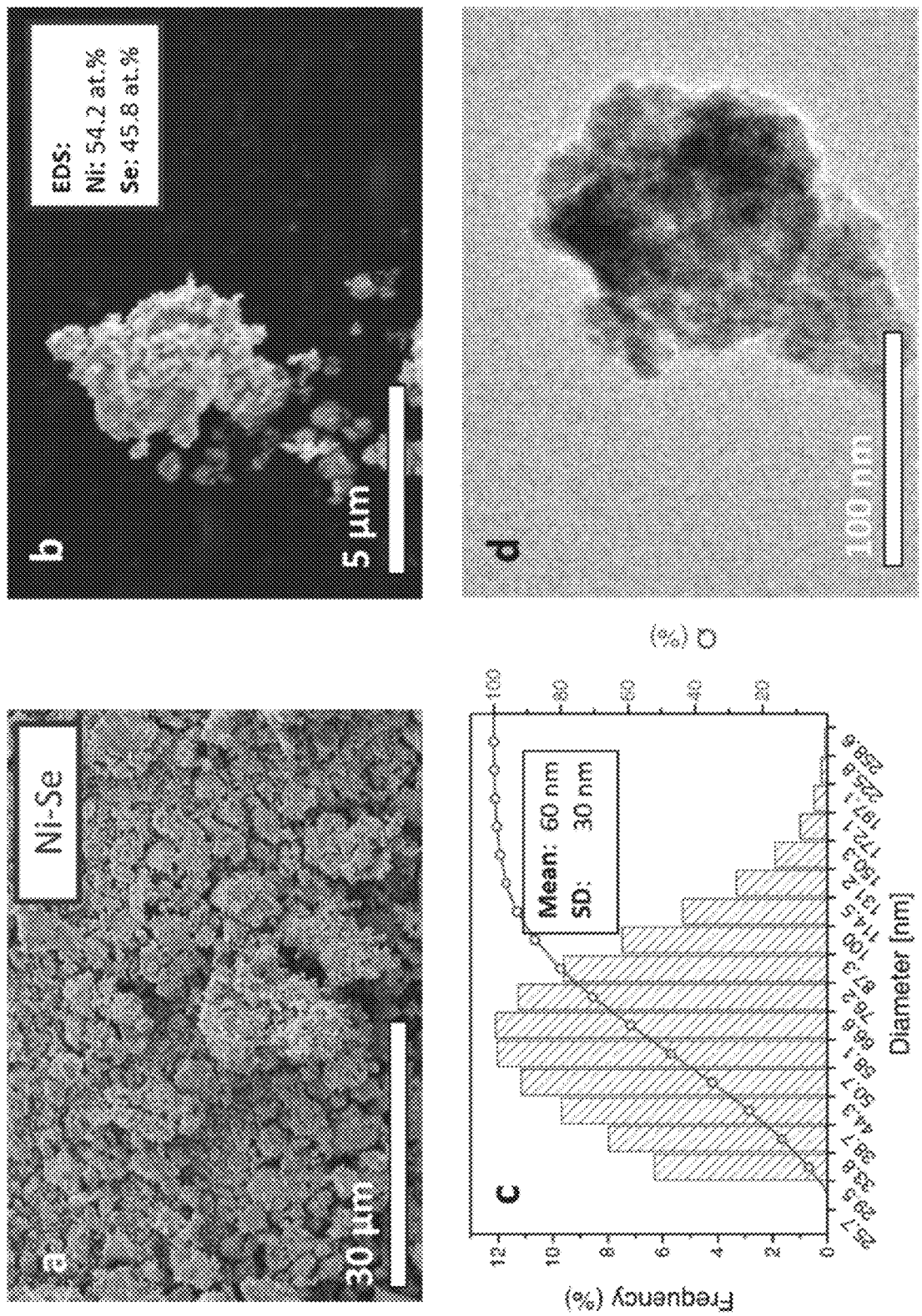
FIG. 5: structural assessment of NiSe after 15 hours of milling a) SEM of catalyst powder on carbon tape b) isolated cluster of particles, inset is the composition of the catalyst using EDS. c) particle size distribution of the catalyst suspended in ethanol as obtained from DLS d) TEM image of an isolated catalyst nanoparticle.

During milling, the particles undergo fracture due to the high kinetic energy produced by the multiple collision events between the steel balls and powder as shown in the SEM micrograph in FIG. 5a and FIG. 6a. This produces a distribution of fine particles agglomerated on top of microparticle supports. To confirm the composition of the particles, single particles were located and mapped. EDS results from different samples verifies the XRD results as shown in FIG. 5a and FIG. 6a with slight deviations due to inaccuracies in the measurement and artifacts in the material. The particle size distribution was further analyzed using DLS. Before mounting the material for DLS testing, the powder was dispersed in ethanol, sonicated for 30 mins and centrifuged at 6000 rpm for 30 mins. Nanoparticles were extracted from the top most solution in the centrifuge tube, this procedure was followed to reduce the number of large particles which might interfere with our measurement. The DLS results show a gaussian distribution with a mean of 60±30 nm and 80±35 nm for NiSe and CoSe, respectively. In the case of NiSe, TEM imaging was conducted to confirm the result. Isolated (free of agglomeration) particles were found in some parts of the Cu grid. The size of the particles was below 100 nm on average as shown in FIG. 5d. The composition of the particle was also investigated using EDS mapping in TEM. The result validates XRD and SEM findings as shown in the figures.

Ternary Alloy System

Figure 7:
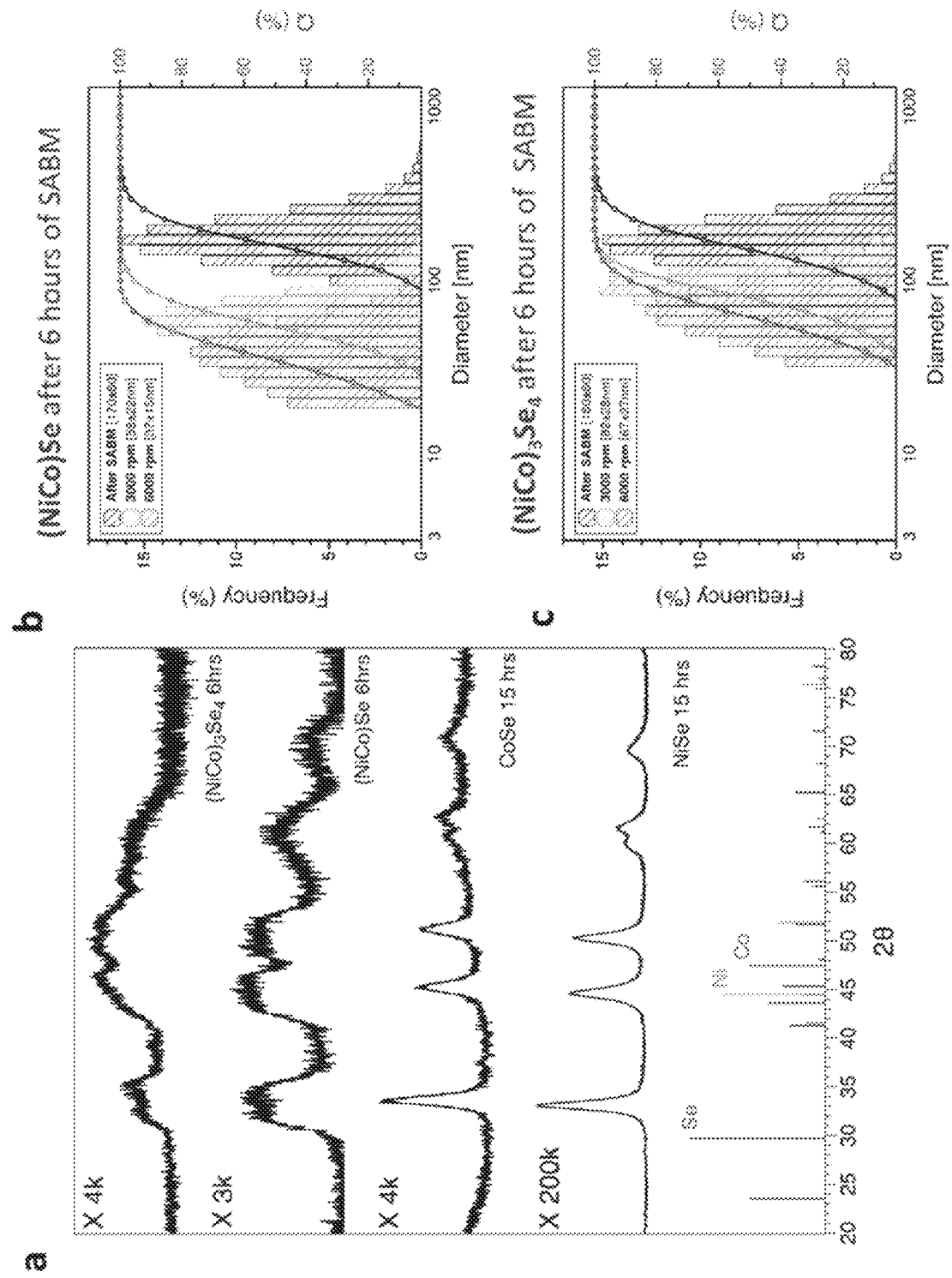
FIG. 7: a) crystal evolution of Ni—Co—Se ternary system with respect to milling time using XRD. Particle size distribution of the catalyst suspended in ethanol as obtained from DLS for b) (NiCo)Se and c) (NiCo)$_3$Se$_4$ after 6 hours of SABM.

Two crystal structures were targeted for the ternary alloy system: MSe and $M_3Se_4$, where M is any metal combination. In this work, 1:1 ratio Ni:Co was used as a starting point. The precursors were milled for 6 hours under cryogenic conditions. A crystal evolution of binary alloys to ternary alloys is shown in FIG. 7a. In general, the peaks are broader and less intense in the ternary systems than in the binary systems. This can be explained by the formation of small nanocrystalline domains in the alloy. The XRD patterns of (NiCo)Se and $(NiCo)_3Se_4$ were identified to be in hexagonal (PDF card: 53053) and monoclinic (PDF card: 624485) crystal structures, respectively. After cryo-milling, the size of the produced particles was measured to be 1065±330 nm for (NiCo)Se and 4055*778 nm for $(NiCo)_3Se_4$. Overall, the size distribution of Se-based alloys are much smaller than other alloy systems previously produced using this technique (>6000 nm). This size feature is important for the second step of milling (SABM), it can help in increasing the production yield of nanoparticles. In the second step, the surfactant will coat bulk powder during milling and inhibit cold-welding and agglomeration. Using the protocol developed by Samy et al (see Ref 81) the maximum yield of nanoparticles from this process for multimetal alloy was 30%. Using Se helps in increasing the yield up to 60-70% for both (NiCo)Se and $(NiCo)_3Se_4$ and as evident by the size of particles in the binary alloys. This process will enable the synthesis of nanoparticles for wide range of catalysts. The particle size distribution after SABM and centrifuging was measured as shown in FIG. 7. At higher centrifuging speeds such as 6000 rpm, particle size as small as 37 nm can be reached. It is worth noting that the smaller the size of the particle is, the lower the yield will be.

Electrochemical Performance

Figure 8:
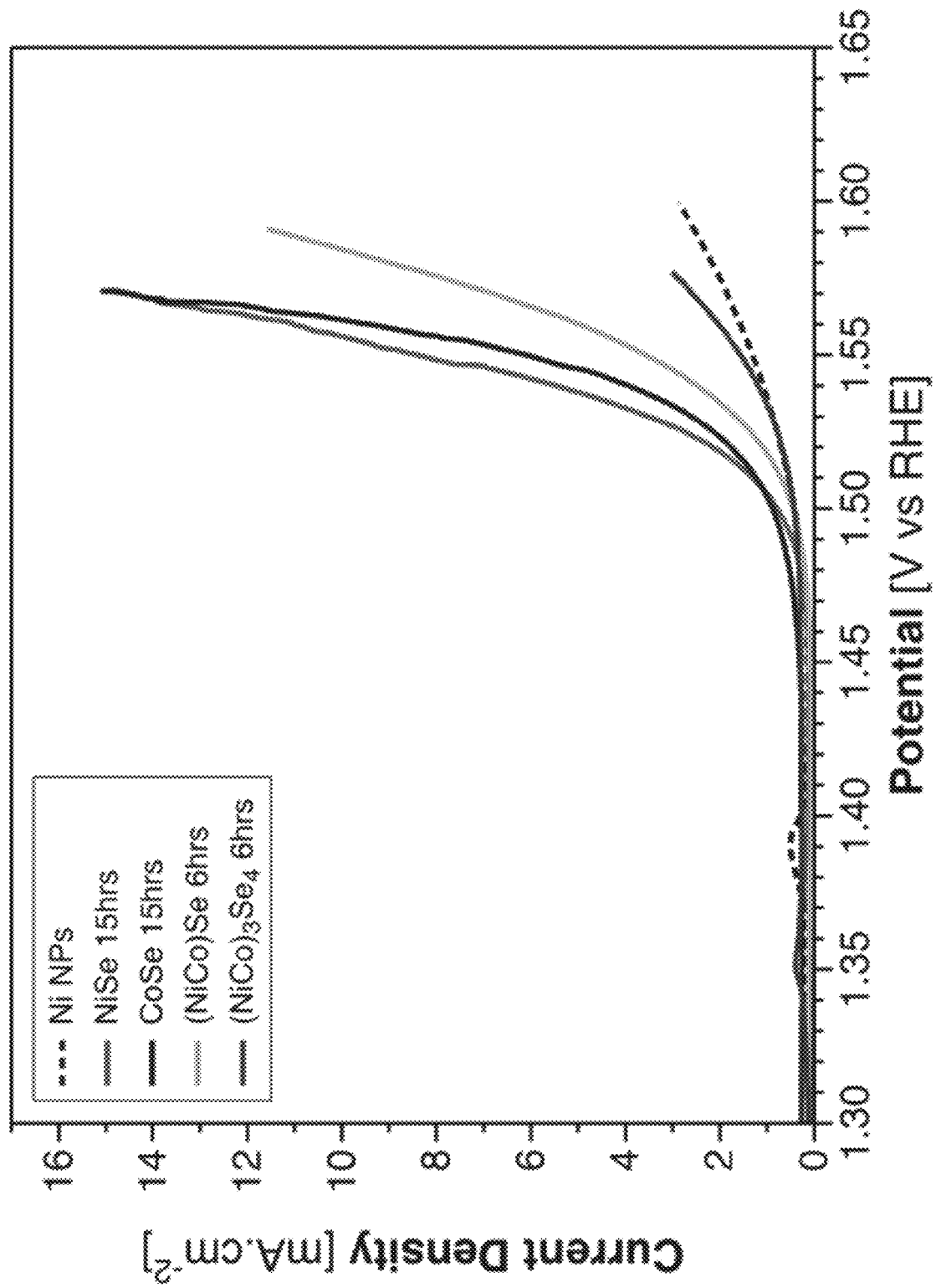
FIG. 8: Polarization curves of NiSe, CoSe, (NiCo)Se, and (NiCo)$_3$Se$_4$ in 1M KOH after cryo-milling. The results are compared to commercial Ni NPs (dashed).

Electrochemical performance is divided into two sections: activity and stability. For activity test, all powders were prepared in inks and deposited on glass carbon as previously explained in the experimental setup section. Commercial Ni NPs and $IrO_2$ were used as baseline for all measurements (see experimental setup). Also, NiFeOOH (NiFe) was prepared using Sol-Gel technique reported in previous work to compare benchmark this work's performance. In FIG. 8, all Ni—Co—Se alloy systems were electrochemically tested to determine the intrinsic activity. NiSe and CoSe have an over potential of 332 and 330 mV at 10 mA·cm$^{-2}$, which is similar to reported values in literature. The ternary alloys exhibit worse performances as compared to the binary systems, this is mainly because of the size difference and smaller surface area in the ternary alloys before SABM. Table 6 summarizes all the key parameters to evaluate the activity. In general, all catalysts show substantial improvement from pure Ni NPs.

TABLE 6

Summary of some results presented in FIG. 8

|  | η [mV] @1 mA | η [mV] @10 mA | Tafel [mV · dec$^{-1}$] | Size [nm] |
|---|---|---|---|---|
| Ni NPs | 321 | 383 | 62 ± 3 | 100 |
| NiSe 15 hrs | 277 | 330 | 53 ± 5 | 60 ± 30 |
| CoSe 15 hrs | 275 | 332 | 57 ± 1 | 80 ± 35 |
| (NiCo)Se 6 hrs | 288 | 353 | 65 | 1065 ± 330 |
| (NiCo)$_3$Se$_4$ 6 hrs | 310 | — | 79 | 4055 ± 778 |

After SABM, we could reduce the size of the particles to <100 nm as explained in the structural characterization. The electrochemical performance was measured again for both ternary catalysts and compared to $IrO_2$ and NiFe. Both (NiCo)Se and $(NiCo)_3Se_4$ nanoparticles (after SABM) have shown remarkable improvement in performance from the original bulk material. The overpotential required to draw a current of 10 mA·cm$^{-2}$ is 283 and 268 mV for (NiCo)Se and (NiCo)$_3$Se$_4$ compared to 298 and 272 mV for IrO$_2$ and NiFe as shown in FIG. 9.

Also, the Tafel slope for (NiCo)Se and (NiCo)$_3$Se$_4$ decreased to 50 and 42 indicating a change in the reaction mechanism. So far all electrochemical results were reported with respect to the geometric area (GC electrode area=0.0717 cm$^2$) without considering the actual electrochemically active sites. Electrochemical Surface Area (ECSA) measurements were conducted for all samples to determine the intrinsic activity of the catalysts. The roughness factor (RF), which is basically the ECSA/Geometric Area, was calculated as in Table 7. While monitoring current vs voltage while cycling at different voltage sweeping speeds, the double layer capacitance (C$_{dl}$) can be calculated as the slope of linear relationship of current (average difference in anodic and cathodic currents of each cycle) vs sweeping speed. The ECSA is calculated by dividing the Cdl over a specific capacitance value (C$_s$) that can range between 0.02-0.13 mF·cm$^{-2}$. In this case, the work used 0.04 mF·cm$^{-2}$ for Ni and Co based alloys. The ECSA results show low RF values compared to other catalysts in the table specifically NiFe. Sol-Gel catalysts form a network of oxides and oxy/hydroxides which boosts the overall surface area. In the case of milling, the catalysts will have minimal surface roughness and modifications as was shown in the structural analysis. This will help in decoupling the actual intrinsic activity produced by the synergistic effects of the elements in the system and surface area contributions.

TABLE 7

Figure 9:
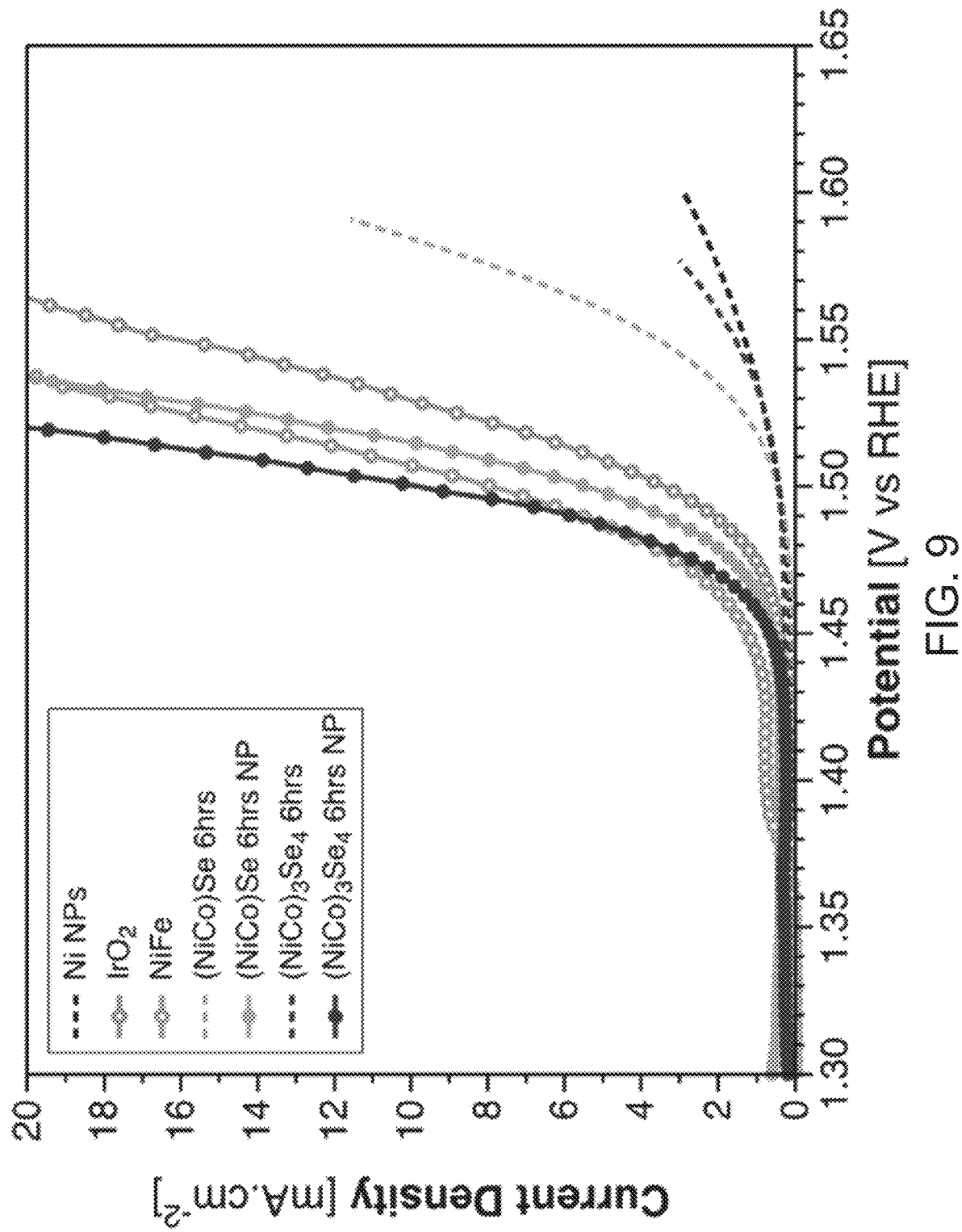
FIG. 9: Polarization curves of (NiCo)Se, and (NiCo)$_3$Se$_4$ after cryo-milling and SABM. The results are compared to commercial Ni NPs (black-dashed), commercial IrO$_2$-AA, and NiFe prepared by Sol-Gel.

Summary of the results presented in FIG. 9

|  | η [mV] @1 mA | η [mV] @10 mA | Tafel [mV · dec$^{-1}$] | RF | Size [nm] |
| --- | --- | --- | --- | --- | --- |
| Ni NPs | 321 | 383 | 62 ± 3 | 17.55 ± 7.5 | 100 |
| IrO$_2$ | 250 | 298 | 48 ± 1 | 13.43 ± 0.72 | — |
| NiFe | 212 | 272 | 62 | 500-100 | — |
| (NiCo)Se 6 hrs | 288 | 353 | 65 | — | 1065 ± 330 |
| (NiCo)$_3$Se$_4$ 6 hrs | 310 | 389* | 79 | — | 4055 ± 778 |
| (NiCo)Se 6 hrs NP | 233 | 283 | 50 | 7.60 | 37 ± 15 |
| (NiCo)$_3$Se$_4$ 6 hrs NP | 226 | 268 | 42 | 8.13 | 67 ± 27 |

Figure 10:
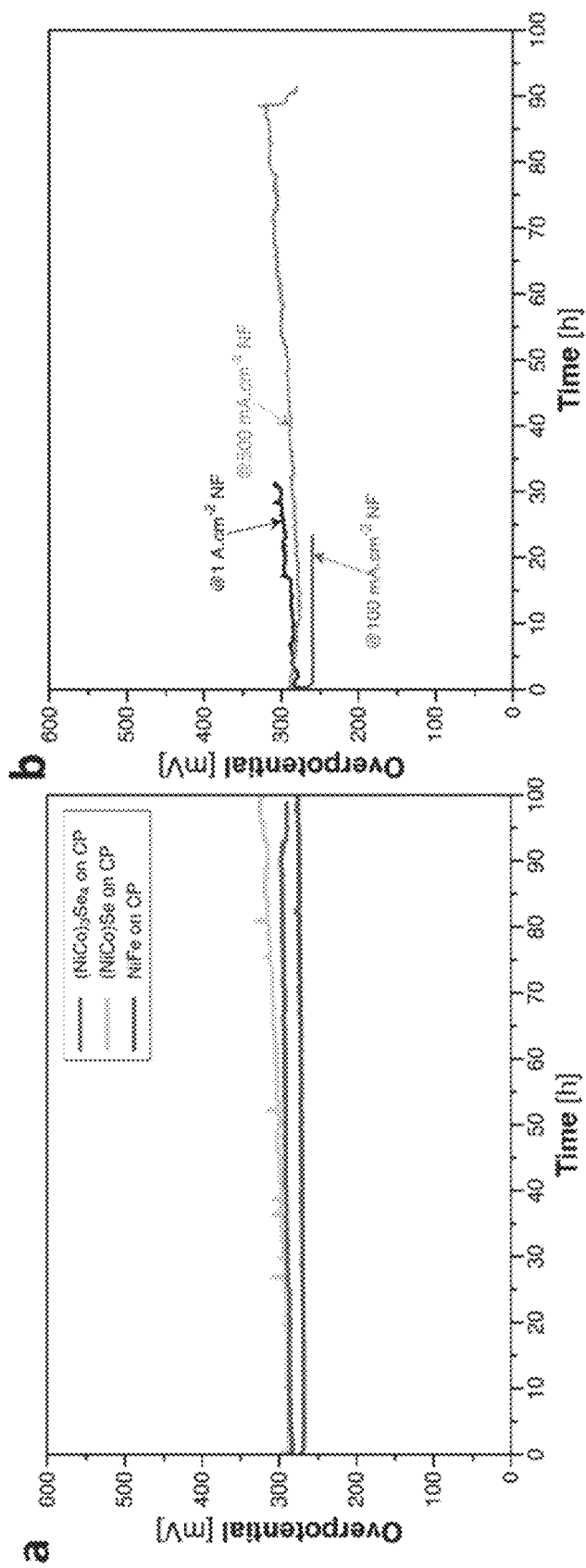
FIG. 10: Long-term stability test using chronopotentiometry a) at 10 mA·cm$^{-2}$ on Carbon Paper b) (NiCo)$_3$Se$_4$ on NF. All tests were done in 1M KOH. The values are IR-corrected.

In the second step, the stability of the catalysts is tested. In this test, the catalyst is deposited on Carbon paper instead of GC for the reasons discussed further below. The catalysts are first tested using chronopotentiometry (CP) at 10 mA·cm$^{-2}$ for 100 hours. As can be seen from the results in FIG. 10a, (NiCo)$_3$Se$_4$ is the most stable with the smallest increase in overpotential (7 mV, <2%) in 100 hours period; while (NiCo)Se was not stable and started to regularly increase in overpotential after 30 hours of operation. Spikes in overpotential can also be obviously observed in the case of (NiCo)Se, these spikes are associated to vigorous bubbling causing mechanical instabilities. To further assess the stability of (NiCo)$_3$Se, the catalyst was deposited on 0.5×0.5 NF and tested under high current densities similar to industrial requirements. At first, the electrode was tested at @100 mA·cm$^{-2}$, the performance was stable for 24 hours period. It was decided to increase the current higher value to accelerate the test as shown in FIG. 10. When the current is increased, the overpotential went from around 269 mV at 100 mA·cm$^{-2}$ to 288 mV at 500 mA·cm$^{-2}$ and 298 mV at 1000 mA·cm$^{-2}$. The overpotential of the catalyst at 500 and 1000 mA·cm$^{-2}$ was maintained for at least the 30 hours with no significant variations. After 30 hours, the overpotential starts to linearly and gradually increase because of water consumption. This work added additional amounts of the electrolyte to sustain the OER after 92 hours, the overpotential dropped abruptly to original levels.

Additional Information

The present work notably found that activation of cryomilled Ni—Co—Se Nanocrystals can achieve durable electrochemical water oxidation at high current densities. The following description provides information regarding experimentation and findings regarding the production, properties and use of such electrocatalyst materials.

By way of summary, in the electrocatalytic CO$_2$ reduction reaction, up to half of the excess electricity input arising due to overpotentials is incurred because of the poor reaction kinetics at the anodic oxygen evolution reaction (OER); this problem worsens over time if the performance of the OER electrocatalyst diminishes during operation. The present work reports the synthesis of electrocatalysts derived from high melting point intermetallics. The approach promotes disorder and generates nanocrystalline structures based on Ni—Co—Se: specifically, (NiCo)$_3$Se$_4$ and (NiCo)Se were produced via judicious control over cryomilling conditions. Using in situ X-ray absorption spectroscopy (XAS), as well as using electron microscopy, we found that, under OER conditions, the electrochemical leaching of Se ions activates the electrocatalysts, facilitating the transformation of Ni and Co into active and stable oxyhydroxides. On a glassy carbon electrode at 10 mA·cm$_{geo}^{-2}$, activated (NiCo)$_3$Se$_4$ required only an overpotential of 268 mV in 1M KOH. When operated at higher current densities, the electrocatalyst maintained an overpotential of 279 mV at 0.5 A·cm$^{-2}$ and 329 mV at 1 A·cm$^{-2}$ for at least 500 hrs, with an average voltage degradation rate of 0.17 mV·h$^{-1}$.

In terms of context, it is noted that affordable electrocatalysis is urgently needed for long-term chemical energy storage necessary to help accelerate the transition from fossil fuels to sustainable energy sources. The sustainable energy market witnessed tremendous growth in the last 10 years, especially in 2017 when power capacity and investments in the market increased at a record-breaking pace. This increase resulted in a significant reduction in renewable energy cost and offered opportunities for the advancement of green technologies.

The large-scale implementation of sustainable energy requires overcoming intermittency sources, such as solar and wind. The electrocatalytic conversion of CO$_2$ and water into synthetic fuel and chemical feedstocks, which are readily stored and easily transported, addresses this challenge. The efficiency of electrocatalysis is limited by the sluggish kinetics and high overpotentials, including those associated with the oxygen evolution reaction (OER). A relatively small selection of electrocatalysts meet requirements for OER: low overpotentials (<300 mV) at high current densities (>500 mA·cm$^{-2}$) for long-term operation (ultimately >60,000 h). Identifying durable, efficient OER electrocatalysts will support continued progress in the field.

To date, noble metal OER electrocatalysts, such as RuO$_2$ and IrO$_2$, are state-of-art in view of their superior activity and stability; unfortunately, their high price and their scarcity limit their widespread application. Earth-abundant, low cost elements, such as the first-row transition metals Ni, Co, and Fe, can be used as OER electrocatalysts in anion exchange membrane (AEM) systems, which offer an alkaline environment more compatible with non-noble metal based electrocatalysts.

One of the most efficient non-noble metal electrocatalysts for alkaline solutions is Fe doped NiOOH. While a small amount of Fe can boost the electrocatalytic activity of NiOOH, the nature of the synergistic effect between the two elements is still under debate. Berlinguette et al. found that with high current densities in alkaline solutions, a significant amount of Fe left NiFeO$_x$ and diffused to the cathode. Markovic et al. investigated activity and stability trends for monometallic oxyhydroxides and observed Ni>Co>Fe in stability, but the reverse trend for activity. In the present work, an Fe-free electrocatalyst was developed with a goal of an earth abundant OER catalyst that was both active and stable in alkaline solutions. Among the candidates, Co was selected at least in part because—when used in combination with Ni—it can lower overpotential and improves stability.

Metal chalcogenides such as sulfides, selenides, and tellurides have demonstrated improved activity compared to oxides. Adding Se and Te to mixed-transition-metal oxides can lead to an increased covalency in the metal-chalcogenide bond due to the smaller associated electronegativity and better conductivity. Selenium can also be used as an alloying element that is selectively leached to increase the nanoporosity of the structure, induce disordering in the lattice, and boost the number of defective sites for electrocatalytic reactions. Se incorporated in the lattice in a compound with transition metals also facilitates partial or complete conversion to active oxyhydroxides.

The crystal structure of the electrocatalyst can play a relevant role in its activity. Smith et al. demonstrated that amorphous mixed-metal oxides including Fe, Ni, and Co are more active than their crystalline counterparts. Amorphous metals lack long-range structural order and can be produced using a variety of methods: atomization, electrodeposition, electroless deposition, planar flow casting, and solid-state amorphization such as mechanical alloying. Cryomilling, one type of ball milling that involves milling at cryogenic temperatures, can produce a wide compositional range of compounds. Amorphous alloys produced by planar flow casting, for example, are limited to compositions at a near low melting point eutectics. Mechanical alloying has a broader compositional range centered about high melting point intermetallics. During milling, the particles undergo fracture due to the high kinetic energy produced by the multiple collision events between the milling balls and powder. The temperature at which mixing is taking place controls the extent of alloying, the concentration of defects, and local chemical clustering. At high temperatures (≥room temperature), atoms become highly mobile and diffuse into each other forming equilibrium phases, while at low temperatures metastable phases are more stable due to increased defects and reduced atom mobility. Operating at cryogenic conditions can prevent these metastable amorphous-nanocrystalline structures from recrystallizing as a result of the local temperature rise caused by high impact collisions. Targeting high melting Ni—Co—Se intermetallic compounds favors disordering and the formation of abundant defective and coordinatively unsaturated sites (CUS) that are known to be catalytically active. Crystal disordering can be further enhanced by milling under cryogenic temperatures due to reduced welding and increased brittleness of the powder particles at such low temperatures. Unlike conventional high energy milling, amorphization doesn't arise as a result of fast quenching after localized heating by the milling process but rather is believed to be a result of milling-induced disordering followed by crystallite reduction, accumulation of defects and partial or complete amorphization. The improved stability of amorphous alloys is another exciting feature that can significantly enhance the overall catalytic performance of the electrocatalyst.

In this work, a two-step milling process was used to produce Ni—Co—Se ternary alloys. Then, the electrocatalyst was electrochemically activated by selectively etching Se out of the structure to facilitate the transformation of Ni and Co to active oxyhydroxides. X-ray absorption spectroscopy (XAS) was utilized to identify the role of adding Se on the chemical-structural transformation and bonding environment of active surface species during the OER. The overall performance of Ni—Co—Se as OER electrocatalyst against industrial requirements for water splitting and $CO_2R$ in 5 cm$^2$ AEM electrolyser.

Synthesis and Activation of the Electrocatalyst $(NiCo)_3Se_4$ and $(NiCo)Se$ were synthesized using a two-step solid-state ball milling process including: 1) mechanical alloying of two or more elements at a cryogenic temperature (<−196° C.) to produce disordered crystal structures, and 2) surfactant-assisted ball milling (SABM) at room temperature to tailor the shape and size of the alloyed particles (see FIG. 1). To prevent undesired oxidation during milling, Ni, Co, and Se powders with two stainless steel balls (7 mm diameter) were sealed in Ar in a 5 mL stainless steel jar which was placed within a milling container (each container can hold 4 milling jars). Then, the powders were milled at a high linear speed (30 Hz) and forced to blend under the influence of ball-powder-ball high-energy collisions. During milling, liquid nitrogen ($LN_2$) flowed through the container and over the outer surface of the milling jar to maintain an extremely low temperature and prevent particle crystallization. This combination of high-speed mixing and low temperature facilitates the formation of amorphous-nanocrystalline structures centered at high-melting point intermetallic compositions.

Figure 3:
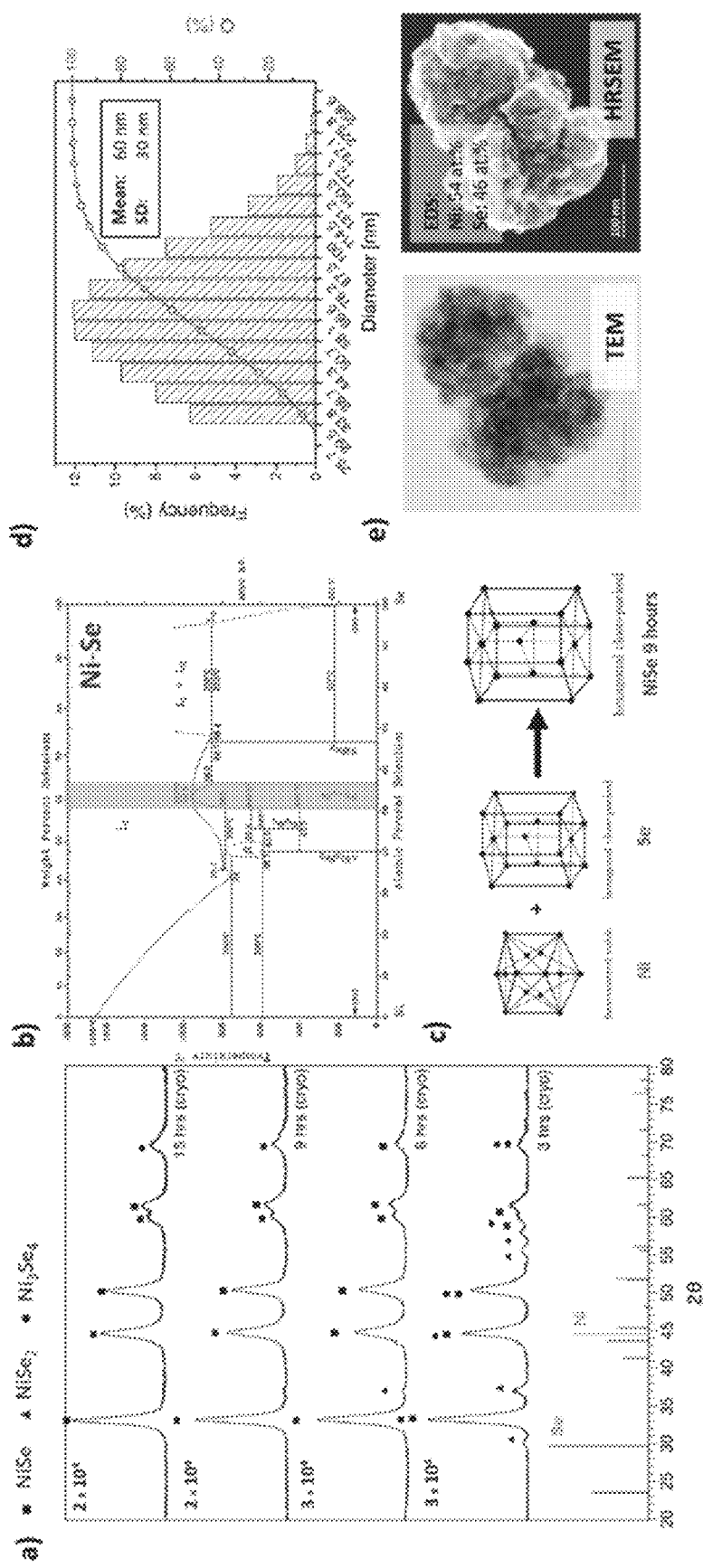
FIG. 3: Characterization of Ni—Se compound. a) XRD evolution with cryomilling time b) Ni—Se phase diagram c) crystal evolution d) DLS particle distribution and e) TEM and HRSEM images for NiSe cluster after 9 hours of cryomilling.
Figure 4:
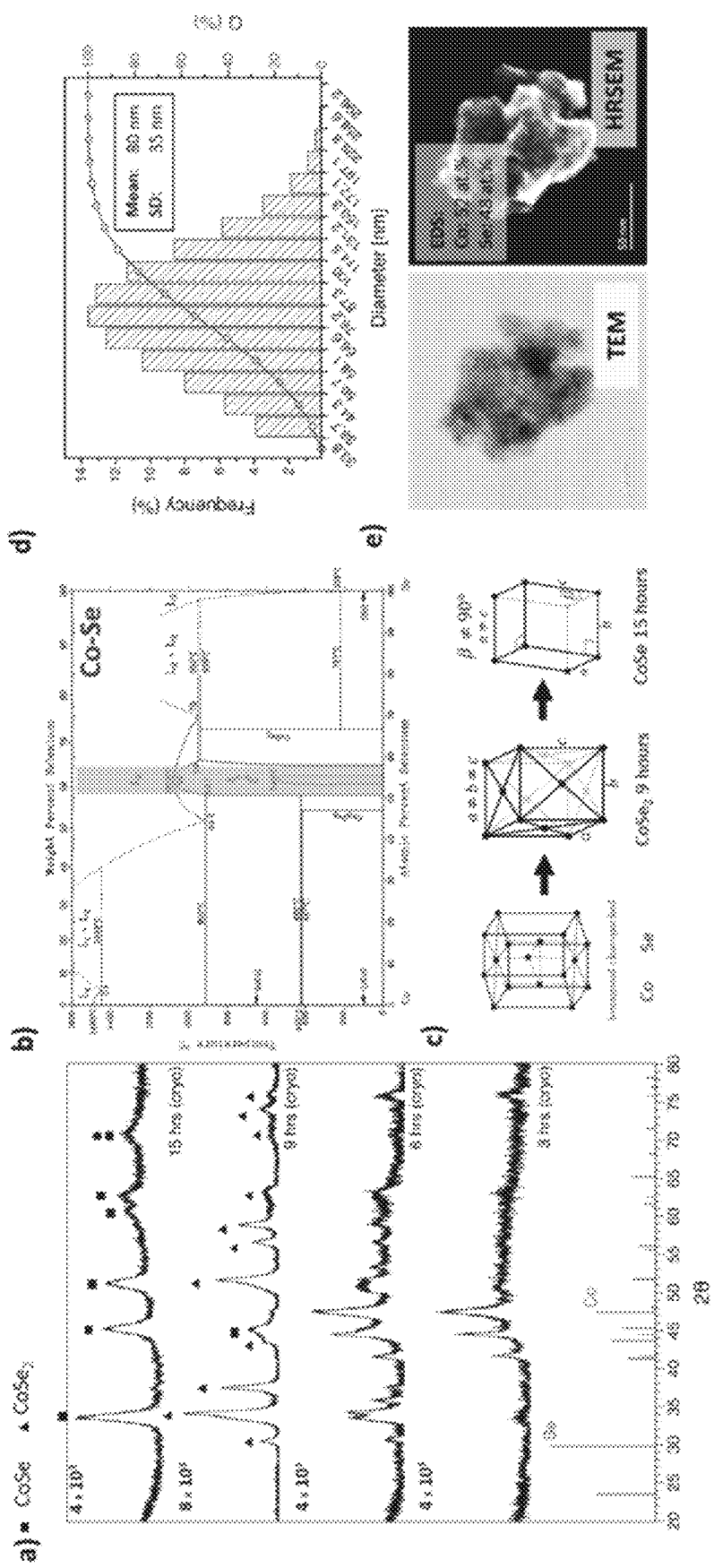
FIG. 4: Characterization of Co—Se compound. a) XRD evolution with cryomilling time b) Ni—Se phase diagram c) crystal evolution. d) DLS particle distribution and e) TEM and HRSEM images for Co—Se cluster after 15 hours of cryomilling.
Figure 11:
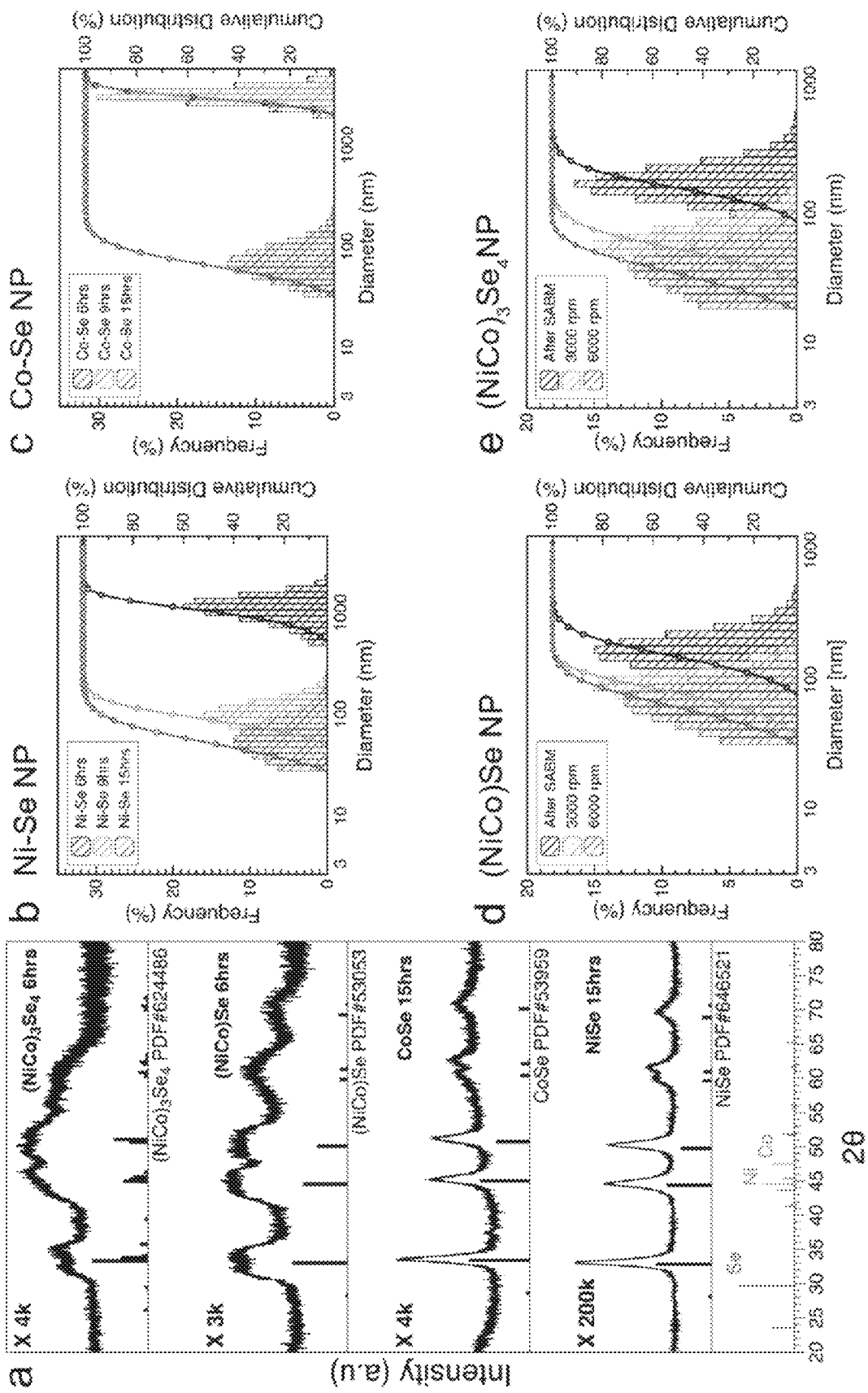
FIG. 11: a) XRD of NiSe, CoSe, (NiCo)Se, and (NiCo)$_3$Se$_4$ alloys. Particle size distribution measurement using DLS for b) Ni—Se c) Co—Se with respect to milling times of 6, 9, and 15 h, d) (NiCo)Se and e) (NiCo)$_3$Se$_4$ after SABM for 6 h, 3000 rpm and 6000 rpm centrifuging.

First, Ni—Se and Co—Se binary compounds were synthesized to study the milling behaviour of Ni and Co with Se. The structural evolution was probed with respect to milling time using XRD (FIG. 3, FIG. 4). A high melting point intermetallic composition was chosen from Ni—Se and Co—Se phase diagrams for synthesis: 46 at. % Ni/Co and 54 at. % Se (FIG. 12b, FIG. 13b). The XRD of NiSe and CoSe after 15 h of milling are shown in FIG. 11a. The study observed a complete mixing of Ni and Se into a single phase after only 6 hours of milling (FIG. 3a), while Co—Se formed an alloy only after 9 hours of milling and has undergone polymorphic phase transformations during the 15 hours of milling (FIG. 4a). This transformation over a range of metastable phases was observed, in previous reports, to occur repeatedly on continued ball milling for alloys that have either Co, Se, or Ti. The free energy of the actual metastable phase is determined by the interplay between two competing milling mechanisms: on one hand, accumulation of defects which raises the free energy of the system, on the other hand activation of a phase transformation which lowers the free energy of the system. During milling, a reduction in diffraction intensity and peak broadening during milling were observed, this is ascribed to amorphization or formation of nanocrystallites. Using dynamic light scattering (DLS), the particle size distribution of NiSe shifted by one order of magnitude to lower values between 6 h and 9 h and remained unchanged after 15 h of milling yielding in an average particle size of 60±30 nm (FIG. 11b). In the case of CoSe, the shift was only observed after 15 hours of milling yielding in an average particle size of 90±30 nm (FIG. 11c). The average particle size of NiSe and CoSe after 15 hours of milling were found to be at least two orders of magnitude smaller than the size of particles produced by cryomilling without the use of any surfactant. This implies that despite the possibility of particles welding together due to excessive collisions, Se played an important role in stabilizing single phase nanoparticles (<100 nm) with Ni and Co. Centrifuging at 3000 rpm (1000 rcf) was used to separate nanoparticles from larger particles before quantification. The successful mixing of Ni/Co with Se in a single phase using cryomilling implied that Se can be used as a structural scaffold for Ni and Co alloys.

Two ternary compounds, each with a composition that lays within the high melting intermetallic composition range of Ni—Se and Co—Se (50-57% at. % Se), were synthesized: (NiCo)Se and (NiCo)$_3$Se$_4$. After 6 h of milling both ternary compounds were successfully produced as evident by XRD (FIG. 11a). The broad diffraction peaks indicate that nano-sized crystallites (1.5-2 nm) were produced. Unlike Ni—Se and Co—Se, the particle size distribution of Ni—Co—Se ternary compounds, which was measured using DLS, had an average size greater than a few micrometers and a small surface-to-volume ratio, which is undesirable for efficient catalysis. Therefore, SABM step was introduced to reduce the particle size of the alloyed compounds. In this step, the alloyed particles were grinded in a solution of 70.2 µL anhydrous ethanol and 11.1 mg dodecylphosphonic acid (DDPA) to produce nanoparticles (<100 nm) which were then filtered out from larger particles (>100 nm) by centrifuging at 3000 rpm and 6000 rpm in 30 mL of ethanol. Undesired surfactant ligands were removed by a following centrifugation step, repeated twice, at 10,000 rpm (11,000 rcf) for 1 h. Afterwards, the nanoparticles were collected and washed with ethanol and dried overnight in air in an oven at 65° C. The average particle size was significantly reduced to 170 nm for (NiCo)Se and 160 nm for (NiCo)$_3$Se$_4$ after SABM and without a proceeding centrifuging step. Centrifuging at 3000 rpm (1000 rcf) and 6000 rpm (4000 rcf) filtered out nanoparticles that have an average size of 37 nm for (NiCo)Se and 67 nm for (NiCo)$_3$Se$_4$ from larger particles (FIG. 11d and FIG. 11e).

Figure 12:
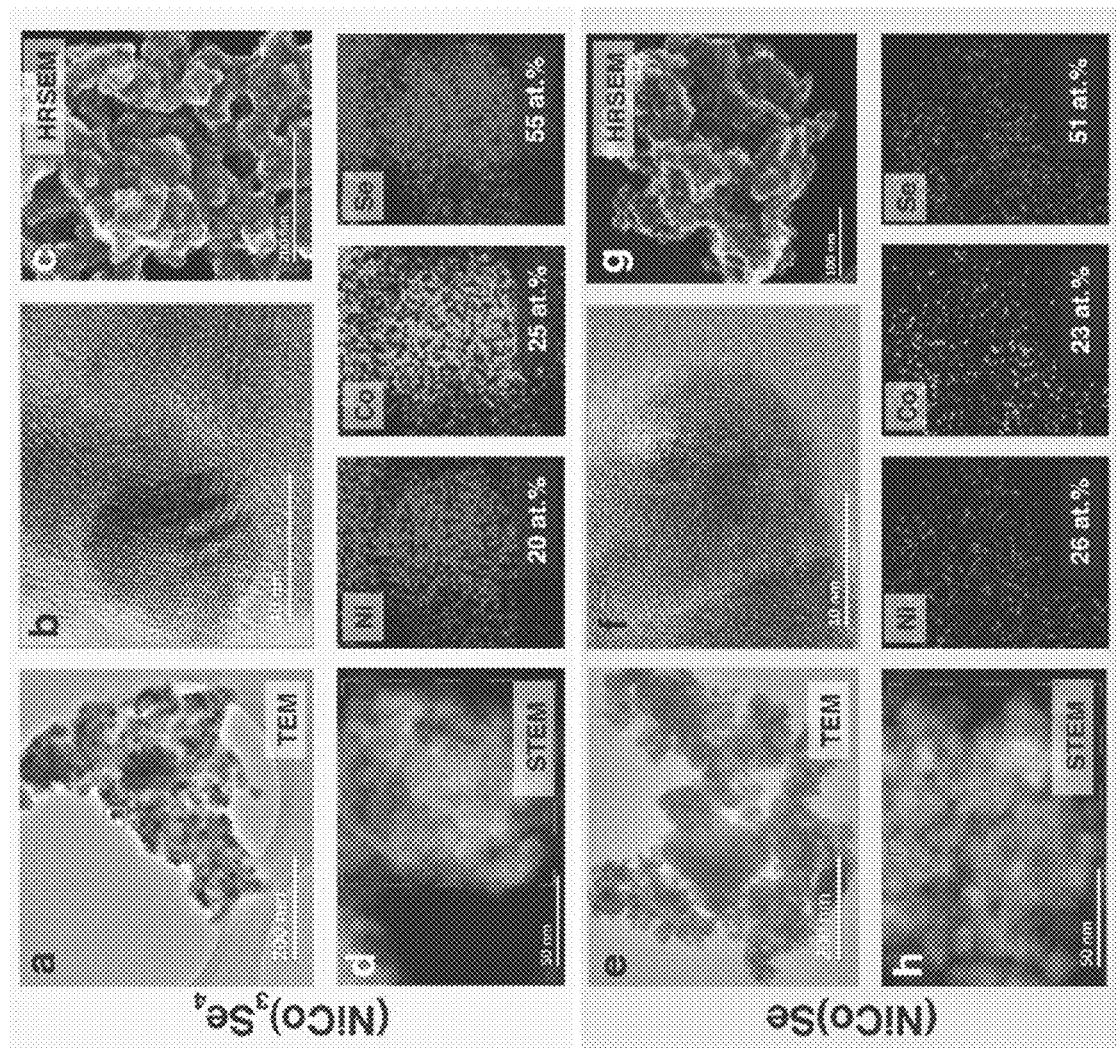
FIG. 12: Structural and compositional analysis of (NiCo)$_3$Se$_4$ a) TEM image of the nanoparticle cluster. b) HRTEM image of a single particle in the cluster. c) HRSEM image of the nanoparticle luster. d) HAADF-STEM image with corresponding EDS elemental mapping for Ni, Co and Se. Structural and compositional analysis of (NiCo)Se e) TEM image of the nanoparticle cluster. f) HRTEM image of a single particle in the cluster. g) HRSEM image of the nanoparticle cluster. h) HAADF-STEM image with corresponding EDS elemental mapping for Ni, Co and Se.
Figure 13:
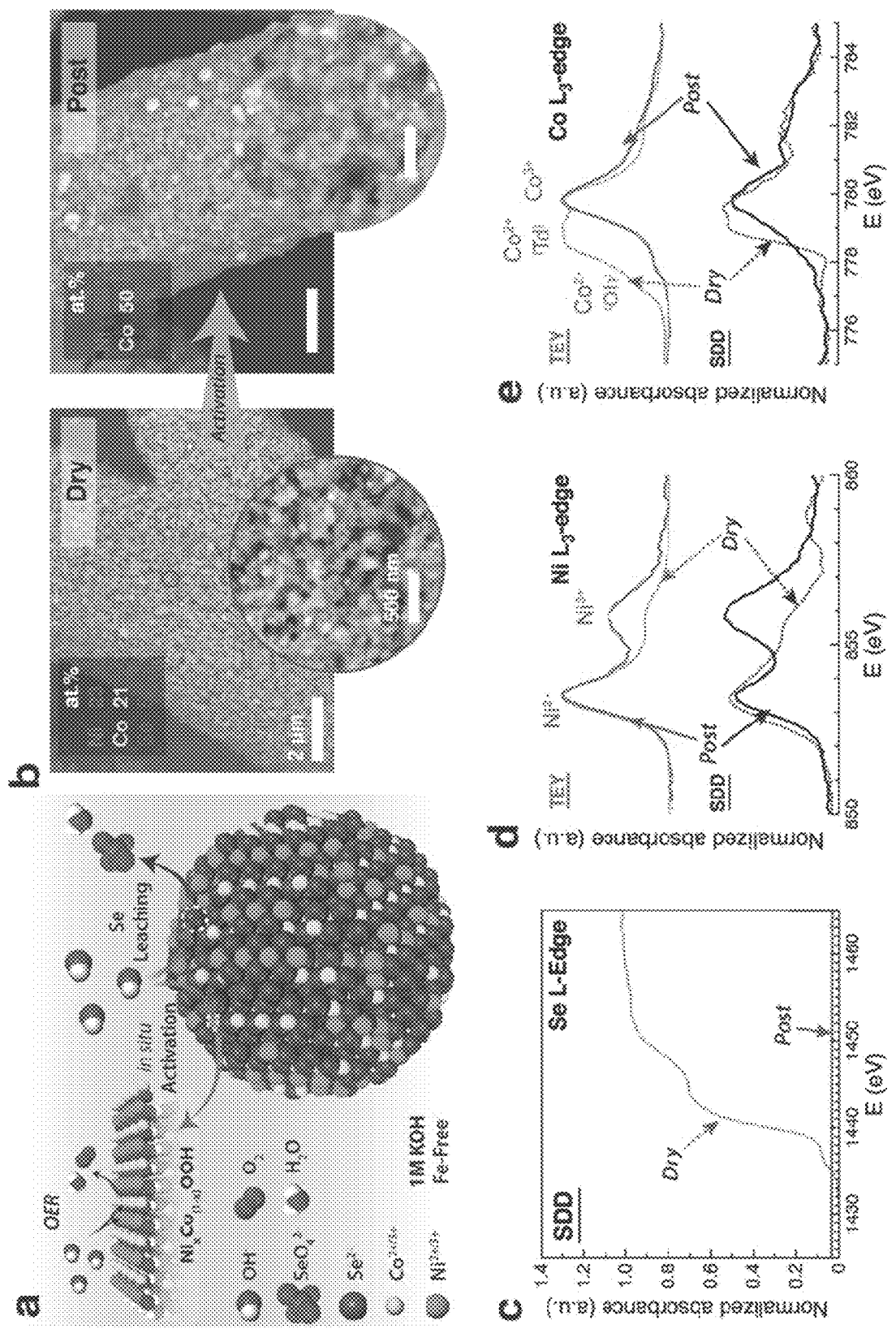
FIG. 13: a) A schematic of the activation process for Ni—Co—Se alloys. Backscattered electron (BSE)-SEM images of the (NiCo)$_3$Se$_4$ catalyst on carbon paper at b) 0 h (dry) and after 2 hours of activation at 10 mA·cm$^{-2}$ (post). The elemental content of the catalyst is shown in the inset tables. Soft X-ray L-edge XANES of c) Se, d) Ni, and e) Co using TEY and SDD modes.

The nanoparticles were dispersed in ethanol and dropcasted on Cu grids and left to dry before imaging by transmission electron microscopy (TEM) (see FIG. 12). TEM images show that nanoparticles agglomerated after surfactant removal and formed larger clusters. Individual nanoparticles with a size of less than 10 nm can be still distinguished at high magnifications (see FIG. 12). The grape-like clustering of particles can also be observed using high-resolution scanning electron microscopy (HRSEM), this clustering forms a nanoporous structure with a high surface to volume ration suitable for catalysis (FIG. 12c and FIG. 12g). A large area was selected for elemental mapping of the nanoparticle (FIG. 12d and FIG. 12h). Using scanning transmission electron microscopy (STEM), and energy dispersive spectroscopy (EDS) the elemental distribution of Ni, Co, and Se was mapped. The results show that the three elements were homogenously dispersed in the compound with no phase segregation or enrichment in specific regions. Structural characterization results produced by XRD, DLS and TEM confirm that milling was successfully utilized to synthesis homogenously dispersed Ni—Co—Se nanocrystals in a single phase with an average cluster size of less than 100 nm as shown by DLS and less than 10 nm particle size according to TEM analysis.

The nanoparticles were electrochemically activated by oxidizing and selectively leaching Se out of the structure. The electrochemical expulsion of Se, as demonstrated in previous studies, can facilitate the complete transformation of transition metals to disordered oxyhydroxide phases (poor crystallinity) rich in defects. According to the Pourbaix diagram of Se, Se is expected to oxidize to soluble $SeO_4^{2-}$ at high pH while Ni and Co are predicted to convert completely to active oxyhydroxides by lattice strain (see FIG. 13a). Before activation, the nanoparticles were prepared in inks by mixing with a solution of 4:1 water to ethanol and Nafion binder. The inks were then deposited on one side of a 0.5 cm×0.5 cm untreated carbon paper and left to dry in air. The activation process, which was conducted in a three-electrode electrochemical cell in 1M Fe-free KOH (pre-electrolyzed), was initiated by applying a constant current density of 10 mA·cm$_{geo}^{-2}$ for 2 hours, a sufficient time to warrant a complete removal of Se. Scanning electron microscopy (SEM) images were taken for (NiCo)$_3$Se$_4$ nanoparticles on carbon fiber before (dry) and after (post) activation (see FIG. 13b). The cluster of nanoparticles before activation covered the entire carbon fiber and Se accounted for 56 at. % in the structure. After activation, the morphology of the clusters was altered and Se was completely removed accounting for 0 at. %, as confirmed by EDS, while the atomic ratio between Ni and Co remained unchanged 1:1. To further support these microscopical observations, soft X-ray absorption spectroscopy (sXAS) was conducted to investigate local chemical and electronic changes to individual Ni, Co and Se atoms after activation. The X-ray absorption near edge structure (XANES) of Se L-edge confirmed that Se was incorporated in the dry nanoparticles as selenide ($Se^{2-}$) and then completely left the structure after 2 hours of activation (post) as inferred by the lack of Se L-edge signal (see FIG. 13c). The oxidation states of Ni and Co were inspected after activation as shown in XANES of $L_3$-edge results (see FIG. 13d and FIG. 13e). Two different modes of X-ray detection were used to investigate the oxidation state: fluorescence X-rays using silicon drift detector (SDD) and total electron yield (TEY). The TEY mode is dependent on the conductivity of the surface but is more surface sensitive (<10 nm) compared to SDD (<100 nm). Using both detection modes allowed investigating oxidation state changes in the bulk and on the surface of the nanoparticles before and after activation. The XANES of Ni $L_3$-edge of the dry sample revealed that Ni had an oxidation state of 2+ before activation and increased to 3+ after activation suggesting the transformation of Ni to NiOOH. Similarly, the XANES of Co $L_3$-edge of the dry sample showed that Co had a mixed oxidation state of 2+/3+ on the surface implying that Co was in a spinel structure. The oxidation state increased to 3+ after activation suggesting possibly the transformation of Co to CoOOH. sXAS confirmed that Se was completely leached out from the nanoparticles activating Ni and Co to oxyhydroxides.

Electrocatalytic Performance and Stability

Figure 14:
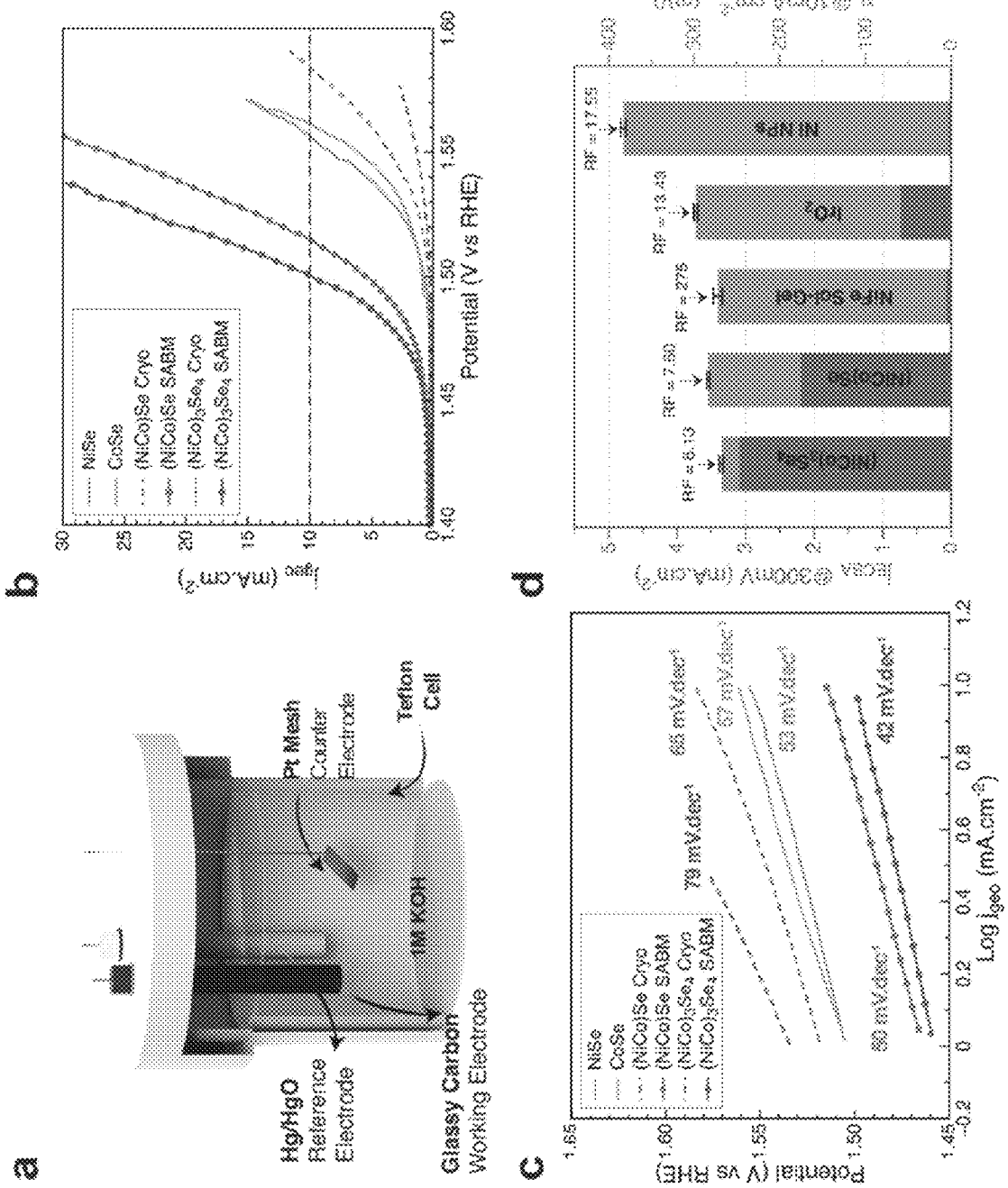
FIG. 14: a) Half-cell testing setup b) iR-corrected Polarization curves and c) Tafel slope analysis of (NiCo)$_3$Se$_4$ and (NiCo)Se after cryomilling (dashed lines), and after surfactant assisted ball milling (solid lines with points) compared to binary Ni—Se and Co—Se (solid lines). d) The electrochemical activity of (NiCo)$_3$Se$_4$ and (NiCo)Se compared to state-of-the-art IrO$_2$ and NiFe with respect to current density normalized by ECSA at 300 mV overpotential (left axis, red) and overpotential at 10 mA·cm$^{-2}$ normalized by geometric area. Electrochemical Roughness Factor (RF) values for each catalyst are noted at the top of the bar. All catalysts were deposited on glassy carbon with a loading of 0.21 mg·cm$^{-2}$. All tests were done in 1M Fe-free KOH electrolyte.

For electrochemical testing, a three-electrode custom-made Teflon cell to avoid contamination from glassware etching was constructed and used 1M Fe-free KOH to rule out the contribution of Fe ions in the electrolyte on the activity and stability of the electrocatalysts (see FIG. 14a). Hg/HgO was used as a reference electrode and Pt mesh were used as the counter electrode. The electrocatalysts were deposited on a 3 mm glassy carbon electrode (GCE) and tested using the protocol detailed below. Linear sweep voltammetry (LSV) was used to evaluate the overpotential at 10 mA·cm$_{geo}^{-2}$ for binary Ni/Co—Se electrocatalysts and ternary Ni—Co—Se electrocatalysts after just cryomilling (cryo) and after the second milling step (SABM) to produce nano-sized electrocatalysts (FIG. 14b). The performance of Ni—Co—Se nanoparticle electrocatalysts after SABM dramatically improved due to the high surface-to-volume ratio. Also, alloying Ni and Co in the electrocatalyst lowered the overpotential requirements compared to NiSe and CoSe alone by at least 50 mV confirming that Ni and Co have synergistic effects when alloyed together. The best performance was seen for (NiCo)$_3$Se$_4$ SABM with an overpotential of 268±2 mV at 10 mA·cm$_{geo}^{-2}$ and a Tafel slope of 42 mV·dec$^{-1}$$_2$ (see FIG. 14 and Table 10). The Tafel slope of (NiCo)Se changed from 65 mV·dec$^{-1}$ after cryomilling to 50 mV·dec$^{-1}$ after SABM while for (NiCo)$_3$Se$_4$ it changed from 79 mV·dec$^{-1}$ after cryomilling to 42 mV·dec$^{-1}$ after SABM (FIG. 14c). This improvement in the OER kinetics for SABM samples suggested that the rate determining step (RDS) was changed, in Krasil'shchikov reaction mechanism, from reaction step 2 (M+OH$_{ads}$+OH$^-$→O$_{ads}$+H$_2$O, 60 mV·dec$^{-1}$) to reaction step 3 (M+O$^-$$_{ads}$=MO+e$^-$, 40 mV·dec$^{-1}$); this change in RDS can be ascribed to the increased concentration of active sites for samples after SABM. Tafel slope values higher than 60 mV·dec$^{-1}$ can be a result of either a mixed state between reaction step 2 and reaction step 1 (OH$^-$→M+OH$_{ads}$+e$^-$, 120 mV·dec$^{-1}$) or an increased surface coverage of adsorbents. From now on in this section of the present description, the work will refer to (NiCo)$_3$Se$_4$ SABM and (NiCo)Se SABM as (NiCo)$_3$Se$_4$ and (NiCo)Se (without the suffix).

To examine the specific catalytic activity, we normalized the current density by the electrochemical surface area (ECSA) using double layer capacitance measured by cyclic voltammetry (CV). (NiCo)$_3$Se$_4$ demonstrated ECSA current densities 44 times higher than NiFeOOH (prepared by Sol-Gel) and 4 times higher than commercial IrO$_2$ using the same catalyst loading of 0.21 mg·cm$^{-2}$ for all electrocatalysts. The turnover frequency (TOF) of (NiCo)$_3$Se$_4$ was calculated as 50.76×10$^{-3}$ s$^{-1}$ per site, considering only Ni and Co as active sites, ca. two folds higher than IrO$_2$ 28.09×10$^{-3}$ and NiFe 23.98×10$^{-3}$ s$^{-1}$ per site inferring that (NiCo)$_3$Se$_4$ is intrinsically more active.

Figure 19:
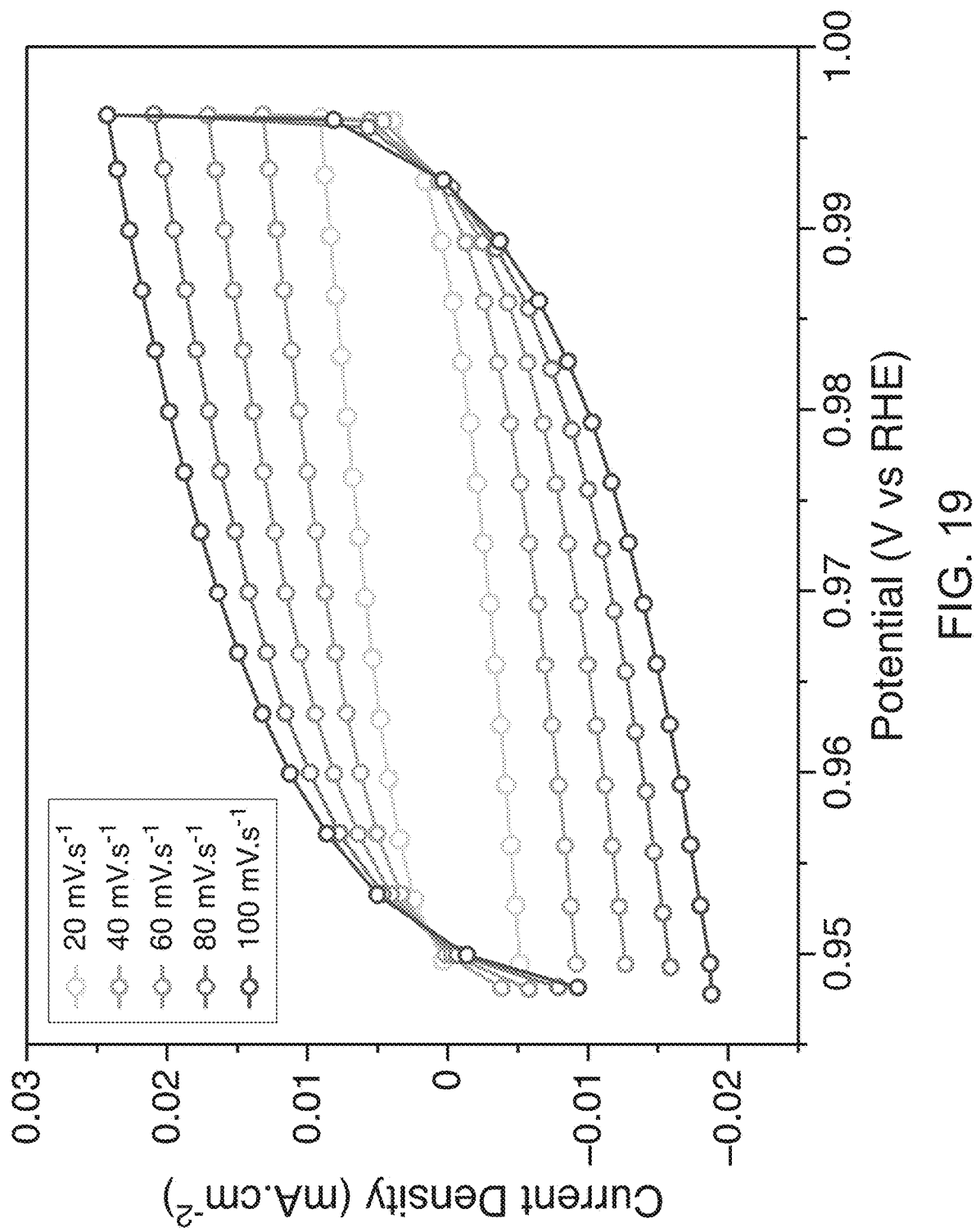
FIG. 19: Cyclic voltammetry done on $(NiCo)_3Se_4$ to calculate double layer capacitance ($C_{dl}$) for electrochemical surface area (ECSA) calculations.
Figure 20:
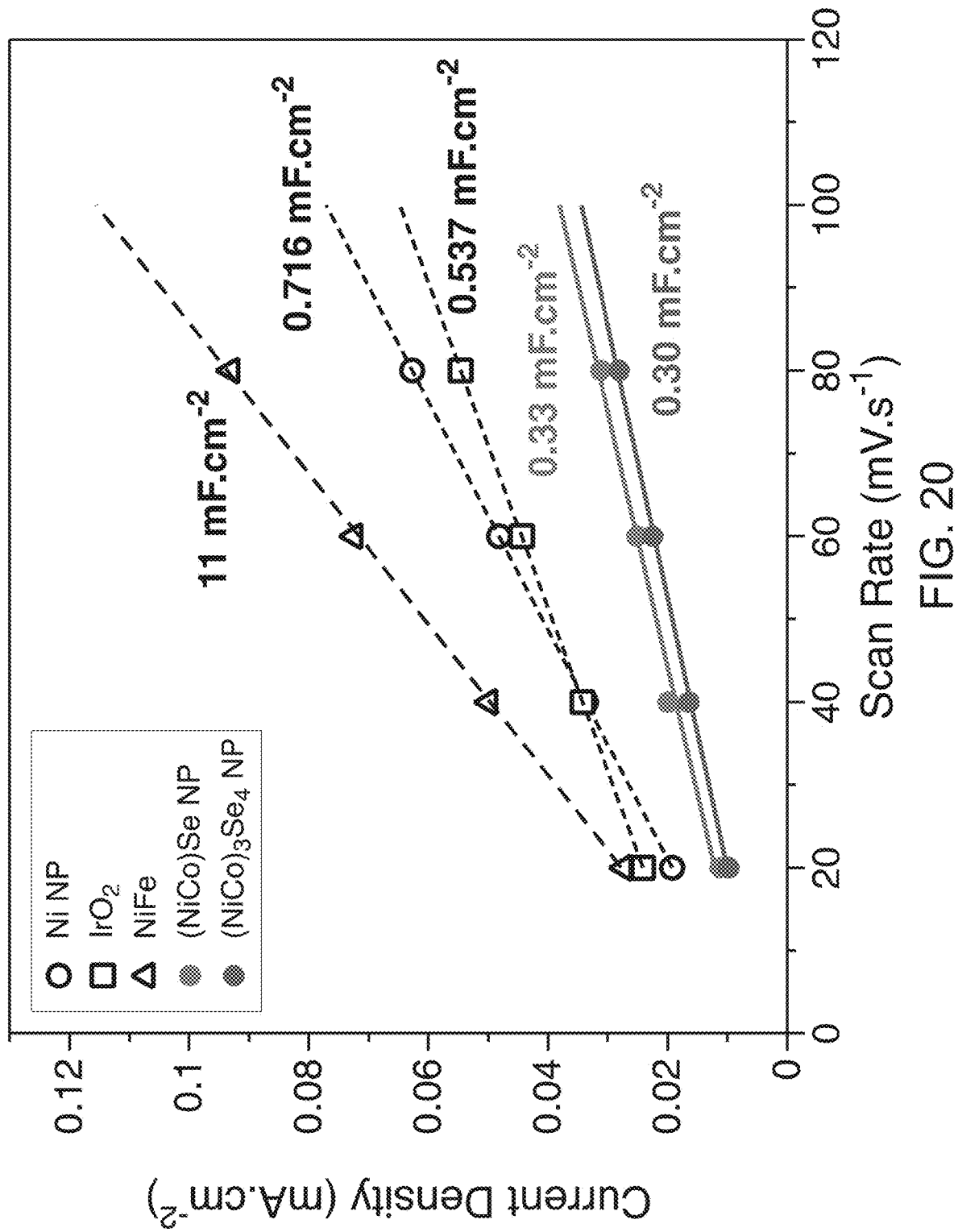
FIG. 20: Capacitive current vs scan rate for $(NiCo)_3Se_4$, (NiCo)Se, Ni NPs, $IrO_2$ and NiFe.

To this point, the description has presented electrochemical current densities normalized by geometric area, to examine the real catalytic activity the study normalized the current density by the electrochemical surface area (ECSA) extracted from cyclic voltammetry (CV) scans (see FIG. 19 and FIG. 20). The current density normalized by ECSA at 300 mV overpotential and roughness factor (RF) were used to compare the intrinsic activity of the electrocatalysts (FIG. 14d). All the electrocatalysts were prepared in-house and have a mass loading of 0.21 mg·cm$^{-2}$. (NiCo)$_3$Se$_4$ demonstrated ECSA current densities at least 44 times higher than NiFe (prepared by Sol-Gel) and 4 times higher than IrO$_2$. The low roughness factor values for electrocatalysts suggest that Ni and Co sites are intrinsically active but also not completely accessible. This can be due to particle agglomeration during milling or activation restricting the OER reaction to a smaller surface area. This can be potentially optimized in the future to improve the performance of the electrocatalyst further beyond what is presented in this document.

The turnover frequency (TOF) of (NiCo)$_3$Se$_4$ was calculated as 50.76×10$^{-3}$ s$^{-1}$ per site, considering only Ni and Co as active sites, ca. two folds higher than IrO$_2$ 28.09×10$^{-3}$ and NiFe 23.98×10$^{-3}$ s$^{-1}$ per site inferring that (NiCo)$_3$Se$_4$ is intrinsically more active.

Figure 15:
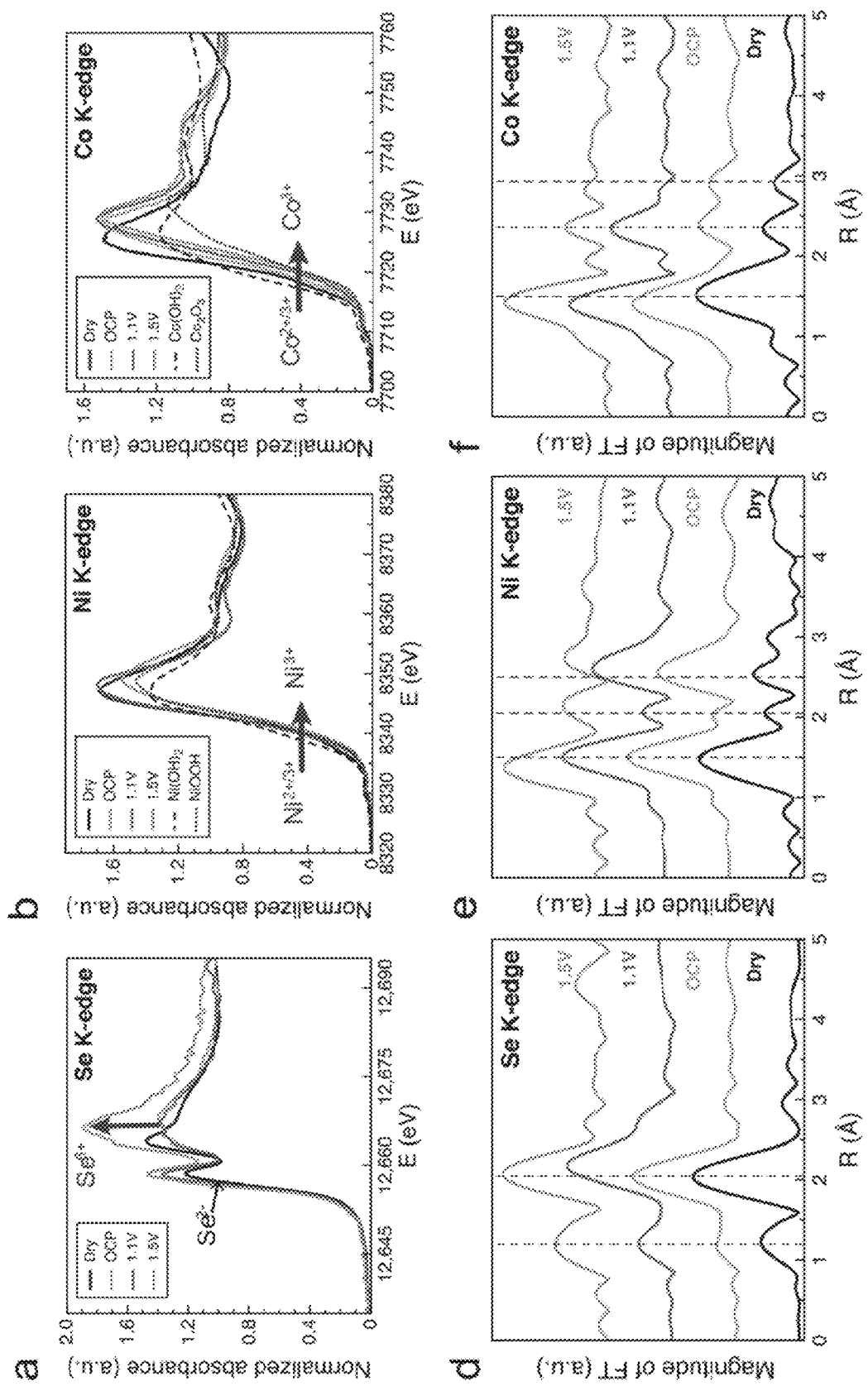
FIG. 15: In situ XANES K-edge of a) Se, b) Ni, and c) Co of (NiCo)$_3$Se$_4$ during OER. In situ EXAFS radial distribution function of d) Se. e) Ni, and f) Co of (NiCo)$_3$Se$_4$ during OER. All tests were done in 1M KOH.

To investigate the active species during OER and study the dynamics of the electrochemical activation of (NiCo)$_3$Se$_4$, in situ XAS on the K-edge of Ni, Co and Se was conducted at four conditions: dry, open circuit potential (OCP), before OER at 1.1 V, and during OER at 1.5V (see FIG. 15). The K-edge XANES was used to monitor the changes in oxidation state during OER for Ni, Co, and Se. The XANES results of the dry samples showed that Ni and Co have a mixed oxidation state of 2+/3+ suggesting that they exist in a spinel structure (FIGS. 15b and 15c), while Se shows a selenide (2-) edge confirming the sXAS findings that Se ions are incorporated in the spinel structure (FIG. 15a). The electrocatalyst was then placed in a custom-made three-electrode electrochemical cell with a window for X-rays and 1M KOH electrolyte. During OER, the absorption energy edge of Ni and Co continuously increased to higher energy values suggesting an increase in oxidation state to 3+ for both Ni and Co that is consistent with the electrochemical formation of NiOOH and CoOOH. The increase in the edge position of Ni was accompanied by a decrease in the white line intensity implying that the electrocatalyst evolved to a disordered octahedral structure upon oxidation. The XANES results were complemented by extended X-ray absorption fine structure (EXAFS) to investigate local structure changes in the vicinity of Ni and Co sites (FIG. 15e and FIG. 15f). Interatomic distances noted in the figures are shorter than real interatomic distances because Fourier Transform (FT) spectra were not phase corrected. The peaks at ~1.5 Å and ~2.5 Å corresponds to the single scattering path of Ni—O and Ni—Ni/Co/Se. The Ni—O shifts to the left at 1.38 Å during OER suggesting that Ni transforms only during OER to the active γ-NiOOH structure. Two peaks can be observed for Co in the dry sample at ~1.5 Å from Co—O, while the path from Co—Co/Ni/Se was observed at two distances ~2.5 A, and ~3 Å suggesting that Co occupies an octahedral site in the spinel structure. The Co—O peak at 1.43 Å confirms the formation of CoOOH nanosheets. During activation, Se was gradually oxidized to Se (VI) at 1.5V as evident in XANES by the emergence of the peak at 12,666 eV. The XAS signal of Se at OER was increasingly deteriorating which could possibly be owing to Se leaching out of the structure as SeO$_4^{2-}$. This was further confirmed EXAFS results which shows a progressive increase in the Se—O peak at 1.2 Å upon oxidation (FIG. 15d). In situ XAS results yet complements our findings from sXAS and supports the position that Se electrochemical deportation facilitated the evolution of Ni and Co to active oxyhydroxides during OER.

Figure 16:
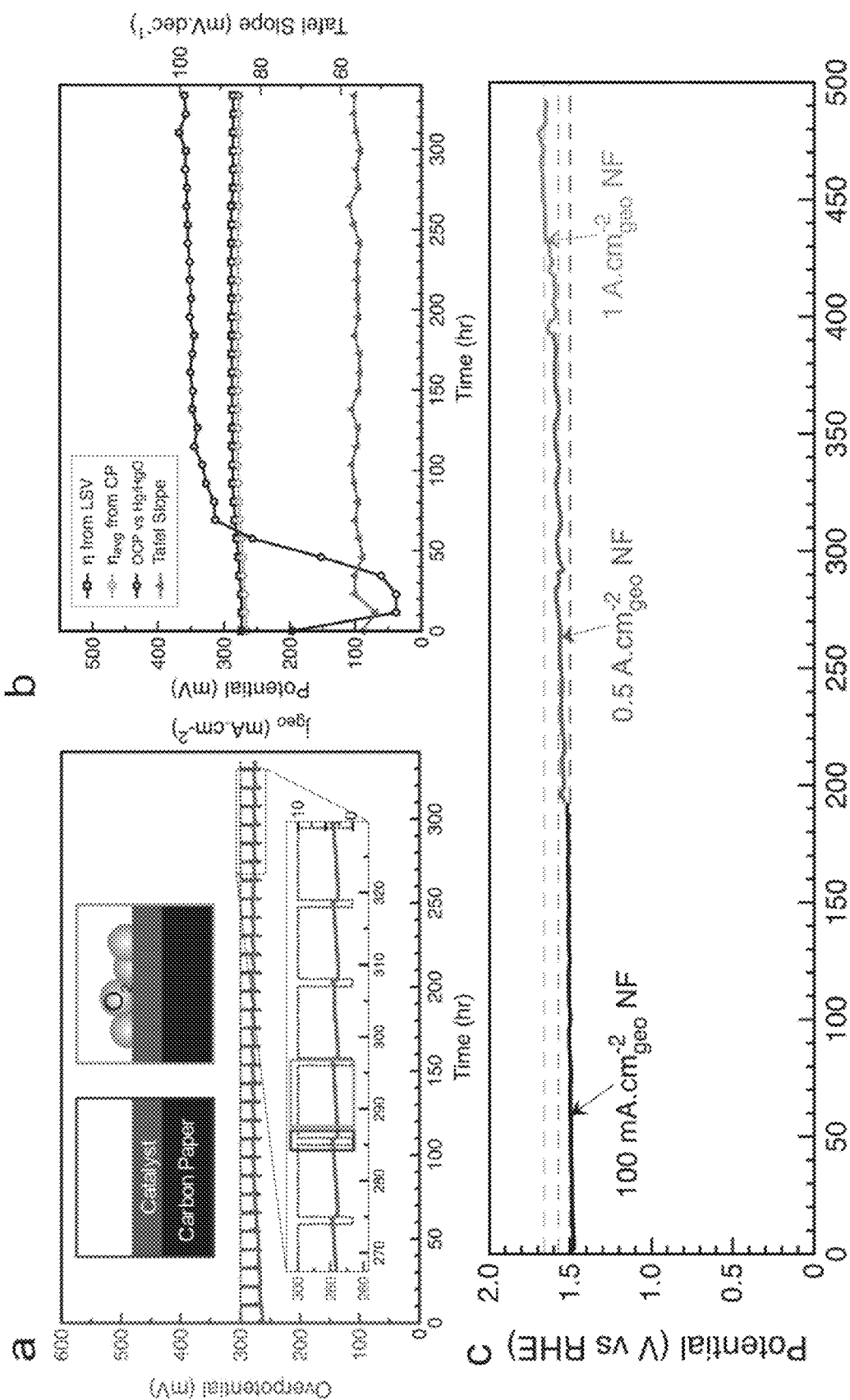
FIG. 16: (NiCo)$_3$Se$_4$NP was deposited on carbon paper (CP) and tested using (a) alternating stability test by applying a constant current density for 10 hours. Inset is a schematic illustration of O$_2$ bubble accumulation on catalyst surface during oxidation. b) a summary figure of the change in key electrochemical parameters every 10 hours during the stability test. (NiCo)$_3$Se$_4$NP was deposited on Nickel Foam (NF) and tested for e) long term stability at high current densities.

Stability is an important metric of performance for OER electrocatalysts. It is common to use rotating disk electrodes (RDE) at 1600 rpm to improve bubble release and reduce the influence of O$_2$ bubbles attached to the surface on the performance. However, the change in potential during RDE test was found to be not related to electrocatalyst degradation but rather to O$_2$ micro bubbles accumulating in the pores of electrocatalyst layer and shielding active sites. This is believed to explain the discrepancy between stability observations in RDE tests and membrane electrode assembly (MEA) cells. Hence, in the present work a protocol was proposed to evaluate the stability of the present electrocatalysts first by using an alternating current test (FIG. 16a) and then followed by the conventional high current density (>100 mA. cm$_{geo}^{-2}$) stability tests on nickel foam (NF) support (FIG. 16c). In the first test, using chronopotentiometry (CP) a constant current density of 10 mA·cm$_{geo}^{-2}$ was applied to (NiCo)$_3$Se$_4$ on carbon paper for 10 h and then the electrocatalyst was left to rest at OCP for 1 h before running LSV; this resembles one cycle of testing (FIG. 16a). A continuous Ar bubbling was used during the test to reduce O$_2$ saturation in the electrochemical cell and improve bubble release from the surface of the electrocatalyst which can significantly influence the performance. The potential very slowly increased during the first few hours of CP test in each cycle because of bubble accumulation on the surface, however the initial potential was retained in the following cycle suggesting that bubbles were partially or completely released. The alternating current test was repeated for 34 cycles (340 hours of operation) to evaluate the stability of the electrocatalyst. For each cycle, the overpotential was extracted from both CP and LSV tests, Tafel slope was evaluated using LSV, and the OCP was noted at the first hour of every cycle. All of the extracted parameters were plotted with respect to time (FIG. 16b). The OCP within the first five cycles drastically changed before plateauing suggesting that the nature of the electrode/electrolyte interface changed and a stable dense layer of oxidehydroxides was formed. The electrocatalyst experienced a marginal increase in overpotential (<10 mV) during the entire test while the Tafel slope remained unchanged suggesting that the reaction mechanism was not altered. This test was used as an attempt to reduce the effect of bubble attachment on stability measurements and to evaluate the stability of our electrocatalyst at 10 mA·cm$_{geo}^{-2}$.

Figure 21:
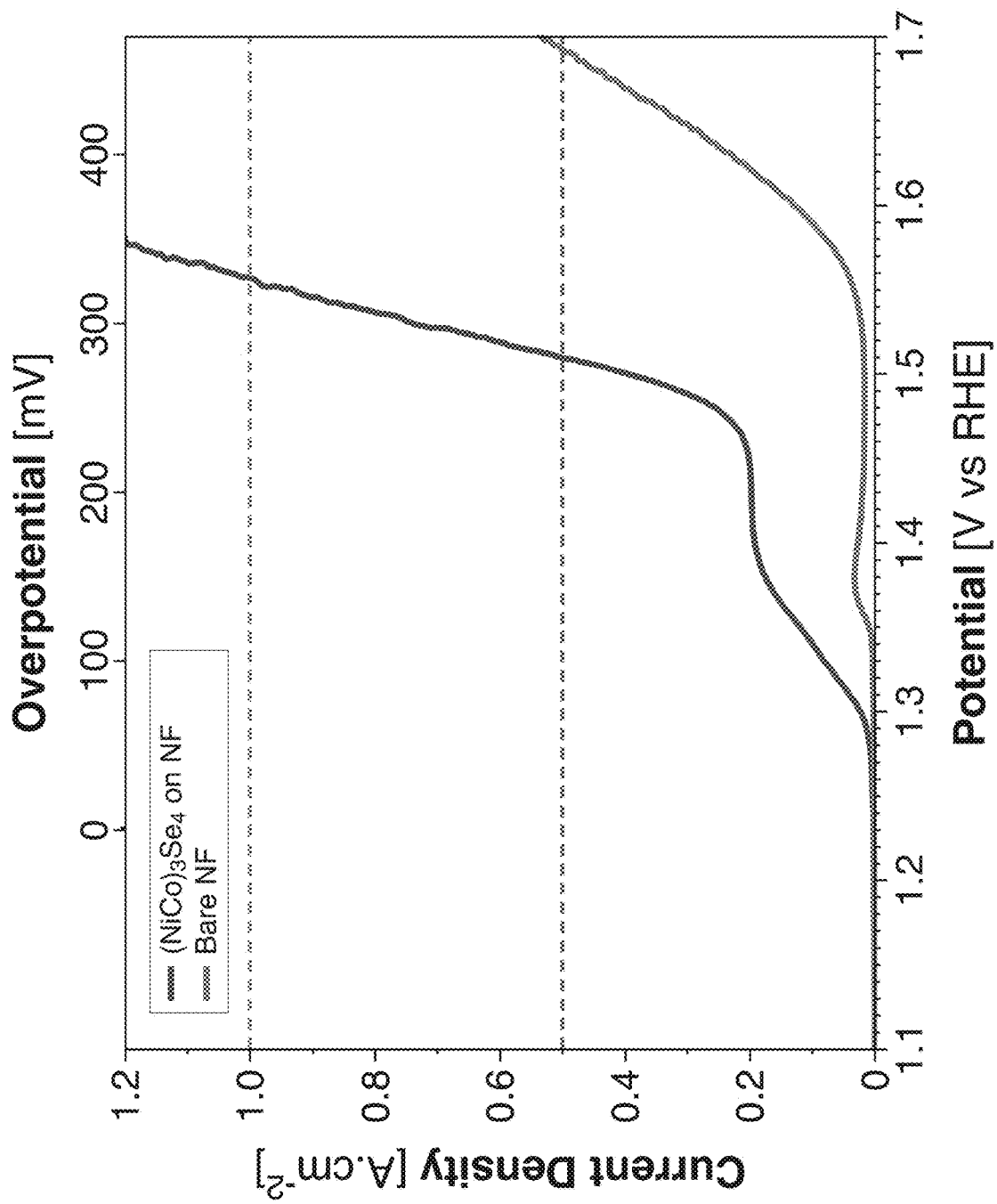
FIG. 21: Polarization curve of $(NiCo)_3Se_4$ on NF and bare NF.
Figure 22:
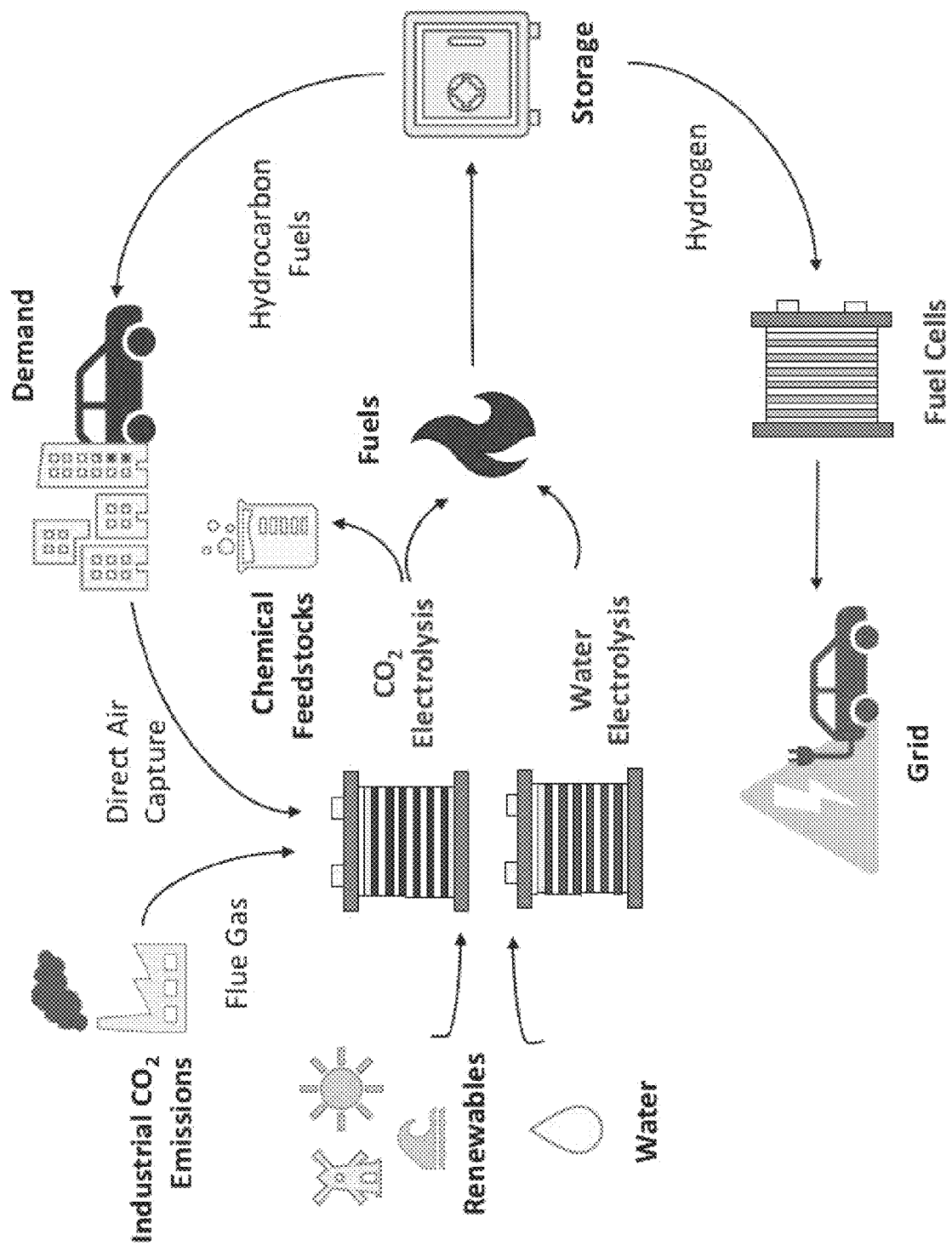
Figure 24:
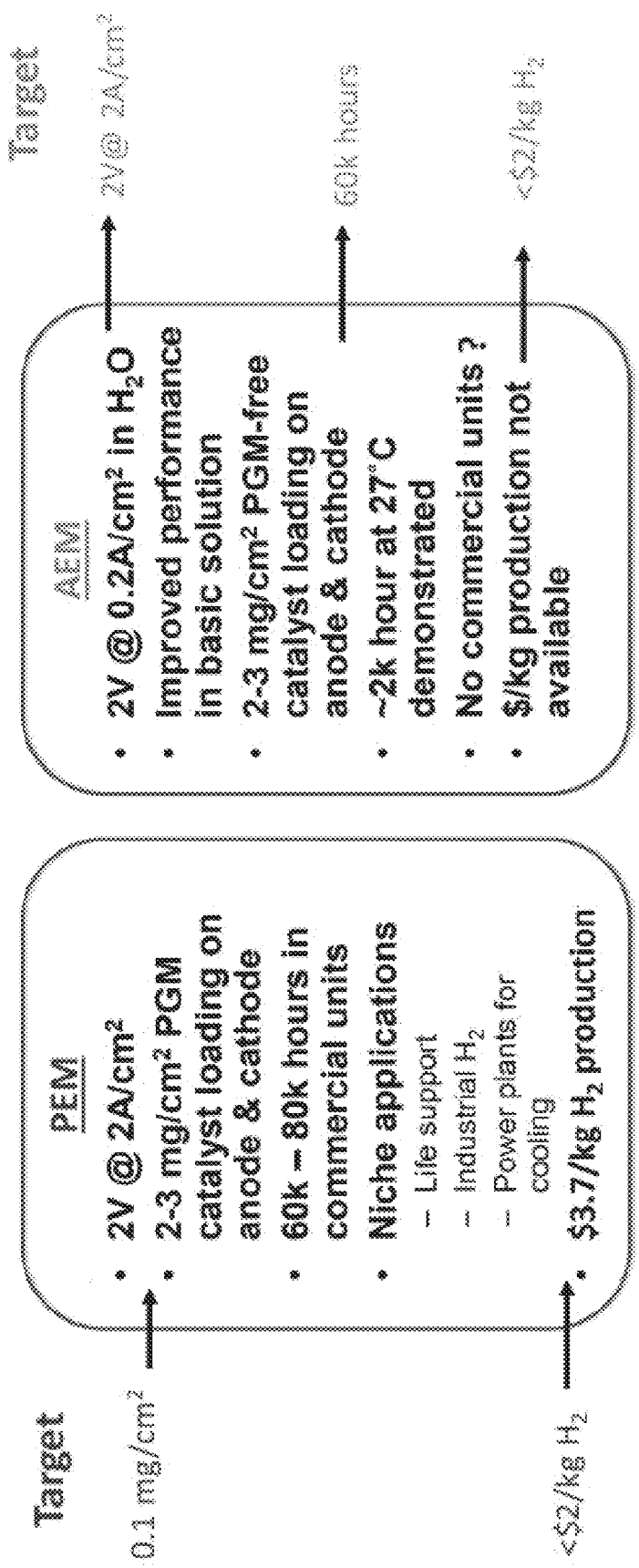
Figure 25:
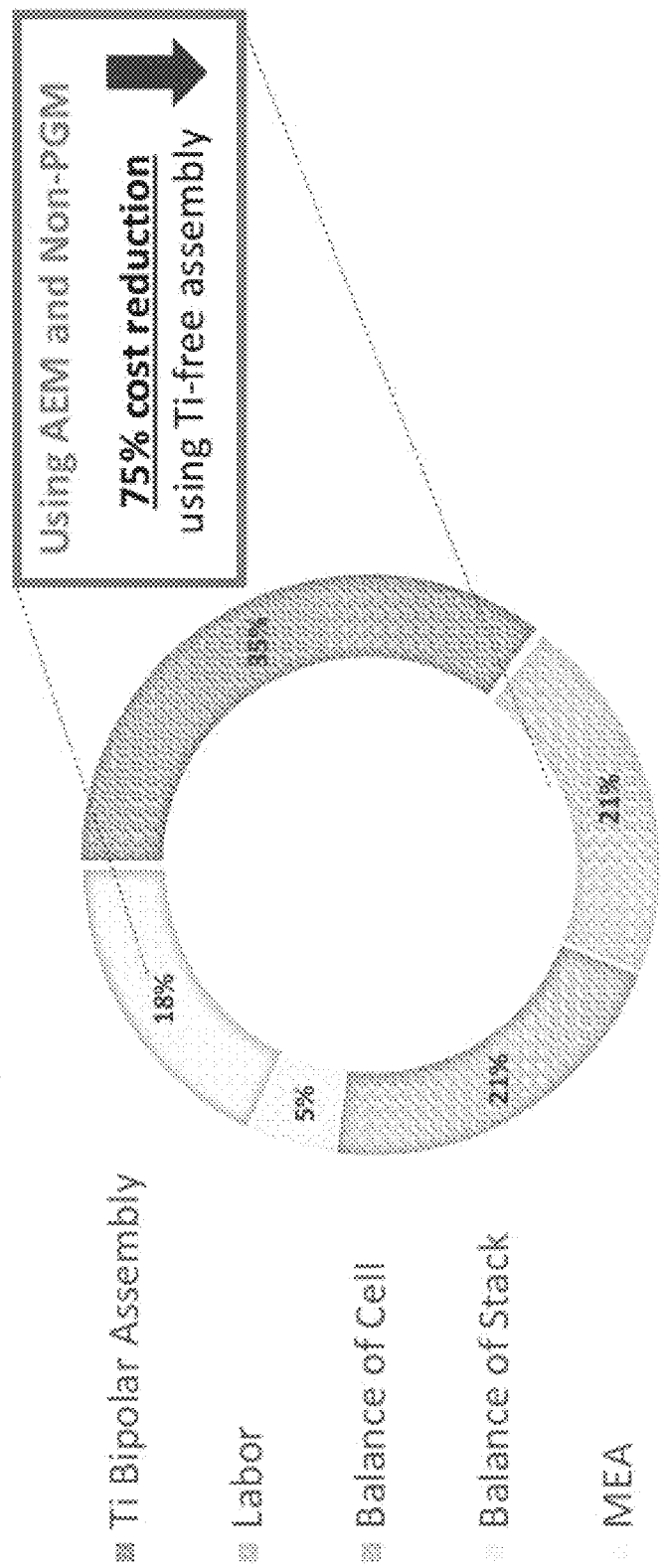
Figure 26:
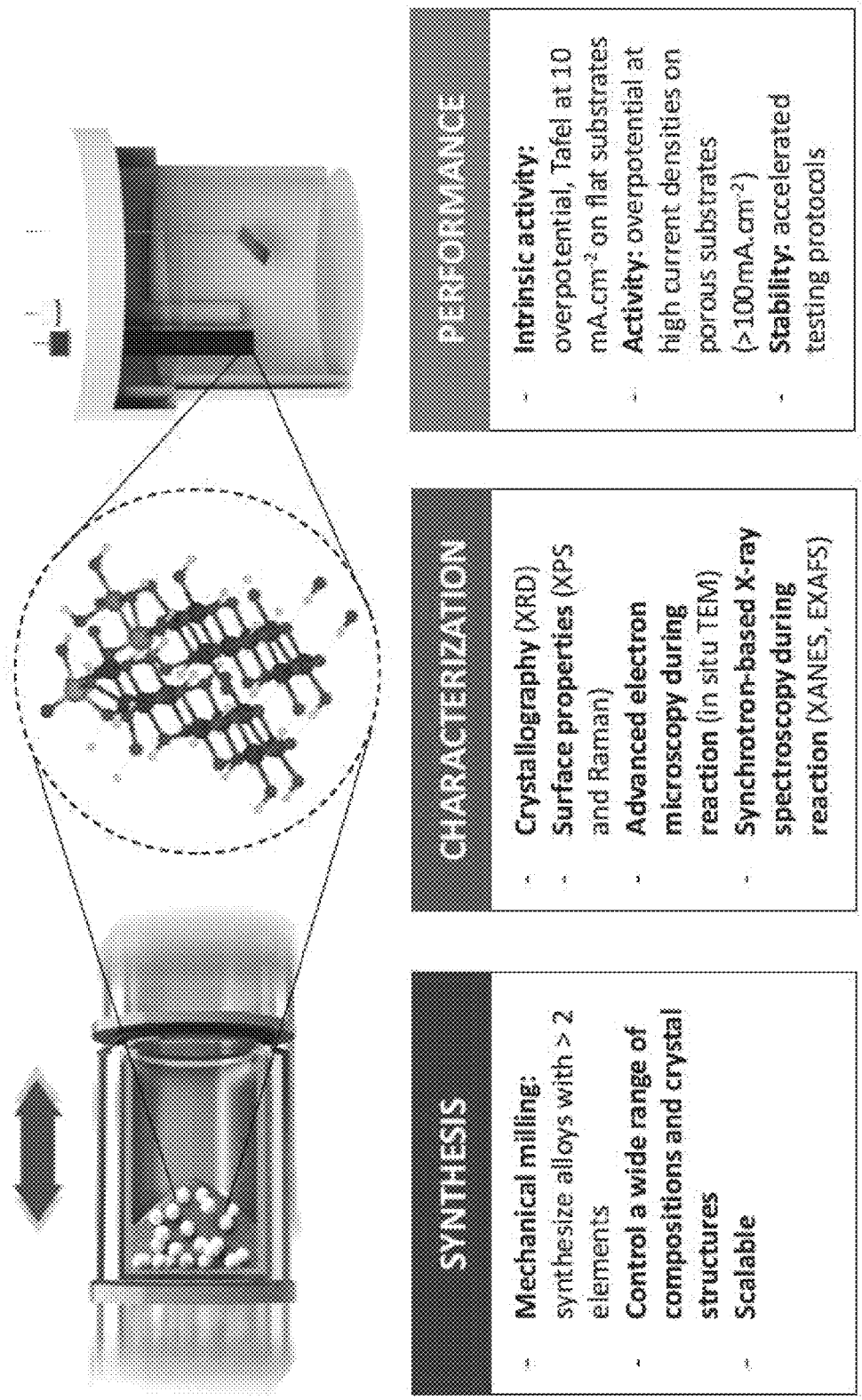
Figure 27:
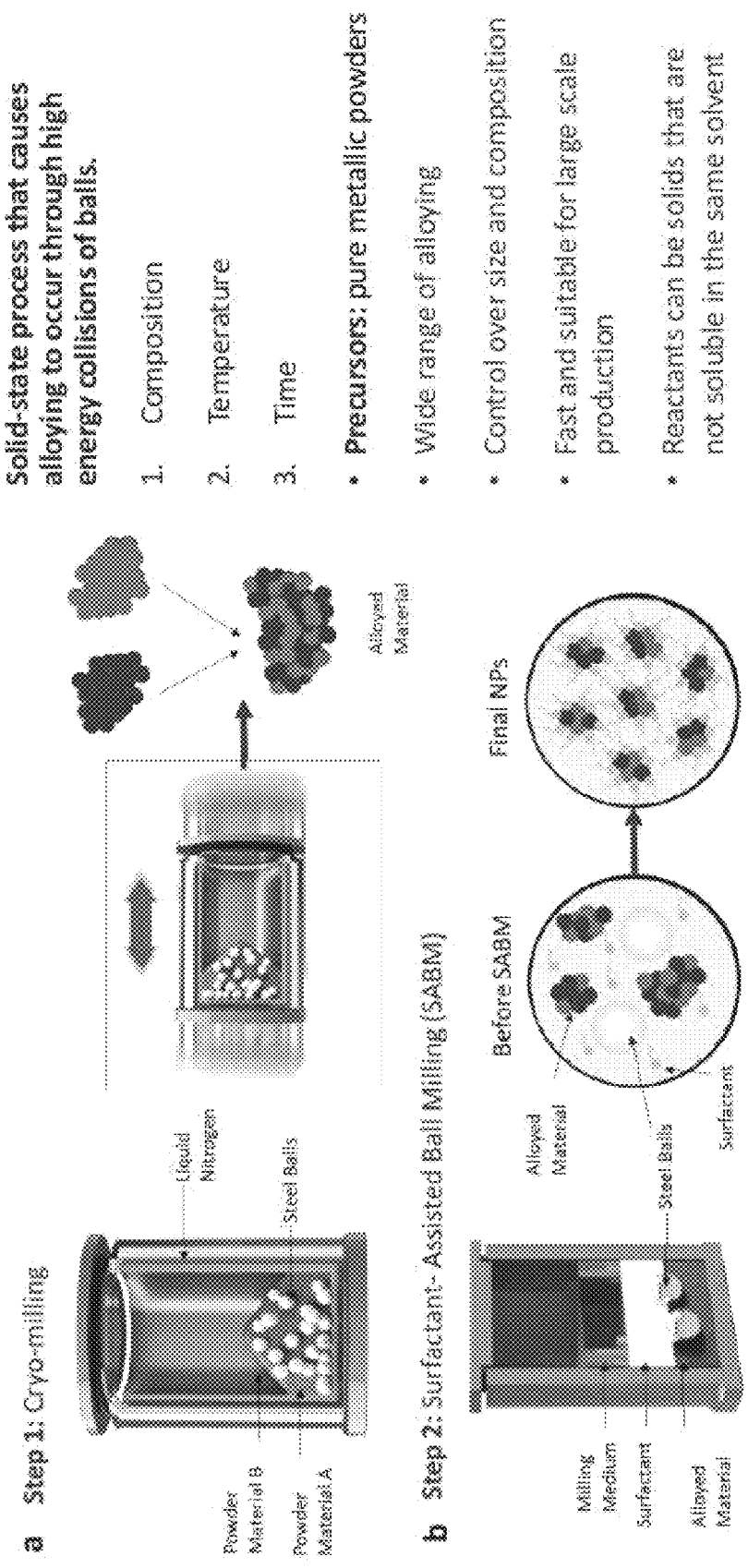
Figure 29:
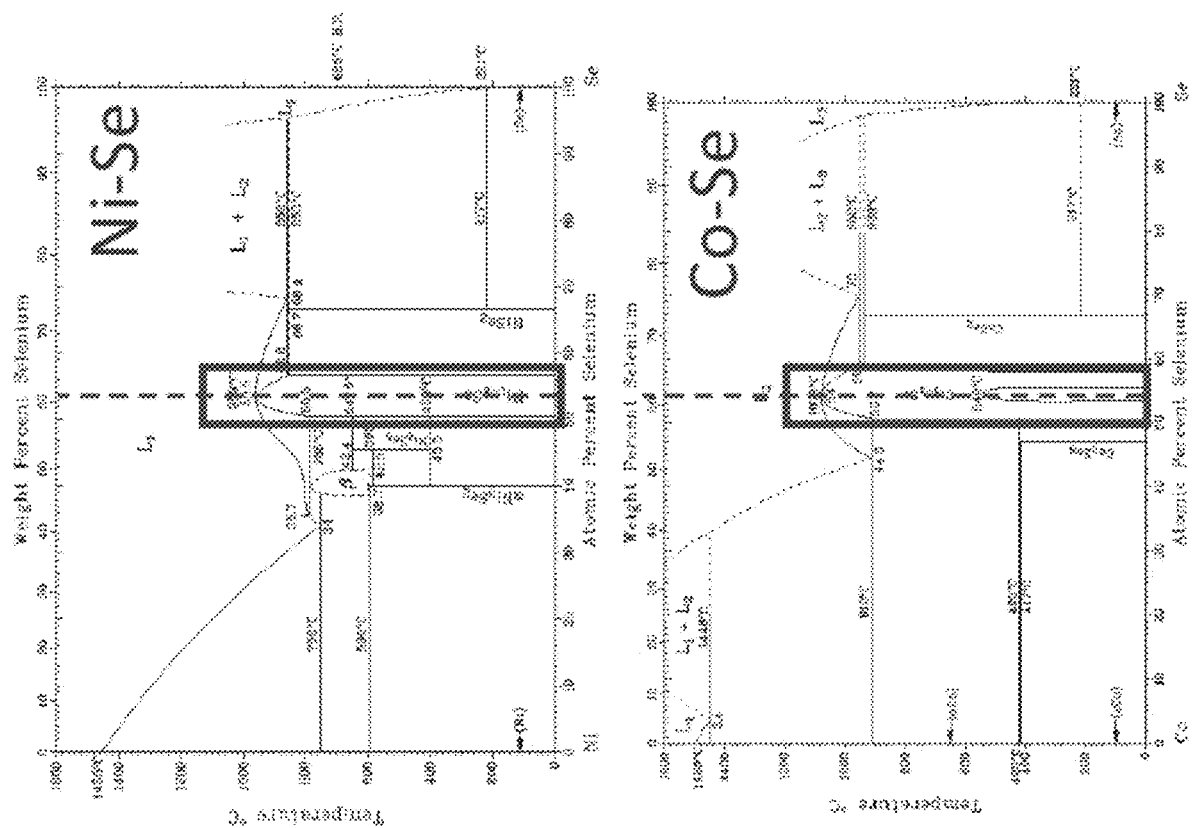
Figure 30:
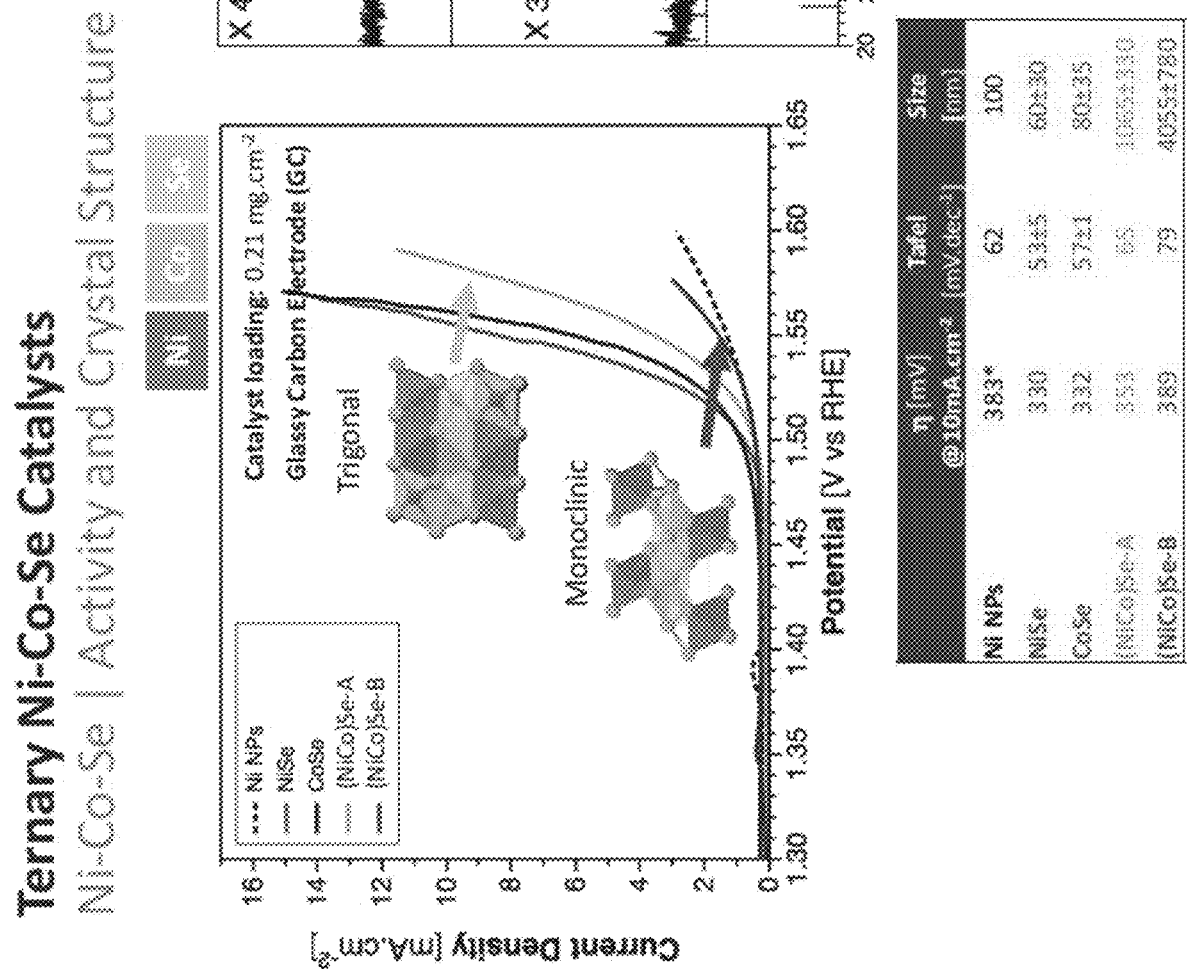
Figure 32:
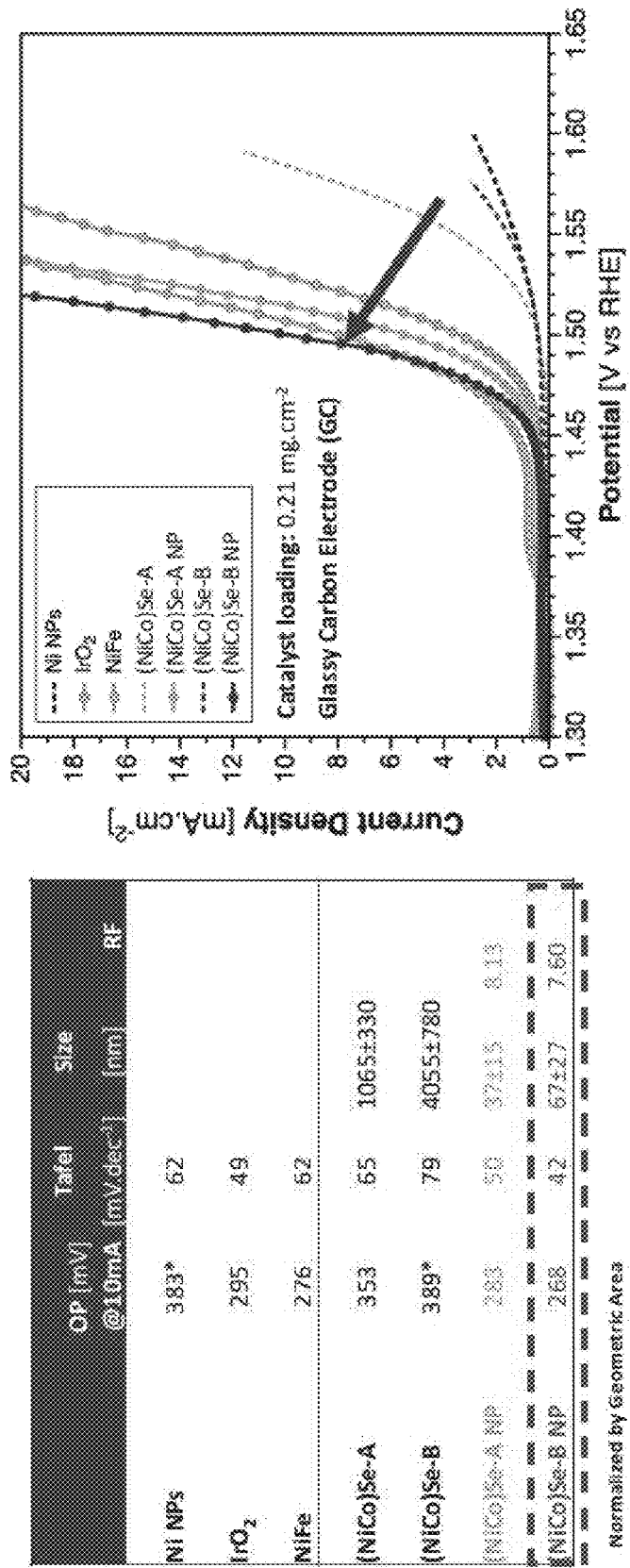
Figure 33:
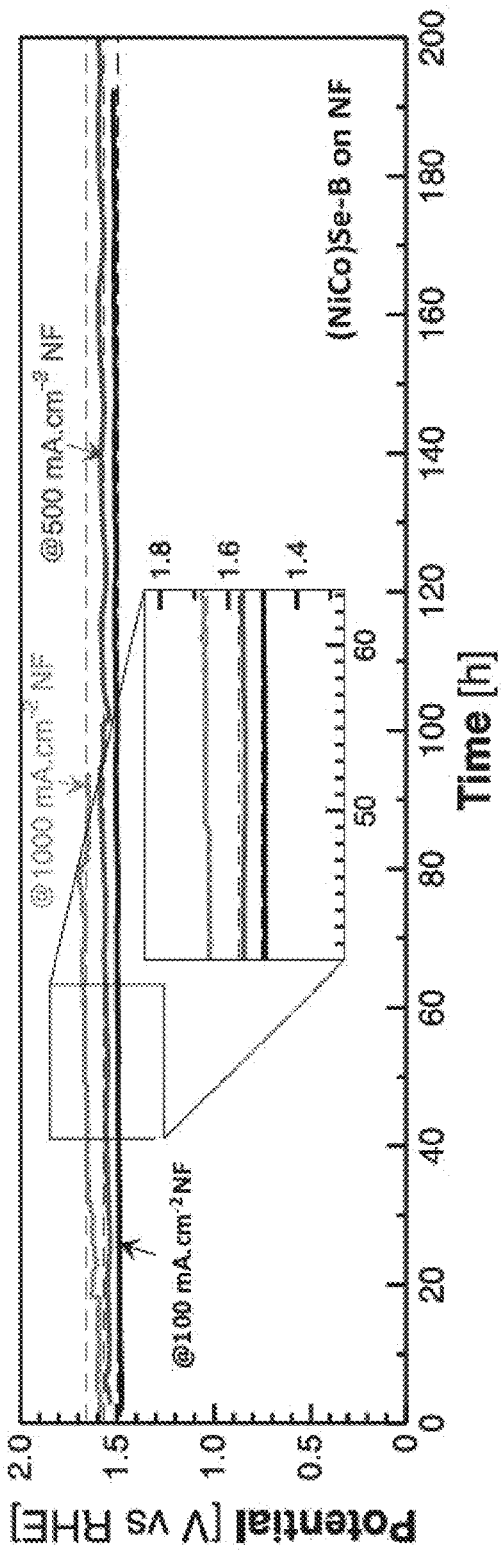
Figure 35:
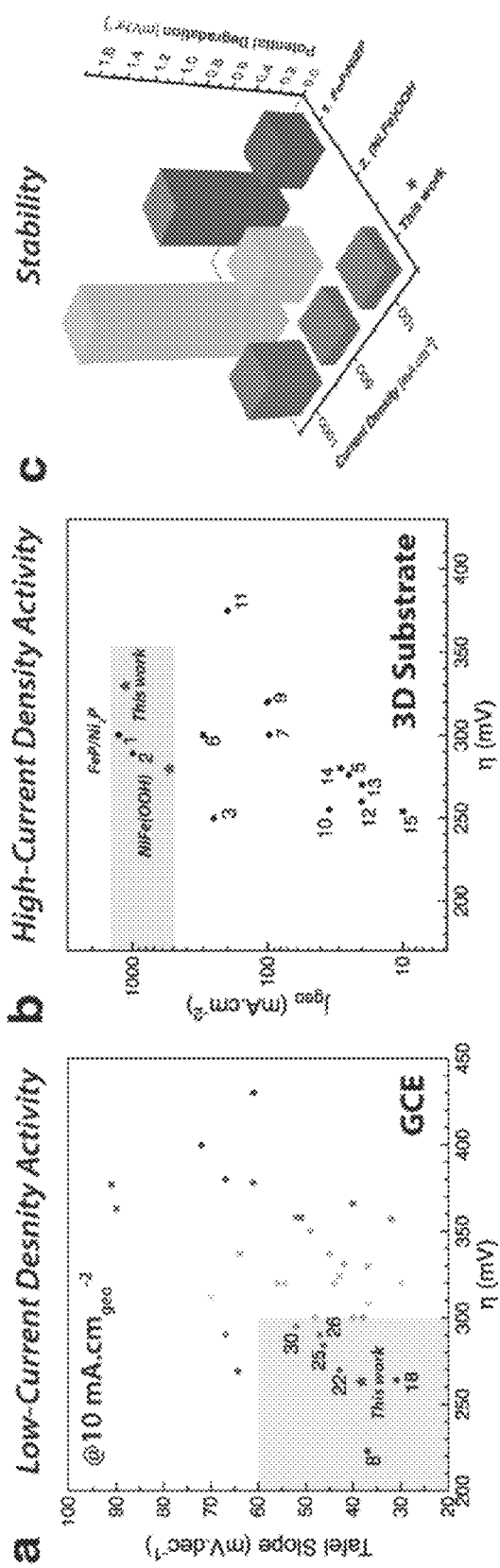
Figure 36:
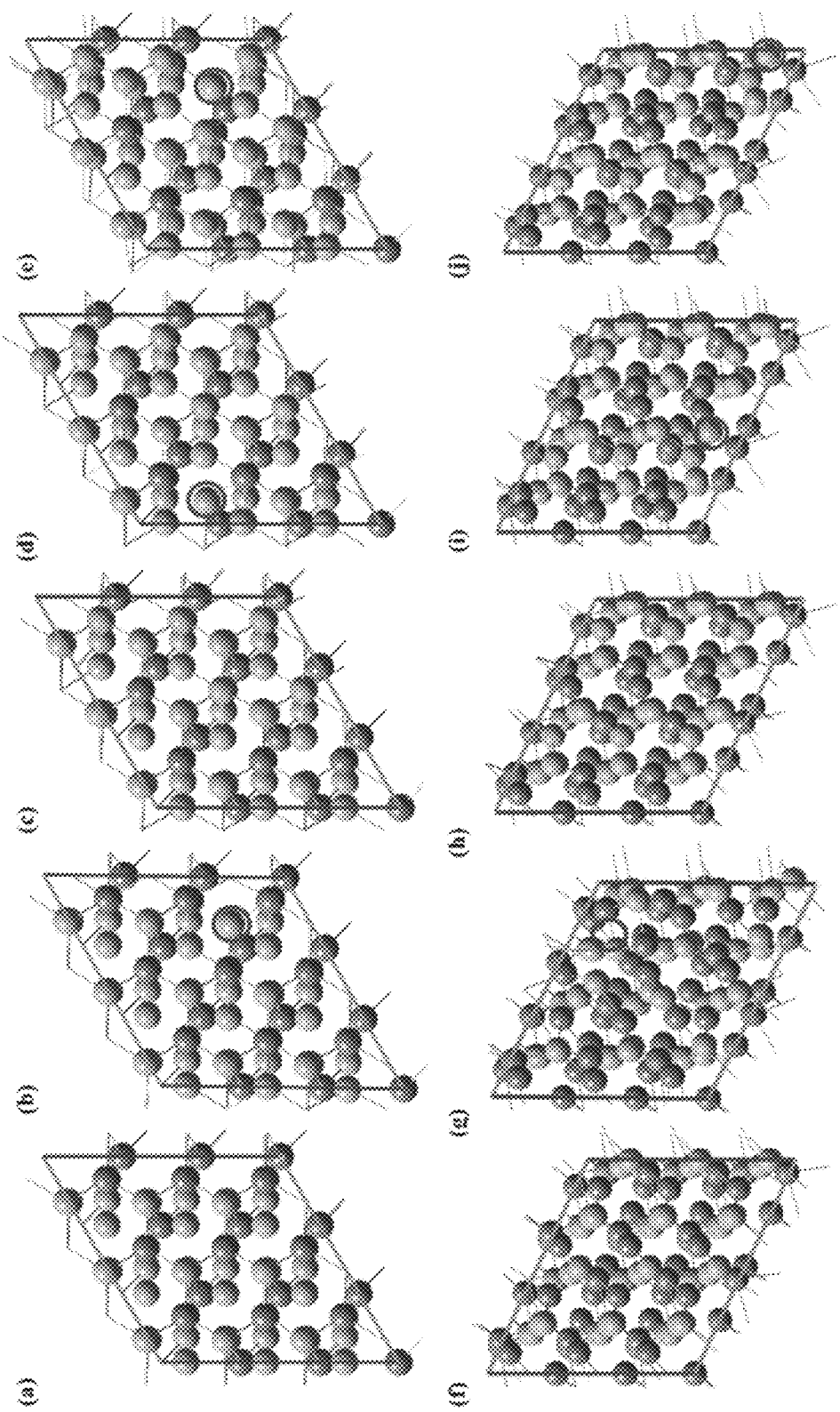
Figure 37:
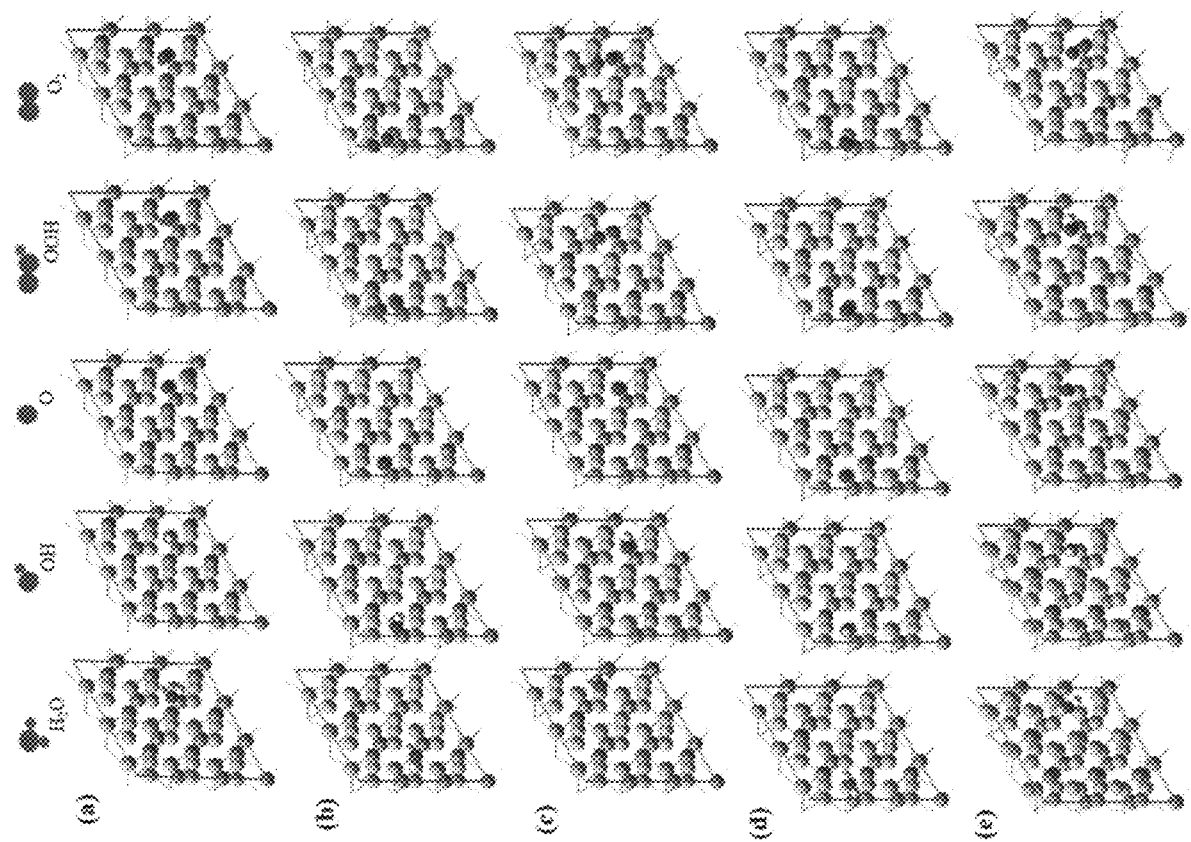
Figure 38:
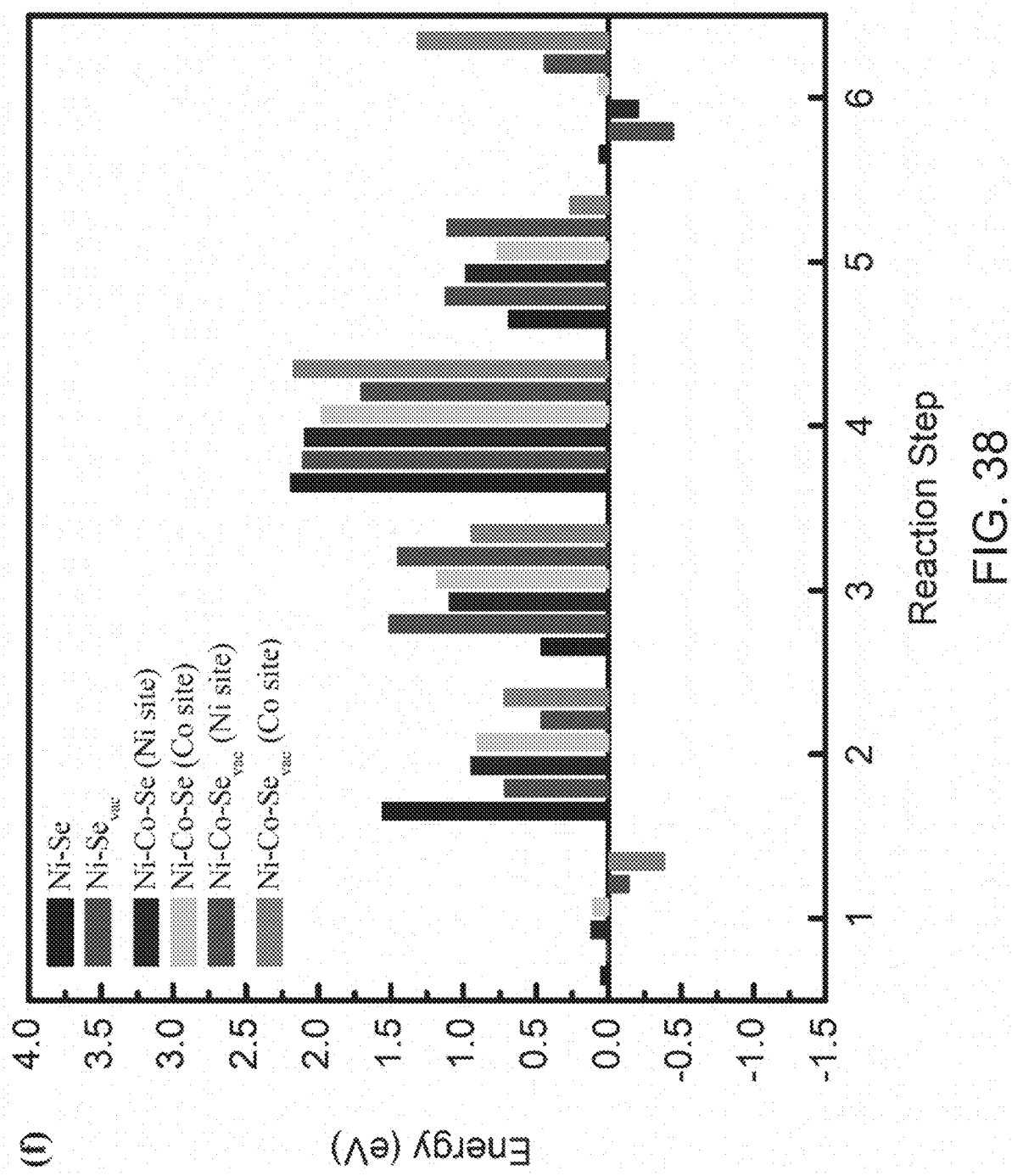
Figure 39:
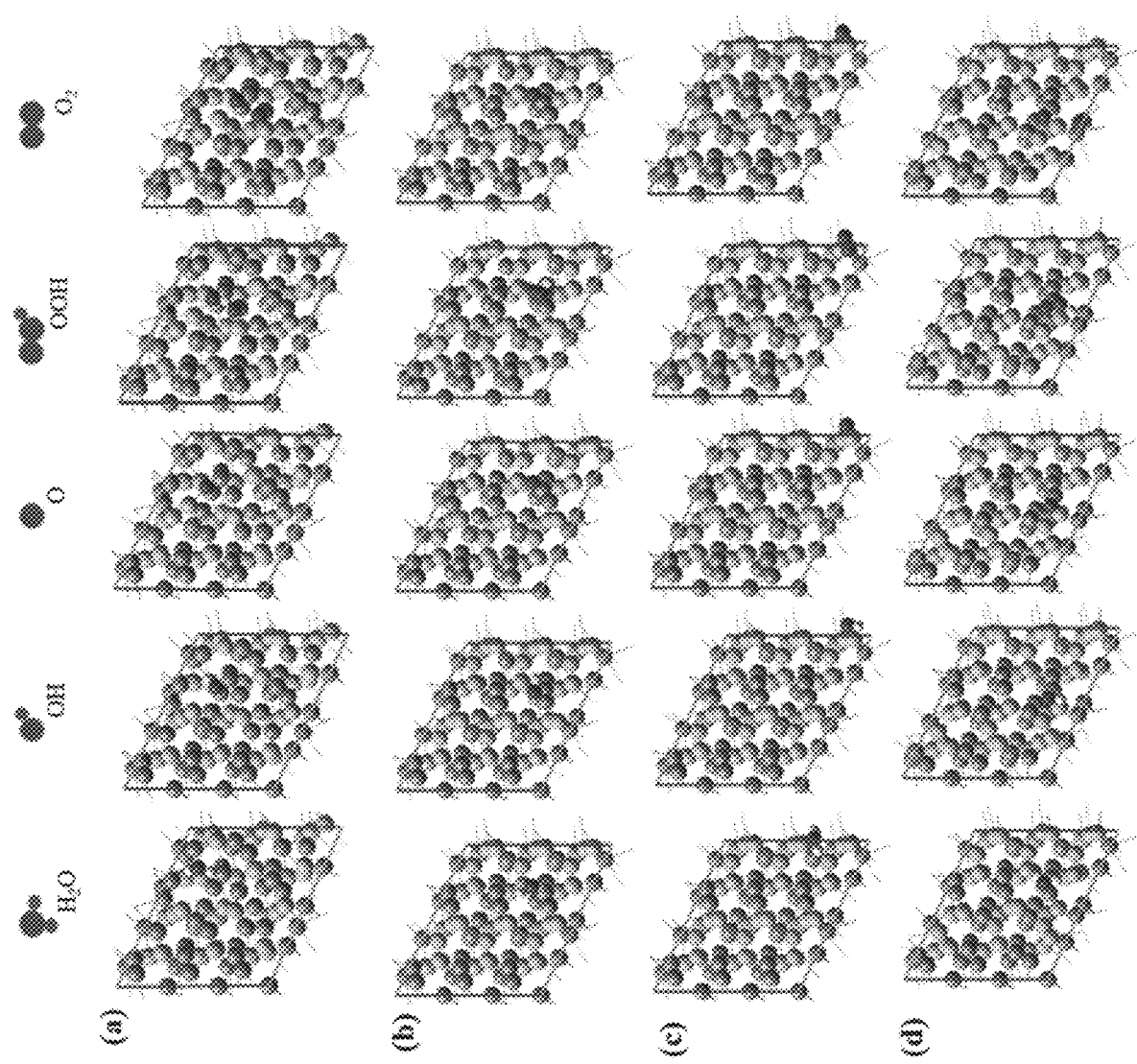
Figure 40:
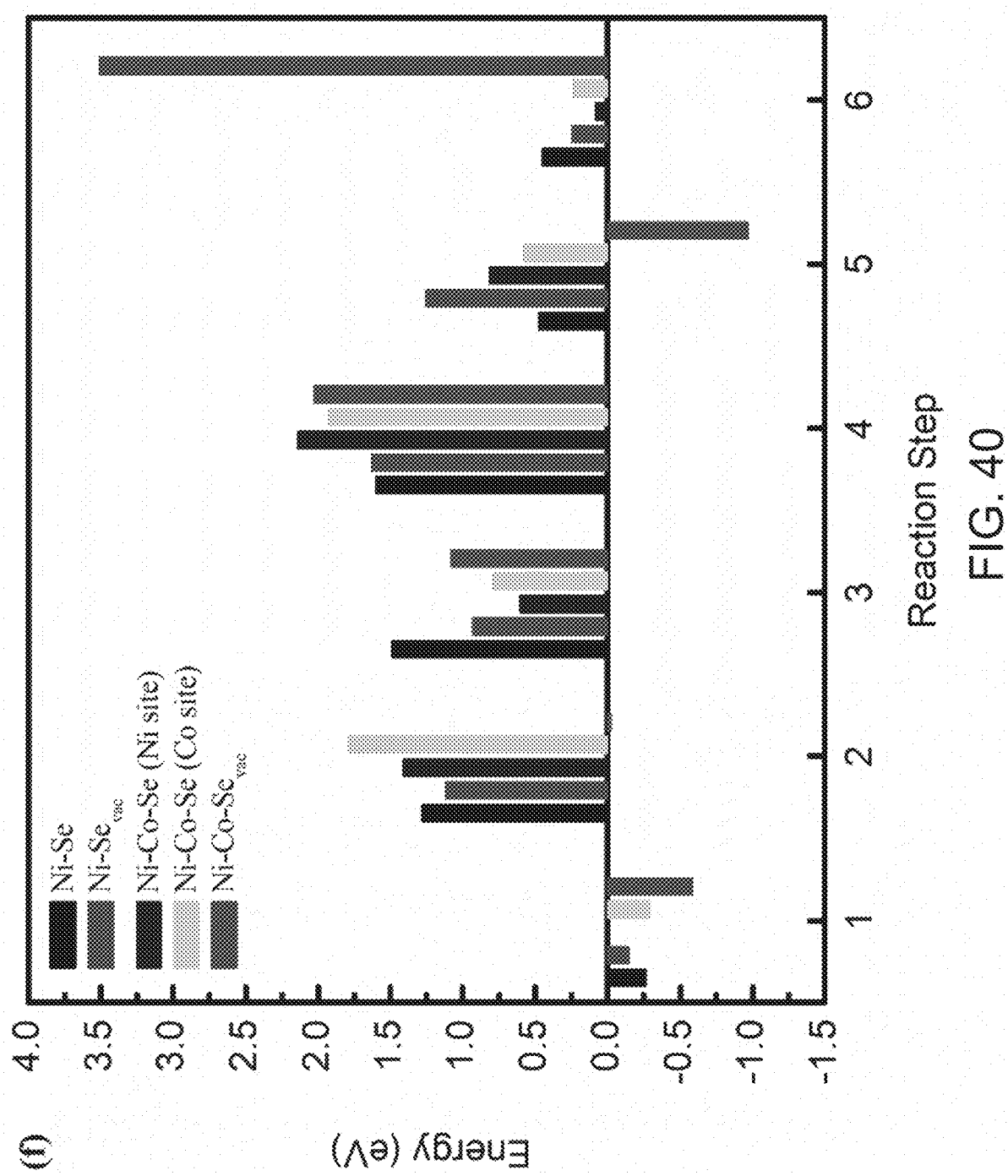
Figure 41:
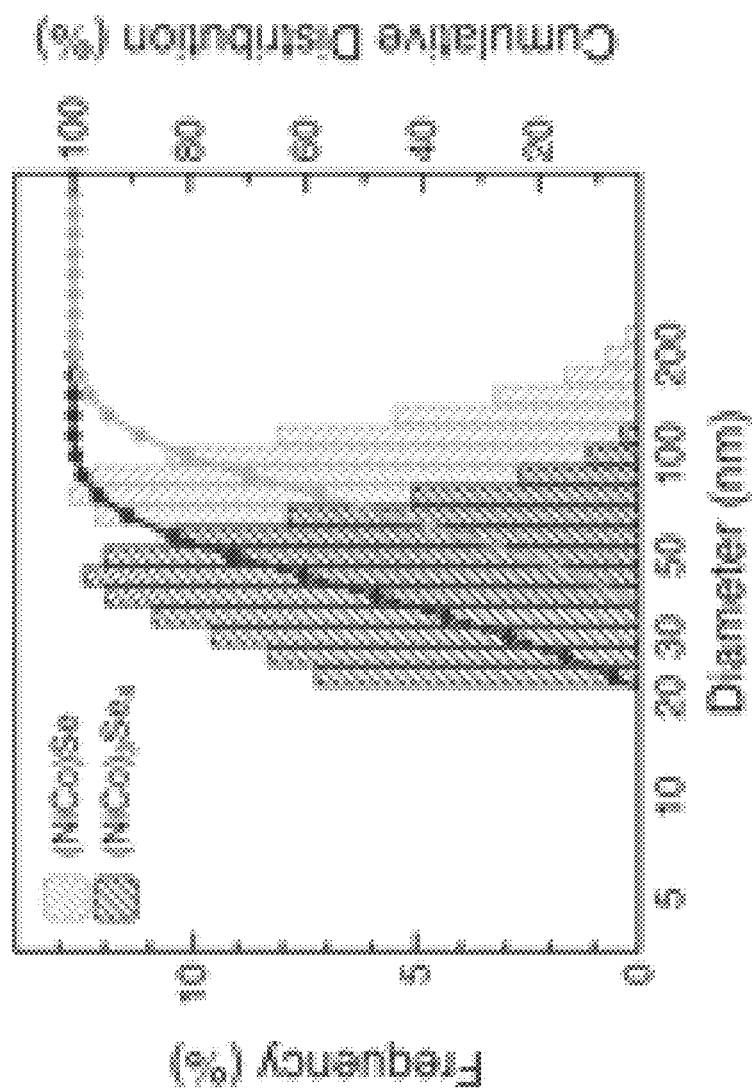
Figure 42:
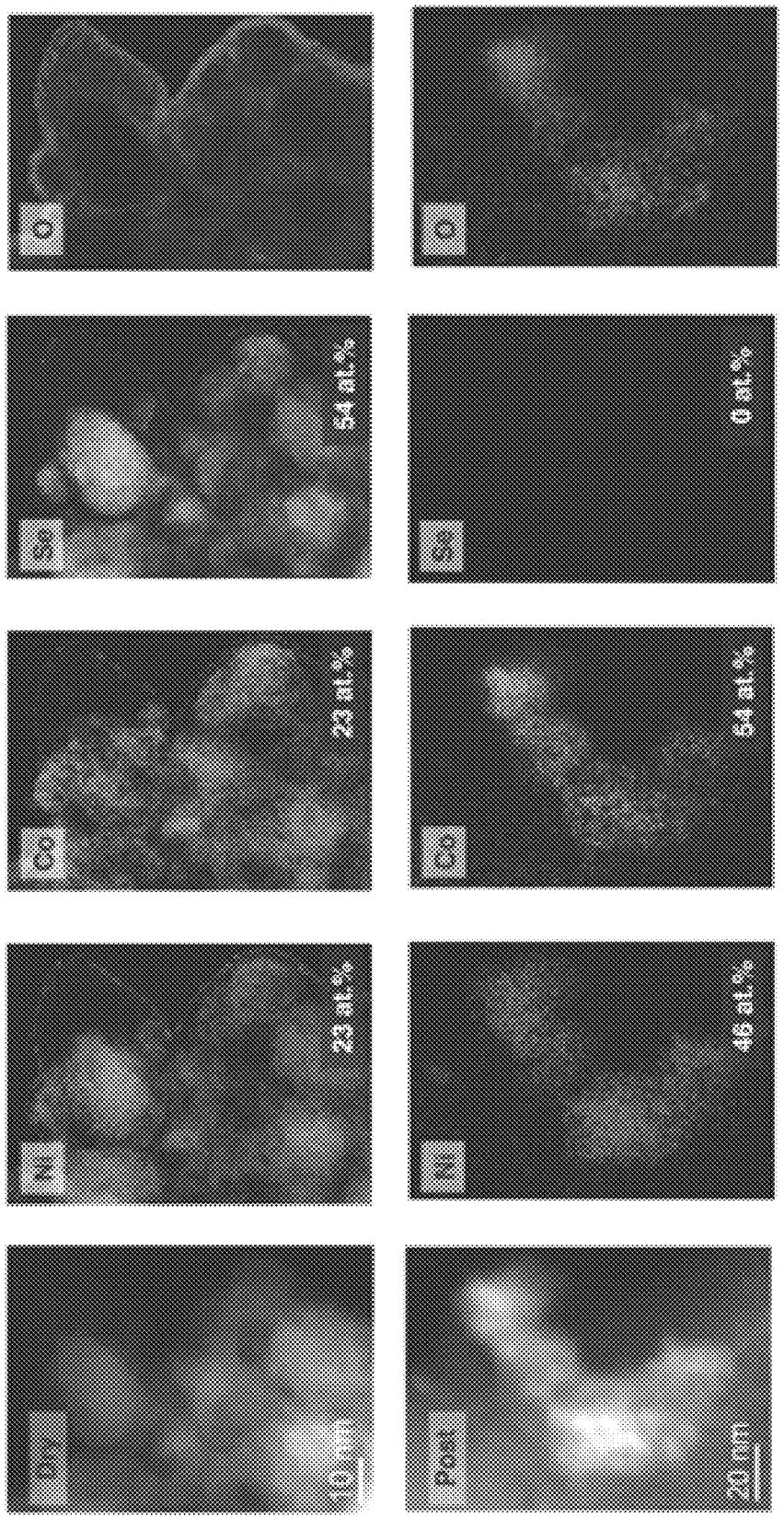

The electrocatalyst was then deposited by drop-casting on a 0.5 cm×0.5 cm NF with a mass loading of 0.21 mg·cm$^{-2}$. When tested at high current densities, the overpotential was 279 mV at 500 mA·cm$_{geo}^{-2}$ and 329 mV at 1000 mA·cm$_{geo}^{-2}$ (FIG. 21). Next, the stability of the catalyst was evaluated under constant current density (FIG. 16c). The overpotential of the electrocatalyst at 100 mA·cm$_{geo}^{-2}$ was initially at 250 mV and increased at rate of 0.29 mV·h$^{-1}$ for 70 hours before hitting 270 mV, afterwards it slowly changed by 0.12 mV·h$^{-1}$ to reach 285 mV after 200 hours. The electrocatalyst demonstrated a similar trend when the current was increased to 0.5 A·cm$_{geo}^{-2}$ starting at 290 mV and reaching 355 mV after 200 hours. After applying 0.5 A·cm$_{geo}^{-2}$ for 200 hours, 1 A·cm$_{geo}^{-2}$ was applied and the overpotential was observed to begin at 397 mV before dropping to 340 mV for 50 hours. The overpotential changed significantly afterwards as it increased by 0.4 mV·h$^{-1}$ to hit 400 mV after 40 hours. The electrocatalyst had an average voltage degradation of 0.17 mV·h$^{-1}$ for 500 hours.

AEM Water and CO2R Electrolyser

Figure 43:
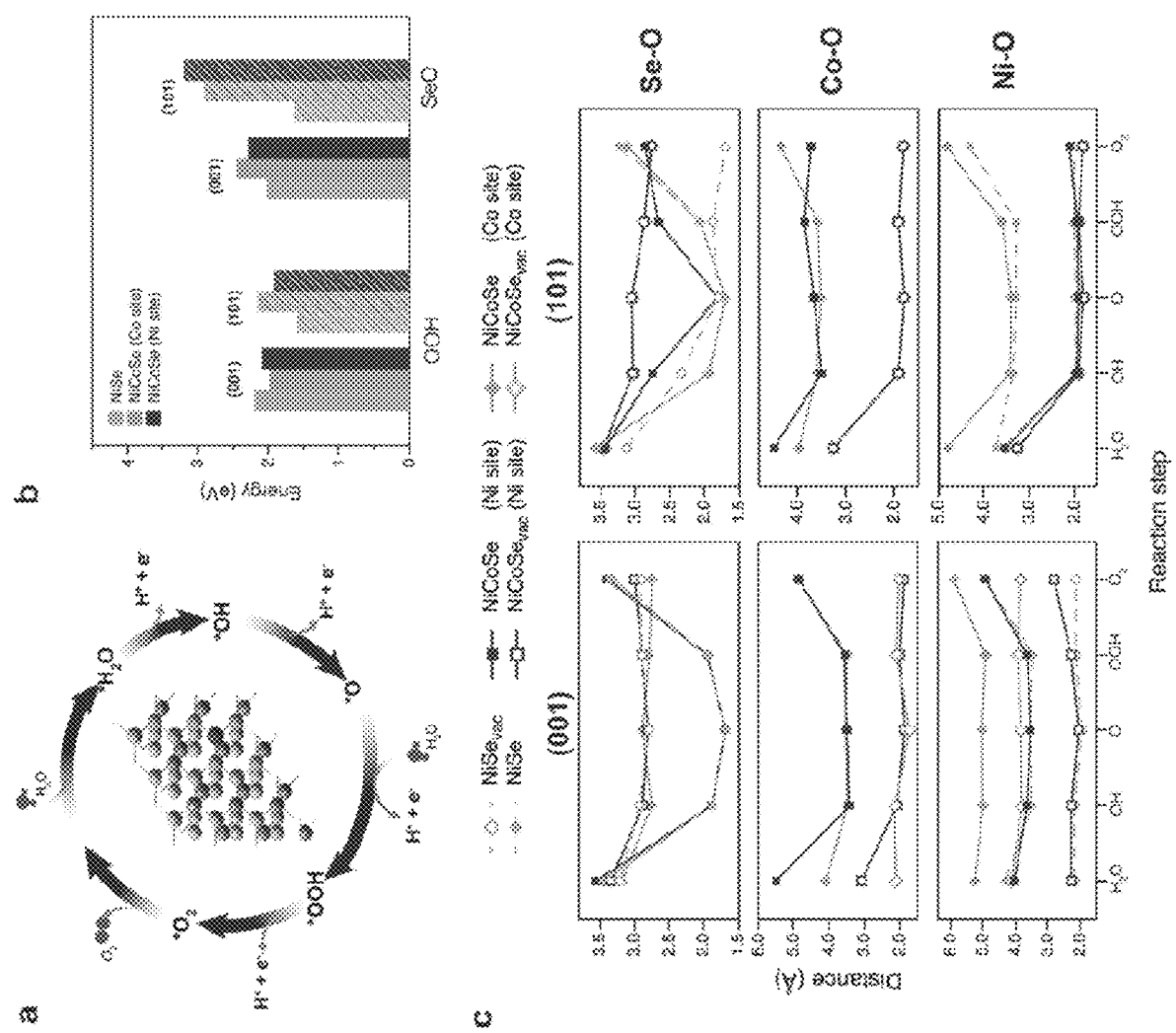
Figure 44:
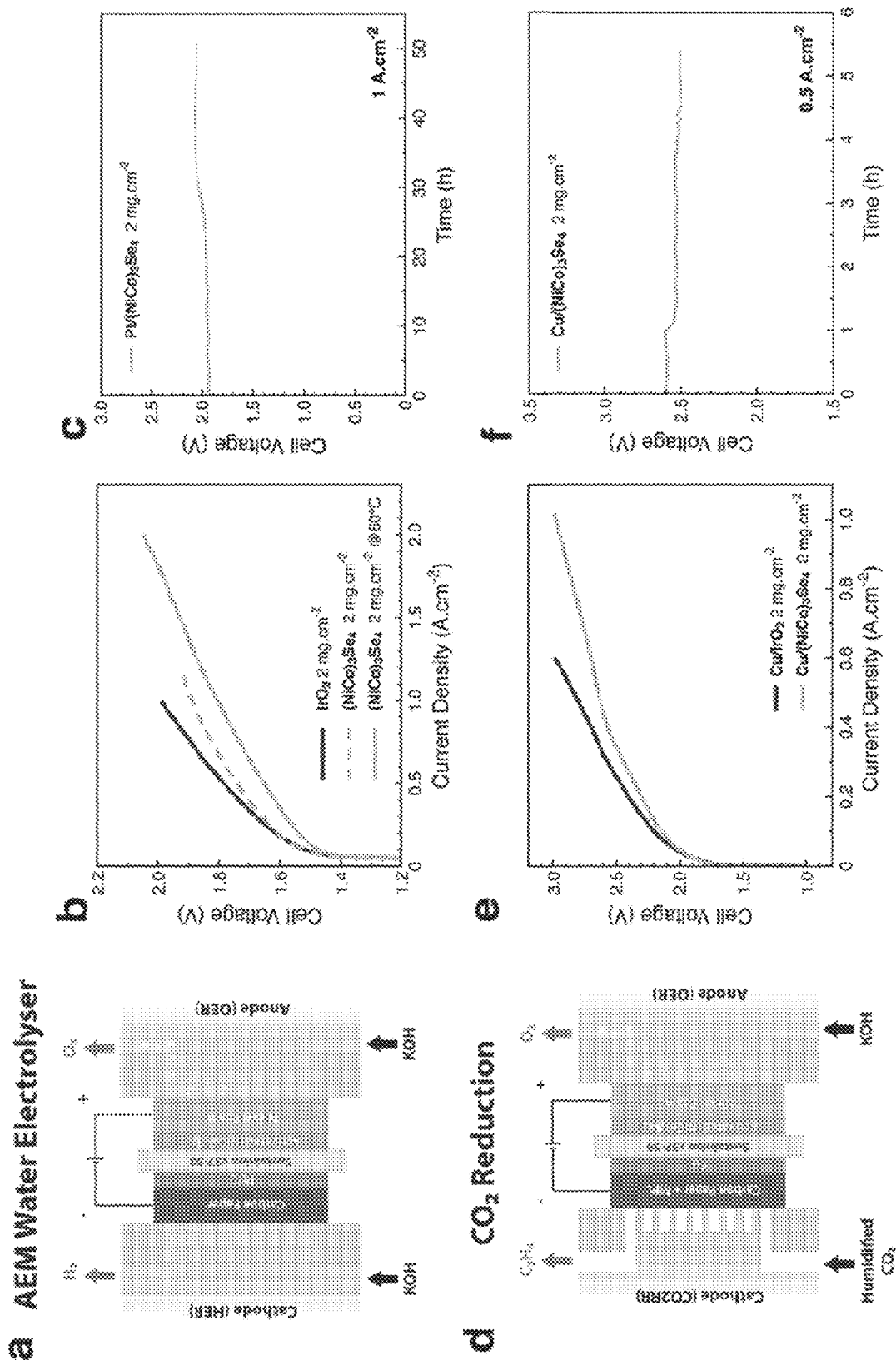

To further evaluate the performance of (NiCo)$_3$Se$_4$ as an OER electrocatalyst for industrial water splitting and CO2R, the work used a 5 cm$^2$ AEM electrolyser with Pt/C on carbon paper for hydrogen evolution and Cu on PTFE for CO$_2$R (FIGS. 43a and 43d). The polarization curves (without iR correction) indicated that (NiCo)$_3$Se$_4$ lowered the cell voltage to 2 V at 2 A·cm$^{-2}$ for water splitting (FIG. 43b), which outperforms commercial IrO$_2$, and 3 V at 1 A·cm$^{-2}$ for CO$_2$R for (FIG. 43e) using 1 M KOH. The performance was stable for 50 h at 1 A·cm$^{-2}$ of water splitting (FIG. 43c) and 5 h at 0.5 A·cm$^{-2}$ of CO$_2$R (FIG. 43f). These results demonstrated the potential of utilizing Cryomilled (NiCo)$_3$Se$_4$ for industrial applications.

AEM Electrolyser Test

The anode electrode was prepared by spraying (NiCo)$_3$Se$_4$ and IrO$_2$ inks on 300 μm Nickel foam (Kunhewuhua™), spraying was controlled to achieve a mass loading of 2 mg·cm$^{-2}$. The Nickel foam was degreased and pretreated in HCl before using to remove the passive oxide layer and other contaminants. For hydrogen evolution, 40% Pt/C was sprayed on untreated carbon paper (AvCarb 190, Fuel Cell Store) with a loading of 1 mg·cm$^{-2}$, while for CO$_2$ reduction the Cu electrode on PTFE was prepared following the exact procedure proposed by Gabardo et al. The catalysts were prepared in isopropanol and 5 wt. % Nafion binder before spraying. An anion exchange membrane (Sustanior x37-50) was used to separate the cathode and anode compartments of the electrolyser, each end plate with a 5 cm$^2$ serpentine flow field. For water splitting, 1 M KOH was fed to both sides of the electrolyser, while for CO$_2$ reduction only the anode was supplied with 1 M KOH while the cathode was provided with humidified CO$_2$.

Conclusions and Outlook

Figure 17:
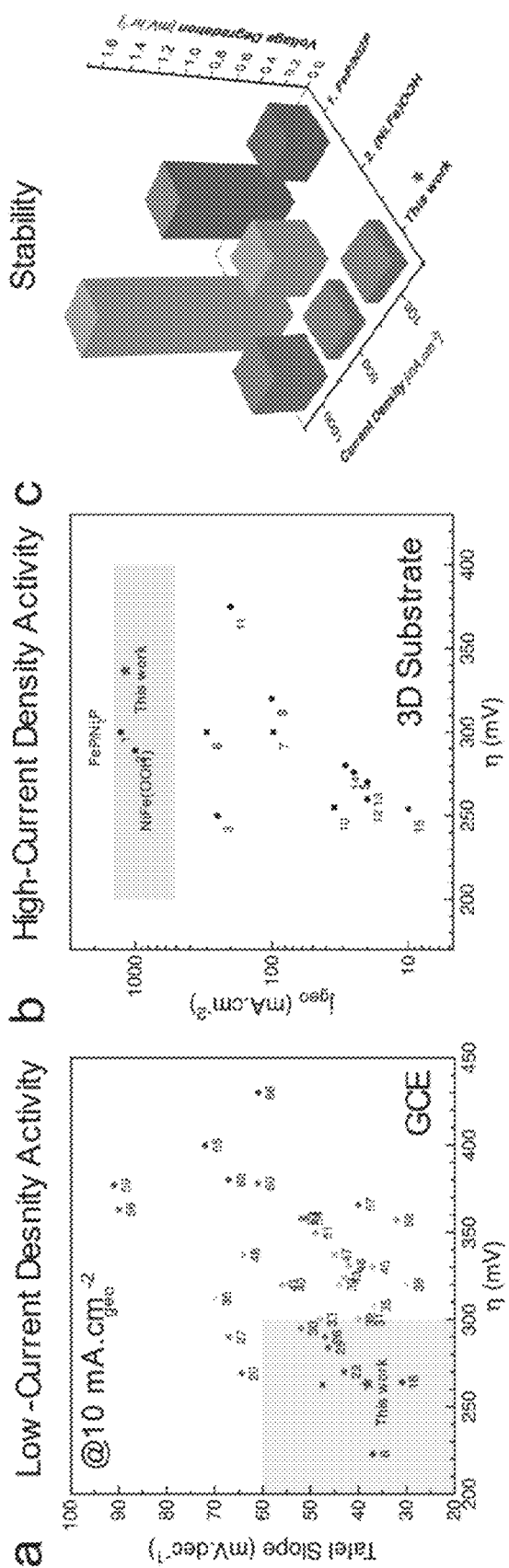
FIG. 17: Comparison of the performance of this work (star) and other OER catalysts in literature from Table 12 on a) glassy carbon electrode (GCE) and b) 3D substrates. c) The best two catalysts from (b) with current densities>500 mA·cm$^{-2}$ are compared with respect to long-term stability.

The present work attempted to compare the performance of the electrocatalysts described herein with literature at 10 mA·cm$_{geo}^{-2}$ and high current densities (>100 mA·cm$_{geo}^{-2}$). Over 69 earth-abundant electrocatalysts were listed in Table 10 and mapped using overpotential, Tafel slope, and voltage degradation as performance metrics (FIG. 17). The electrocatalysts described herein had the lowest voltage degradation rate among the top two performing electrocatalysts at high current densities (see FIG. 17b and FIG. 17c). Also, the present work produced one of the best combined apparent (normalized by geometric area) and intrinsic (normalized by ECSA) activities at 10 mA·cm$^{-2}$ on glassy carbon electrode (FIG. 17a).

By way of summary, the present work has demonstrated the synthesis of homogenously dispersed Ni—Co—Se nanocrystals using a two-step milling process. The electrochemical leaching of Se from the structure enabled the transformation of Ni and Co in the electrocatalyst to active oxyhydroxides as validated by SEM, sXAS, and in situ XAS. The (NiCo)$_3$Se$_4$ electrocatalyst showed a stable OER performance drawing 10 mA·cm$_{geo}^{-2}$ at an initial overpotential of 268 mV in 1M Fe-free KOH for at least 350 hours with a marginal voltage degradation (<10 mV). When operated at higher current densities, the electrocatalyst maintained an overpotential of 290 mV at 0.5 A·cm$^{-2}$ and 340 mV at 1 A·cm$^{-2}$ for at least 500 hours with an average voltage degradation of 0.17 mV·h$^{-1}$. The results encourage the utilization of cryomilling and chalcogenides, such as Se, to mass produce efficient earth-abundant electrocatalysts with tailored nanostructures and long-term durability.

At higher current densities (0.1-1 A·cm$^{-2}$), the electrocatalyst exhibited a stability of 0.17 mV·h$^{-1}$ comparable with state-of-the-art IrO$_2$ (0.21 mV·h$^{-1}$). Using (NiCo)$_3$Se$_4$ as OER electrocatalyst in AEM electrolyser, the work demonstrated outstanding water splitting performance delivering 2 A·cm$^{-2}$ at 2 V and 1 A·cm$^{-2}$ at 3 V. The results encourage the utilization of cryomilling and chalcogenides such as Se to mass produce efficient earth-abundant electrocatalysts with tailored nanostructures and long-term durability.

The following references are hereby incorporated herein by reference in their entirety:

1. IRENA, *Electricity storage and renewables: Costs and markets to* 2030, 2017.
2. P. P. Sharma and X. D. Zhou, Electrocatalytic conversion of carbon dioxide to fuels: a review on the interaction between CO2 and the liquid electrolyte, *Wiley Interdiscip. Rev. Energy Environ.*, DOI:10.1002/wene.239.

3 P. De Luna. C. Hahn, D. Higgins, S. A. Jaffer, T. F. Jaramillo and E. H. Sargent. What would it take for renewably powered electrosynthesis to displace petrochemical processes?, *Science* (80-.). DOI:10.1126/science.aav3506.

4 C.-T. Dinh, G. Kibria, A. Seifitokaldani, A. Kiani, O. S. Bushuyev, C. Zou, R. Quintero-Bermudez. E. H. Sargent, T. Burdyny, C. M. Gabardo. J. P. Edwards. Y. Pang. D. Sinton and P. De Luna, $CO_2$ electroreduction to ethylene via hydroxide-mediated copper catalysis at an abrupt interface, *Science* (80-.). 2018, 360, 783-787.

5 J. R. SGalán-Mascarós, Water Oxidation at Electrodes Modified with Earth-Abundant Transition-Metal Catalysts, *ChemElectroChem*, 2015, 2, 37-50.

6 H. Zhou, F. Yu, Q. Zhu, J. Sun, F. Qin, L. Yu, J. Bao, Y. Yu, S. Chen and Z. Ren, Water splitting by electrolysis at high current densities under 1.6 volts *Energy Environ. Sci.*, 2018, 11, 2858-2864.

7 M. Yu, G. Moon, E. Bill and H. TOysz, Optimizing Ni—Fe Oxide Electrocatalysts for Oxygen Evolution Reaction by Using Hard Templating as a Toolbox, *ACS Appl. Energy Mater.*, 2019, 2, 1199-1209.

8 M. Gong, Y. Li, H. Wang, Y. Liang, J. Z. Wu, J. Zhou, J. Wang, T. Regier, F. Wei and H. Dai, An advanced Ni—Fe layered double hydroxide electrocatalyst for water oxidation, *J. Am. Chem. Soc.*, 2013, 135, 8452-8455.

9 C. Liang, P. Zou, A. Nairan, Y. Zhang, J. Liu, K. Liu, S. Hu, F. Kang. H. J. Fan and C. Yang, Exceptional performance of hierarchical Ni—Fe oxyhydroxide@NiFe alloy nanowire array electrocatalysts for large current density water splitting, *Energy Environ. Sci.*, DOI:10.1039/c9ee02388g.

10 F. D. Speck, K. E. Dettelbach, R. S. Sherbo, D. A. Salvatore, A. Huang and C. P. Beringuette, On the Electrolytic Stability of Iron-Nickel Oxides, *Chem*, 2017, 2, 590-597.

11 D. Y. Chung, P. P. Lopes, P. Farinazzo Bergamo Dias Martins, H. He, T. Kawaguchi, P. Zapol, H. You, D. Tripkovic, D. Strmcnik, Y. Zhu, S. Seifert, S. Lee, V. R. Stamenkovic and N. M. Markovic, Dynamic stability of active sites in hydr(oxy)oxides for the oxygen evolution reaction, *Nat. Energy*, 2020, 5, 222-230.

12 M. Wang, Z. Dang. M. Prato, D. V. Shinde, L. De Trizio and L. Manna, Ni—Co—S—Se Alloy Nanocrystals: Influence of their Composition on their in-situ Transformation and Electrocatalytic Activity for the Oxygen Evolution Reaction, *ACS Appl. Nano Mater.*, 2018, acsanm.8b01418.

13 H. Shin, H. Xiao and W. A. Goddard, In Silico Discovery of New Dopants for Fe-Doped Ni Oxyhydroxide (Ni1-xFexOOH) Catalysts for Oxygen Evolution Reaction, *J. Am. Chem. Soc.*, 2018, 140, 6745-8748.

14 K. Akbar, J. H. Jeon, M. Kim, J. Jeong, Y. Yi and S. H. Chun, Bifunctional Electrodeposited 3D NiCoSe2/Nickle Foam Electrocatalysts for Its Applications in Enhanced Oxygen Evolution Reaction and for Hydrazine Oxidation, *ACS Sustain. Chem. Eng.*, 2018, 6, 7735-7742.

15 Y. Zhang, C. Zhang, Y. Guo, D. Liu, Y. Yu and B. Zhang, Selenium vacancy-rich $CoSe_2$ ultrathin nanomeshes with abundant active sites for electrocatalytic oxygen evolution, 2019, 2536-2540.

16 K. Guo, S. Cui, H. Hou, W. Chen and L. Mi, Hierarchical ternary Ni—Co—Se nanowires for high-performance supercapacitor device design, *Dalt. Trans.*, 2016, 45, 19458-19465.

17 C. Tang, N. Cheng, Z. Pu, W. Xing and X. Sun, NiSe Nanowire Film Supported on Nickel Foam: An Efficient and Stable 3D Bifunctional Electrode for Full Water Splitting, 2015, 9351-9355.

18 I. H. Kwak, H. S. Im, D. M. Jang, Y. W. Kim, K. Park, Y. R. Lim, E. H. Cha and J. Park, $CoSe_2$ and $NiSe_2$ Nanocrystals as Superior Bifunctional Catalysts for Electrochemical and Photoelectrochemical Water Splitting, *ACS Appl. Mater. Interfaces*, 2016, 8, 5327-5334.

19 X. Cao, E. Johnson and M. Nath, Identifying high-efficiency oxygen evolution electrocatalysts from Co—Ni—Cu based selenides through combinatorial electrodeposition, *J. Mater. Chem. A*, 2019, 7, 9877-9889.

20 X. Cao, Y. Hong, N. Zhang, Q. Chen, J. Masud, M. A. Zaeem and M. Nath, Phase Exploration and Identification of Multinary Transition-Metal Selenides as High-Efficiency Oxygen Evolution Electrocatalysts through Combinatorial Electrodeposition, *ACS Catal.*, 2018, 8, 8273-8289.

21 F. Lyu, Q. Wang, S. M. Choi and Y. Yin, *Small*, 2019,15, 1-17.

22 W. Li, D. Xiong, X. Gao and L. Liu, The oxygen evolution reaction enabled by transition metal phosphide and chalcogenide pre-catalysts with dynamic changes, *Chem. Commun.*, 2019, 55, 8744-8763.

23 W. Li, X. Gao, D. Xiong, F. Wei, W. G. Song, J. Xu and L. Liu, Hydrothermal Synthesis of Monolithic $Co_3Se_4$ Nanowire Electrodes for Oxygen Evolution and Overall Water Splitting with High Efficiency and Extraordinary Catalytic Stability, *Adv. Energy Mater.*, 2017, 7, 1-7.

24 R. Gao. G. D. Li, J. Hu, Y. Wu, X. Lian, D. Wang and X. Zou, In situ electrochemical formation of NiSe/NiOx core/shell nano-electrocatalysts for superior oxygen evolution activity, *Catal. Sci. Techno.*, 2016, 6, 8268-8275.

25 R. D. L. Smith, M. S. Prévot, R. D. Fagan. Z. Zhang, P. A. Sedach, M. K. J. Siu, S. Trudel and C. P. Berlinguette. Photochemical route for accessing amorphous metal oxide materials for water oxidation catalysis. *Science*, 2013, 340, 60-3.

26 L. Schultz, Formation of amorphous metals by mechanical alloying, *Mater. Sci. Eng.*, 1988, 97, 15-23.

27 W. L. Johnson, Thermodynamic and kinetic aspects of the crystal to glass transformation in metallic materials, *Prog. Mater. Sci.*, 1986, 30, 81-134.

28 A. H. Alami, A. Alketbi, J. Abed and M. Almheiri, Assessment of Al—Cu—Fe compound for enhanced solar absorption, *Int. J. Energy Res.*, DOI:10.1002/er.3468.

29 T. Pas, A. Bergonzi, E. Michiels, F. Rousseau, J. Schymkowitz, R. Koekoekx, C. Clasen, B. Vergauwen and G. Van Den Mooter, Preparation of Amorphous Solid Dispersions by Cryomilling: Chemical and Physical Concems Related to Active Pharmaceutical Ingredients and Carriers, *Mol. Pharm.*, 2020, 17, 1001-1013.

30 K. M. Cole, D. W. Kirk and S. J. Thorpe, In Situ Raman Study of Amorphous and Crystalline Ni—Co Alloys for the Alkaline Oxygen Evolution Reaction, *J. Electrochem. Soc.*, 2018, 165, J3122-J3129.

31 S. Ghobrial. D. W. Kirk and S. J. Thorpe. Solid state amorphization in the Ni—Nb—Y system by mechanical alloying, *J. Non. Cryst. Solids*, 2018, 502, 1-8.

32 M. S. El-eskandarany, Cyclic phase transformations of mechanically alloyed Co 75 Ti 25 powders, 2002, 50, 1113-1123.

33 G. Fan, F. Guo, Z. Hu, M. Quan and K. Lu, Amorphization of selenium induced by high-energy ball milling, *Phys. Rev. B—Condens. Matter Mater. Phys.*, 1997, 55, 11010-11013.

34 C. Suryanarayana, *Mechanical Alloying And Milling*, CRC Press, 2004, illustrate. 2004.

35 K. Fan, H. Zou, Y. Lu, H. Chen, F. Li, J. Liu, L. Sun, L. Tong, M. F. Toney, M. *Sui* and J. Yu, Direct Observation of Structural Evolution of Metal Chalcogenide in Electrocatalytic Water Oxidation, *ACS Nano*, 2018, 12, 12369-12379.

36 B. Akabayov, C. J. Doonan, I. J. Pickering, G. N. George and I. Sagi, Using softer X-ray absorption spectroscopy to probe biological systems, *J. Synchrotron Radiat.*, 2005, 12, 392-401.

37 M. Al Samarai, A. W. Hahn, A. Beheshti Askari, Y. T. Cui, K. Yamazoe, J. Miyawaki, Y. Harada, O. ROdiger and S. Debeer, Elucidation of Structure-Activity Correlations in a Nickel Manganese Oxide Oxygen Evolution Reaction Catalyst by Operando Ni L-Edge X-ray Absorption Spectroscopy and 2p3d Resonant Inelastic X-ray Scattering, *ACS Appl. Mater. Interfaces*, 2019, 11, 38595-38605.

38 Y. Liang, Y. Li, H. Wang. J. Zhou, J. Wang, T. Regier and H. Dai, Co3O4 nanocrystals on graphene as a synergistic catalyst for oxygen reduction reaction. *Nat. Mater.*, 2011, 10, 780-786.

39 D. Meyers, S. Mukherjee, J. G. Cheng, S. Middey, J. S. Zhou, J. B. Goodenough, B. A. Gray, J. W. Freeland, T. Saha-Dasgupta and J. Chakhalian, Zhang-Rice physics and anomalous copper states in A-site ordered perovskites, *Sci. Rep.*, 2013, 3, 3-7.

40 S. Klaus, Y. Cai, M. W. Louie, L. Trotochaud and A. T. Bell, Effects of Fe electrolyte impurities on Ni(OH)2/NiOOH structure and oxygen evolution activity, *J. Phys. Chem. C*, 2015.119, 7243-7254.

41 C. Xiao, X. Lu and C. Zhao, *Chem. Commun.*, 2014, 50, 10122-10125.

42 K. Lian, D. W. Kirk and S. J. Thorpe, Electrocatalytic behaviour of Ni-base amorphous alloys, *Electrochim. Acta*, 1991, 36, 537-545.

43 M. Farmand, A. T. Landers, J. C. Lin, J. T. Feaster, J. W. Beeman, Y. Ye, E. L. Clark, D. Higgins, J. Yano, R. C. Davis, A. Mehta, T. F. Jaramillo, C. Hahn and W. S. Drisdell, Electrochemical flow cell enabling: Operando probing of electrocatalyst surfaces by X-ray spectroscopy and diffraction. *Phys. Chem. Chem. Phys.*, 2019, 21, 5402-5408.

44 G. Li. L. Anderson, Y. Chen, M. Pan and P.-Y. Abel Chuang, New insights into evaluating catalyst activity and stability for oxygen evolution reactions in alkaline media, *Sustain. Energy Fuels*, 2018, 2, 237-251.

45 T. Shinagawa, A. T. Garcia-Esparza and K. Takanabe, Insight on Tafel slopes from a microkinetic analysis of aqueous electrocatalysis for energy conversion. *Sci. Rep.*, 2015, 5, 1-21.

46 B. G. Amin, A. T. Swesi, J. Masud and M. Nath, CoNi2Se4 as an efficient bifunctional electrocatalyst for overall water splitting, *Chem. Commun.*, 2017, 53, 5412-5415.

47 P. F. Wang, Y. J. Guo, H. Duan, T. T. Zuo, E. Hu, K. Attenkofer, H. Li, X. S. Zhao, Y. X. Yin, X. Yu and Y. G. Guo, Honeycomb-Ordered Na3Ni1.5M0.5BiO6 (M=Ni, Cu, Mg, Zn) as High-Voltage Layered Cathodes for Sodium-Ion Batteries, *ACS Energy Lett.*, 2017, 2, 2715-2722.

48 B. Das, M. V Reddy and B. V. R. Chowdari, X-ray absorption spectroscopy and energy storage of Ni-doped cobalt nitride, (Ni 0.33 Co 0.67)N, prepared by a simple synthesis route, 2013, 1961-1966.

49 J. T. Olegario, N. Yee. M. Miller, J. Sczepaniak and B. Manning, Reduction of Se(VI) to Se(-II) by zerovalent iron nanoparticle suspensions. *J. Nanoparticle Res.*, 2010, 12, 2057-2068.

50 S. R. Mellsop, A. Gardiner, B. Johannessen and A. T. Marshall, Structure and transformation of oxy-hydroxide films on Ni anodes below and above the oxygen evolution potential in alkaline electrolytes, *Electrochim. Acta*, 2015, 168, 356-364.

51 G. Zhao, H. Hu, W. Chen, Z. Jiang, S. Zhang, J. Huang and Y. Lu, Ni2O3-Au+ hybrid active sites on NiOx@Au ensembles for low-temperature gas-phase oxidation of alcohols, *Catal. Sci. Technol.*, 2013, 3, 404-408.

52 D. Friebel, M. W. Louie, M. Bajdich, K. E. Sanwald, Y. Cai, M. Wise, M. Cheng, D. Sokaras, T. Weng, R. Alonso-mori, R. C. Davis, J. R. Bargar, J. K. Nørskov, A. Nilsson and A. T. Bell, Identification of Highly Active Fe Sites in (Ni, Fe) OOH for Electrocatalytic Water Splitting, *J. Am. Chem. Soc*, 2015, 137, 1305-1313.

53 H. Y. Wang, Y. Y. Hsu, R. Chen, T. S. Chan, H. M. Chen and B. Liu, Ni+-induced formation of active NiOOH on the spinel Ni—Co oxide surface for efficient oxygen evolution reaction, *Adv. Energy Mater.*, 2015, 5, 1-8.

54 J. Huang, J. Chen, T. Yao, J. He, S. Jiang, Z. Sun, Q. Liu, W. Cheng, F. Hu, Y. Jiang, Z. Pan and S. Wei, CoOOH Nanosheets with High Mass Activity for Water Oxidation, *Angew. Chemie—Int. Ed.*, 2015, 54, 8722-8727.

55 C. I. Pearce, V. S. Coker, J. M. Chamock, R. A. D. Pattrick, J. F. W. Mosselmans, N. Law, T. J. Beveridge and J. R. Lloyd, Microbial manufacture of chalcogenide-based nanoparticles via the reduction of selenite using *Veillonella atypica*: An in situ EXAFS study, *Nanotechnology*, DOI:10.1088/0957-4484/19/15/155603.

56 H. A. El-Sayed, A. Weiß, L. F. Olbrich. G. P. Putro and H. A. Gasteiger, OER Catalyst Stability Investigation Using RDE Technique: A Stability Measure or an Artifact?, *J. Electrochem. Soc.*, 2019, 166, F458-F464.

57 A. C. Garcia and M. T. M. Koper, Effect of Saturating the Electrolyte with Oxygen on the Activity for the Oxygen Evolution Reaction, *ACS Catal.*, 2018, 8, 9359-9363.

Supplementary Information

The following supplementary information is also provided and relates to various findings and experiments that were performed in the context of this work.

Materials and Methods

Two-Stet Milling Synthesis

Milling in both stages was performed in a Retsch Cryomill at a vibrational milling speed of 30 Hz. The elemental powder precursors in addition to two 7 mm diameter stainless steel balls, weighing together 2769 mg on average, were all placed in a 5 mL stainless steel vail to maintain a ball-to-powder ratio (BPR) of 10:1. Cryo-milling was performed in several cycles of 30 minutes each. Between cycles, the vails were pre-cooled by flowing liquid nitrogen (LN2) for 5 minutes to sustain cryogenic temperatures during the entire ball milling process. Before milling, the vials were sealed under Argon environment in a glovebox.

Using cryo-milling, Ni—Co—Se alloy systems were prepared according to quantities and the procedure shown in Table 2 above.

In the second stage, powder was added to a 5 mL vial with a BBR of 50:1 to conduct SABM. In addition, anhydrous ethanol with 1:1 ethanol-to-powder mass ratio and dodecylphosphonic acid (DPPA) as surfactant with 1:4 DPPA-to-powder mass ratio were added to the milling vial to produce nanoparticles suspension. SABM was carried out for 10 hours in total (5 cycles of 30 mins and 80 mins of off time between cycles) for all alloy systems in this study. This procedure was followed based on the optimization of parameters conducted in previous work (see S. Ghobrial, D. W. Kirk and S. J. Thorpe, Amorphous Ni—Nb—Y Alloys as Hydrogen Evolution Electrocatalysts, *Electrocatalysis*, 2019, 10, 243-252). To extract nanoparticles from the suspension, the surfactant should be removed after milling. First, ethanol is added to milling vials and the powder-ethanol slurry mixture is extracted by pipetting into centrifuging tubes until the vials are empty. Then, the tubes are sonicated for 30 min before centrifuging times at 3000 rpm for 30 mins, the large particles should be settled at the bottom of the tube. The suspended nanoparticles in solution is extracted by pipetting into new centrifuging tubes. The tubes are sonicated for 30 mins before centrifuging at 10,000 rpm for 30 mins and then the clear solution is washed and replaced with fresh ethanol, this procedure is repeated at least 3 times until all nanoparticles in the solution precipitate at the bottom of the tube. The tubes are then filled with ethanol and the nanoparticles-ethanol mixture is transferred to 20 mL scintillation vials. Scintillation vials are then heated at 70° C. in a furnace under air flow until all ethanol evaporates. The dry nanoparticle powder is then collected from the vials and stored.

Sol-Gel Synthesis

NiFe oxyhydroxides were synthesized using a modified aqueous sol-gel technique (see Ref. 2 below). Anhydrous $NiCl_2 \cdot 6H_2O$ (2.0 mmol) and $FeCl_3$ anhydrous (0.7 mmol) were first dissolved in ethanol (4 mL) in a vial. Deionized water (DI) (0.21 mL) was mixed with ethanol (2 mL) in a separate vial. All above solutions were cooled in an ice bath for 2 h. The Ni and Fe precursors were then mixed with an ethanol-water mixture to form a clear solution. To this solution, propylene oxide (=1 mL) was then slowly added, forming a dark gel. The NiFe wet-gel was aged for 1 day to promote network formation, immersed in acetone, which was replaced periodically for 5 days before the gel was dried in vacuum oven.

Characterization

XRD

The crystal structure of catalysts was determined using X-ray Diffraction (XRD). A Miniflex 600 (Rigaku, Japan) equipped with D/tex Ultra silicon trip detector and Cu Kα radiation (λ=1.5418 Å) was used. Powders were prepared by mixing with acetone and then dropping a small drop of the mixture to fill a 4 mm diameter×100 μm deep groove in a single crystal silicon holder (zero-background). The angle was varied between 20° to 80° with a step size of 0.05° every 2 seconds.

Using Scherrer's equation:

$$D = \frac{K\lambda}{FWHM\cos\theta}$$

where D is the mean crystallite size which can be equal to or less than the particle size, λ is 0.154 nm for Cu X-ray source, K is shape factor has a typical value between 0.9-1.

The analysis was carried on (NiCo)Se because, unlik2e $(NiCo)_3Se$, it has fewer overlapping peaks in its XRD pattern, which can complicate the analysis. Also, the analysis was carried out on planes in the 2θ range of 30-50 to avoid broadening caused by the instrumentation at higher 2θ values.

| Plane | d-spacing (nm) | 2θ | FWHM (rad) | D (nm) |
|---|---|---|---|---|
| (101) | 2.711 | 33.01 | 0.084 | 1.92 |
| (102) | 2.032 | 44.55 | 0.0910 | 1.83 |
| (110) | 1.820 | 50.08 | 0.099 | 1.71 |

DLS

The particle size distribution of catalysts was analyzed using Dynamic Light Scattering (DLS). A LB-500 particle size analyzer (Horiba, Japan) was used. Samples were prepared by dispersing a small amount of the powder in ethanol. The solution mixture was then loaded into disposable plastic 4 mL cuvettes (VWR, U.S.). A 5-mW laser source with a wavelength of 650 nm is directed to the sample in the cuvette to enable the measurement of particles ranging from 3 nm to 6 μm.

Electron Microscopy

The structural characterization and elemental mapping of the catalysts were done using Scanning Electron Microscopy (SEM) and Transmission Electron Microscope (TEM). TEM experiments were performed in a Hitachi HF3300 equipped with a cold field emission electron gun using an accelerating voltage of 300 kV. TEM bright field images were used to determine the size and the shape of nanoparticles. Energy X-ray dispersive spectroscopy (EDS) detector was used in scanning transmission electron microscopy (STEM) mode to analyze and quantify the composition of the nanoparticles. Also, secondary electron (SE) detector was used to collect high resolution images of the morphology of the nanoparticles in the TEM. Powder samples were prepared in ethanol to form an ink, the ink was sonicated for 10 minutes before drop casting a 1-2 μL drop on a 400-mesh copper grid and drying overnight.

The particle and geometry of larger particles were investigated using Scanning Electron Microscopy (SEM). Imaging was conducted using Hitachi SU3500. The composition of particles was determined using an attached EDS detector. Powder samples were prepared by adhering to carbon tape on a SEM aluminum stub. Compressed air is blown over the stub to loosen excess powder. In some cases, thin carbon or gold coating might be needed for poor conducting samples.

Electrochemical Testing

For all electrochemical experiments in this work, a Bio-Logic VSP-300 multi potentiosat was used. All tests were performed in 1 M Fe-free KOH electrolyte at 30° C. The electrolyte was pre-electrolyzed using a two-electrode setup Pt working and counter electrodes at −1.7 V for 48 hours prior using to remove any trace metal impurities in the solution specifically Fe. The cell is placed in a water bath to control the temperature and the electrolyte is purged with Ar for an hour before the test to remove $O_2$.

Sample preparation for electrocatalyst on glassy carbon: Powder samples were prepared by making inks. The inks were produced by mixing 4 mg of the catalyst with 80 μL of Nafion® D521 (IonPower) and 1.25 mL of water-to-ethanol (4:1) solution. The mixture was sonicated for 30 minutes before drop casting a 5 μL of the ink on a 3 mm diameter glassy carbon (GC) electrode to produce a thin catalyst layer with a loading of 0.21 mg·cm$^{-2}$. The electrode is polished using 0.08 μm colloidal silica every time before applying inks. To load the catalyst on Ni foam (thickness: 1.7 mm, INCO), several drops of the ink are added to achieve a catalyst loading of 2 mg·cm$^{-2}$ on 0.5 cm×0.5 cm piece.

Sample preparation for electrocatalyst on carbon paper: The electrocatalyst were prepared in inks by mixing with a solution of 4:1 water to ethanol and Nafion binder. The ink was then deposited on one side of a 0.5 cm×0.5 cm untreated carbon paper and left to dry in air.

Sample preparation for electrocatalyst on nickel foam: The electrocatalyst were prepared in inks by mixing with a solution of 4:1 water to ethanol and Nafion binder. The ink was deposited by drop-casting on one side of a 0.5 cm×0.5 cm nickel foam piece with a mass loading of 2 mg·cm$^{-2}$.

Activity and Stability Protocols

A protocol to test the activity and stability of electrocatalysts used for OER was established as shown in Table 5 above. First, the open cell potential (OCP) was recorded for 30 mins to stabilize the material in the solution. The resistance of the solution was measured by electrochemical impedance spectroscopy (EIS). The frequency was scanned from 1 MHz to 1 kHz with an amplitude of 1 mV. Once EIS is completed, cyclic voltammetry (CV) is performed to clean and activate the surface. Each CV measurement was repeated 3 times at a speed of 50 mV·s$^{-1}$ to produce a unique fingerprint of anodic and cathodic peaks in the range from 0-1.6 V vs RHE. This was followed by measuring the electrochemical surface area (ECSA) in a non-Faradaic region using various scanning speeds as explained in Table 5. Each CV measurement at a specific speed is repeated 3 times. To measure the activity, polarization curves were acquired to conduct Tafel analysis and determine the catalytic properties of OER. This was performed using a Linear Sweep Voltammetry (LSV) with a slow speed 1 mV·s$^{-1}$ to allow the surface to stabilize and reflect the true reaction mechanism. In the last step, the stability can be assessed using chronopotentiometry. A fixed current density will be applied to evaluate the stability of the catalyst on different substrates. Electrode potentials were measured with respect to Hg/HgO reference electrode. The Hg/HgO reference electrode was experimentally calibrated in a two-electrode setup using three different standard calomel electrodes (SCE) yielding in E(Hg/HgO)=E(SCE)+144 mV. The potentials were converted to the RHE using E(RHE)=E(SCE)+0.241V+0.059*pH.

iR Correction

We used electrochemical impedance spectroscopy (EIS) to determine uncompensated resistance (Rs). At all potentials tested on GCE, the potential was corrected using Ohm's law:

$E_{corrected}=E_{applied}-iR$ $E_{applied}$ is applied potential, i is the current measured, and compensating for 100% of the resistance.

Intrinsic Activity

Electrochemical Surface Area (ECSA) measurements were conducted to determine the intrinsic activity of the catalysts. The roughness factor (RF), which is equal to ECSA/geometric area, was calculated. While cycling at different scanning speeds, the double layer capacitance ($C_{dl}$) can be calculated from the slope of the current (average difference between anodic and cathodic values for each cycle) vs scanning speed. ECSA is calculated by dividing Cd over a specific capacitance value ($C_s$) that can range between 0.02-0.13 mF·cm$^{-2}$. This work used 0.04 mF·cm$^{-2}$ for all Ni and Co based alloys.

Alternating Stability Test

A special electrochemical protocol was designed to test the stability of the $(NiCo)_3Se_4$ in Fe-free 1M KOH. The sample was polarized at constant current density 10 mA·cm$^{-2}_{geo}$ for 10 hours. Then, open circuit potential (OCP) for 1 h, linear sweep voltammetry (LSV) and cyclic voltammetry were carried out to evaluate the change in performance with time. This was repeated 35 times to evaluate the stability for 35 hours of operation.

Turnover Frequency Calculations $$TOF = \frac{jS}{4Fn}$$

Here, j is the measured current density (mA·cm$^2$), S is the geometric surface area of the electrode, and n is the moles of the active atoms in the loaded catalyst. Also, assuming that all metallic sites are active (lower limit of TOF).

| Catalyst | $j_{geo}$ @ 300 mV mA·cm$^{-2}$ | $j_{ECSA}$ @ 300 mV mA·cm$^{-2}$ | RF | TOF 10$^{-3}$ s$^{-1}$ per site |
|---|---|---|---|---|
| $(NiCo)_3Se_4$ | 25.04 | 3.08 | 8.13 | 50.76 |
| (NiCo)Se | 16.64 | 2.19 | 7.60 | 28.09 |
| $IrO_2$ | 9.94 | 0.74 | 13.43 | 27.49 |
| NiFe Sol-Gel | 19.25 | 0.07 | 275 | 23.98 |
| Ni | 0.70 | 0.04 | 17.55 | 0.51 |

X-Ray Absorption Spectroscopy sXAS

Ex-situ sXAS measurements were performed at the Spherical Grating Monochromator (SGM) beamline of the Canadian Light Source. All samples were scanned from in 0.1 eV steps for the Surface sensitive absorption spectra were recorded using total electron yield (TEY) and partial fluorescence yield (PFY) simultaneously.

In Situ XAS

In situ X-ray absorption spectroscopy (XAS) measurements for the K-edge of Ni and Co were carried out at 9-BM using quick XAS (30 secs per spectrum), while Se was measured at 20BM in the advanced photon source (APS, IL, USA). An in-house custom-made electrochemical cell with a typical three-electrode configuration was used to track XAS changes in situ. A platinum mesh and Ag/AgCl electrode were used as counter electrode and reference electrode, respectively. The catalyst was prepared on one side of a carbon paper while the other side was stuck to a thin Kapton tape (polyimide film with silicone adhesive) and connected electrically by Cu tape. Then, the sample was mounted on the window of the electrochemical cell so that the back side of the sample is facing the beam and the catalyst (front side) is in direct contact with the electrolyte. All measurements were done in air and under ambient conditions. In situ experiments were conducted at 4 conditions: Dry, OCP, 1.1V (Before OER) and 1.5V (during OER) in 1M KOH. Data was collected in fluorescence mode using a Passivated Implanted Planar Silicon (PIPS)/Lytle detector placed at 45° degrees. Several spectra were collected and averaged at each condition to improve the quality of the data and increase the signal to noise ratio. Data post-processing and fitting was done entirely using Demeter software package.

Figure 18:
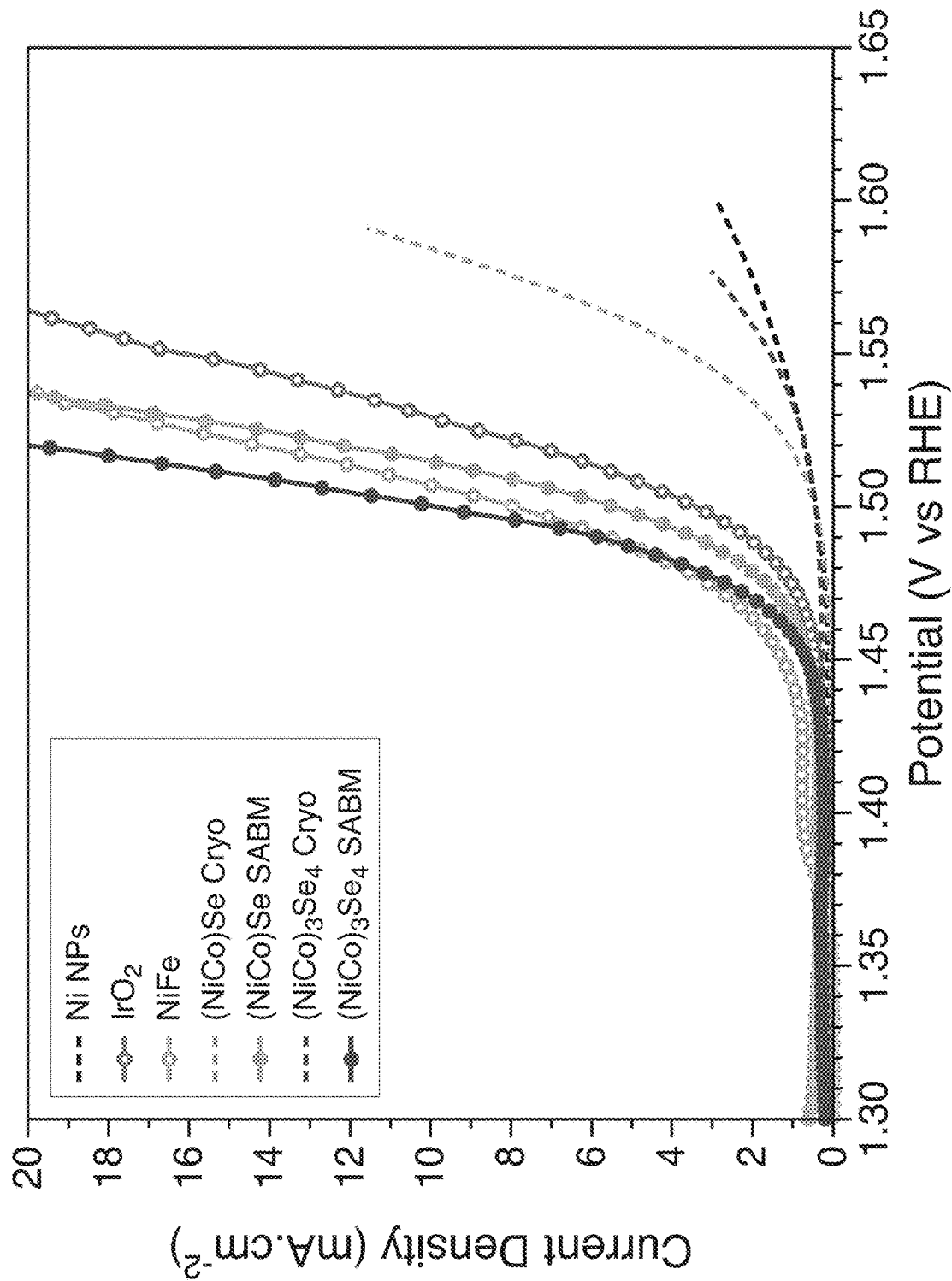
FIG. 18: Polarization curves of $(NiCo)_3Se_4$ and (NiCo)Se after Cryomilling (Cryo) and after surfactant assisted ball milling (SABM) compared to standard catalysts Ni, $IrO_2$ and NiFe.

FIG. 18 shows polarization curves of $(NiCo)_3Se_4$ and $(NiCo)Se$ after Cryomilling (Cryo) and after surfactant assisted ball milling (SABM) compared to standard catalysts Ni, $IrO_2$ and NiFe. FIG. 19 relates to cyclic voltammetry done on $(NiCo)_3Se_4$ to calculate double layer capacitance ($C_{dl}$) for electrochemical surface area (ECSA) calculations. FIG. 20 relates to capacitive current vs scan rate for $(NiCo)_3Se_4$, $(NiCo)Se$, Ni NPs, $IrO_2$ and NiFe. FIG. 21 shows polarization curve of $(NiCo)_3Se_4$ on NF and bare NF.

TABLE 9

Summary of electrochemical performance of all catalysts in this study.

| | η [mV] @1 mA | η [mV] @10 mA | Tafel [mV·dec$^{-1}$] | RF | Size [nm] |
|---|---|---|---|---|---|
| Ni NPs | 321 ± 2 | 383 ± 3 | 62 | 17.55 | <100 |
| $IrO_2$ | 250 ± 1 | 298 ± 1 | 48 | 13.43 | <100 |
| NiFe | 212 ± 3 | 272 ± 5 | 62 | 275 | — |
| NiSe | 277 ± 1 | 330 ± 5 | 53 | — | 60 ± 30 |
| CoSe | 275 ± 1 | 332 ± 1 | 57 | — | 80 ± 35 |
| (NiCo)Se Cryo | 288 ± 2 | 353 ± 3 | 65 | — | 1065 ± 330 |
| $(NiCo)_3Se_4$ Cryo | 310 ± 3 | 389* | 79 | — | 4055 ± 778 |
| (NiCo)Se SABM | 233 ± 2 | 283 ± 1 | 50 | 7.60 | 37 ± 15 |
| $(NiCo)_3Se_4$ SABM | 226 ± 2 | 268 ± 2 | 42 | 8.13 | 67 ± 27 |

*overpotential was extrapolated using Tafel slope.

TABLE 10

OER Performance table from literature

| # | Catalyst | Electrolyte | Electrode[a] | Loading [mg·cm$^{-2}$] | Activity η[b] [mV] | Tafel [mV·dec$^{-1}$] | Durability (Electrode) Test[c] | Time [hours] | Reference |
|---|---|---|---|---|---|---|---|---|---|
| 1 | FeP/Ni$_2$P | 1M KOH | NF | 8 | 154 | 22.7 | CP @500 mA·cm$^{-2}$ | 40 | Nat. Comm., 2018[6] |
| 2 | (Ni,Fe)OOH | 1M KOH | NF | 4.0 | 154 | 41.5 | CP @1 A·cm$^{-2}$ | 42 | Ener. Env. Sci., 2018[7] |
| 3 | Core-shell NiFeCu | 1M KOH | NF | 10.2 | 180 | 33 | CP @10 mA·cm$^{-2}$ | 20 | Nat. Comm., 2018[8] |
| 4 | Ni$_3$S$_2$ nanorods | 0.1M KOH | NF | 37 | 187 | 159.3 | CA 10 mA·cm$^{-2}$ | 10 | Ener. Env. Sci., 2013[9] |
| 5 | Co(OH)$_2$ TCNQ[d] | 1M KOH | Cu Foam | — | 200 | 188 | CA @450 mV | 25 | Adv. Mat., 2018[10] |
| 6 | NiFe nanosheets | 1M KOH | NF | — | 215 | 32 | CP @100 mA·cm$^{-2}$ CP @500 mA·cm$^{-2}$ | 10 2 | Nat. Comm., 2015[11] |
| 7 | (Ni,Co)$_{0.85}$Se@NiCo-LDH | 1M KOH | CC | 6 | 216 | 77 | CP @10 mA·cm$^{-2}$ η = +11% | 24 | Adv. Mat., 2015[12] |
| 8 | G-FeCoW | 1M KOH | GC | 0.21 | 223 | 37 | (NF/Au) CP @10 mA·cm$^{-2}$ | 500 | Science, 2016[13] |
| 9 | Co—NiSe$_2$ | 1M KOH | Ti plate | 1.67 | 226 | 94 | CP @10 mA·cm$^{-2}$ | 10 | Nanoscale, 2016[14] |
| 10 | (Ni$_{0.75}$F$_{0.25}$)Se$_2$[d] | 1M KOH | CC | — | 230 | 47.2 | CP @35 mA·cm$^{-2}$ | 28 | ACS App. Mat. & Int., 2016[15] |
| 11 | FeOOH/Co/FeOOH[d] | 1M NaOH | NF | 0.5 | 237 | 32 | CP @200 mA·cm$_{-2}$ | 50 | Angew. Chem., 2016[16] |
| 12 | P—Co$_3$O$_4$[d] | 1M KOH | NF | — | 240 | 60 | CA @300 mV | 25 | ACS Catalysis, 2018[17] |
| 13 | NiSe Nanowires[d] | 1M KOH | NF | 2.77 | 250 | 64 | CP @100 mA·cm$^{-2}$ | 12 | Angew. Chem., 2015[18] |
| 14 | CoAl—NS | 1M KOH | Graphene | 0.05 | 252 | 36 | CP @70 mA·cm$^{-2}$ | 30 | Adv. Mat., 2016[19] |
| 15 | a-CoVO$_x$/NF | 1M KOH | NF | — | 254 | 35 | CP @10 mA·cm$^{-2}$ | 15 | ACS Catalysis, 2018[20] |
| 16 | (NiCo)$_{0.85}$Se | 1M KOH | CC | 5 | 255 | 79 | CP @10 mA·cm$^{-2}$ η = +8% | 24 | Adv. Mat., 2015[12] |
| 17 | Co$_4$N nanowire | 1M KOH | CC | 0.82 | 257 | 44 | CA 75 mA·cm$^{-2}$ | 12 | Angew. Chem., 2015[21] |
| 18 | NiFe-LDH/CNT[d] | 1M KOH | GC | 0.2 | 264 | 31 | (GC) CP @10 mA·cm$^{-2}$ (NF) CP @20 mA·cm$^{-2}$ | 1 108 | JACS, 2013[22] |
| 19 | NiFe LDH/Fe Plate Corrosion Engineering | 1M KOH | Fe Plate | — | 269 | 48.3 | CP @1000 mA·cm$^{-2}$ | 5000 | Nat. Comm., 2018[23] |
| 20 | CoO hexagrams | 1M KOH | GC | 0.28 | 269 | 64.4 | (ITO) CP @10 mA·cm$^{-2}$ | 10 | Chem. Sci., 2018[24] |
| 21 | CoO—MoO$_2$ | 1M KOH | NF | — | 270 | 36.7 | CP @20 mA·cm$^{-2}$ | 10 | Nanoscale, 2015[25] |
| 22 | Fe$_7$S$_8$ nanosheets | 1M KOH | GC | 0.143 | 270 | 43 | CP @10 mA·cm$^{-2}$ | 25 | ACS Cent. Sci., 2017[26] |
| 23 | Ni$_{0.2}$Co$_{0.8}$Se | 1M KOH | CC | 0.2 | 280 | 86.8 | CA j = −17.44% | 10 | Nano-Micro Lett., 2019[27] |

TABLE 10-continued

OER Performance table from literature

| # | Catalyst | Electrolyte | Electrode[a] | Loading [mg·cm$^{-2}$] | $\eta$[b] [mV] | Tafel [mV·dec$^{-1}$] | Durability (Electrode) Test[c] | Time [hours] | Reference |
|---|---|---|---|---|---|---|---|---|---|
| 24 | S\|NiN$_x$ | 1M KOH | GF | 0.15 | 280 | 45 | CP @10 mA·cm$^{-2}$ | 10 | Nature Comm., 2019[28] |
| 25 | CoSe$_2$ UNM | 1M KOH | GC | 0.28 | 284 | 46.3 | CP @10 mA·cm$^{-2}$ | 20 | J. of Mat. Chem. A, 2019[29] |
| 26 | Ni$_2$P | 1M KOH | GC | 0.14 | 290 | 47 | CP @10 mA·cm$^{-2}$ | 10 | Ener. Env. Sci., 2015[30] |
| 27 | A-CoS$_{4.6}$O$_{0.6}$ | 1M KOH | GC | 0.8 | 290 | 67 | CP @10 mA·cm$^{-2}$ | 1.25 | Angew. Chem., 2017[31] |
| 28 | Co$_3$O$_4$C—NA | 0.1M KOH | Cu foil | 0.2 | 290 | 70 | CP @10 mA·cm$^{-2}$ | 30 | JACS, 2014[32] |
| 29 | NiCo$_2$O$_4$ | 1M NaOH | NF | 1 | 290 | 53 | CP @10 mA·cm$^{-2}$ | 32 | Angew. Chem, 2016[33] |
| 30 | a-Co$_4$Fe(OH)$_x$ | 1M KOH | GC | 0.28 | 295 | 52 | CA 10 mA·cm$^{-2}$ | 3 | JACS, 2017[34] |
| 31 | γ-CoOOH nanosheet | 1M KOH | GC | 0.15 | 300 | 38 | — | — | Science, 2017[35] |
| 32 | NiFe-nanosheet | 1M KOH | GC | 0.07 | 300 | 40 | — | — | JACS, 2005[36] |
| 33 | IrO$_2$ | 1M KOH | GC | 0.250 | 300 | 48 | — | — | Sus. Ener. & Fuels, 2017[37] |
| 34 | Ni$_{0.75}$V$_{0.25}$-LDH | 1M KOH | NF | 0.25 | 300 | 50 | CP @10 mA·cm$^{-2}$ | 25 | Nat. Comm., 2016[38] |
| 35 | FeCo—ONS | 0.1M KOH | GC | 0.36 | 308 | 36.8 | CA j = +11.2% | 2.8 | Adv. Mat., 2017[39] |
| 36 | CoO—MoO$_2$ | 1M KOH | GC | 0.5 | 312 | 70 | CP @10 mA·cm$^{-2}$ | 15 | Adv. Fun. Mat., 2017[40] |
| 37 | CoSn(OH)$_6$ | 1M KOH | GC | 0.094 | 313 | — | CA @313 mV | 11 | Ener. Env. Sci., 2016[41] |
| 38 | NiCo-r | 1M KOH | GC | 0.285 | 320 | 30 | CV 1000 cycles | — | Angew. Chem., 2015[42] |
| 39 | CoSe$_2$ nanosheet | 0.1M KOH | GC | 0.142 | 320 | 44 | CV 1000 cycles | — | JACS, 2014[43] |
| 40 | Fe$_3$O$_4$@Co$_9$S$_8$/rGO-2 | 1M KOH | GC | 0.25 | 320 | 54.5 | CA @320 mV j = −12% | 6 | Adv. Fun. Mat., 2016[44] |
| 41 | Ag—CoSe$_2$ nanobelts | 0.1M KOH | GC | 0.2 | 320 | 56 | CV 1000 cycles | — | Angew. Chem., 2017[45] |
| 42 | NiV-LDH | 1M KOH | GC | 0.143 | 320 | — | — | — | Nat. Comm., 2016[38] |
| 43 | CoMn LDH | 1M KOH | GC | 0.142 | 324 | 43 | CA @300 mV | 14 | JACS, 2014[46] |
| 44 | Co$_{0.85}$Se | 1M KOH | CC | 4.3 | 324 | 85 | — | — | Adv. Mat., 2015[12] |
| 45 | Fe—CoOOH/G | 1M KOH | GC | 0.2 | 330 | 37 | CP @10 mA·cm$^{-2}$ | 5.5 | Adv. Ener. Mat., 2017[47] |
| 46 | α-Ni(OH)$_2$ | 1M KOH | GC | 0.2 | 331 | 42 | CA @350 mV | 25 | JACS, 2014[48] |
| 47 | nNiFe LDH/NGF | 0.1M KOH | GC | 0.25 | 337 | 45 | CA @350 mV | 3.3 | Adv. Mat. 2015[49] |
| 48 | NiCo$_2$S$_4$ | 1M KOH | GC | 0.07 | 337 | 64 | CP @10 mA·cm$^{-2}$ | 30 | Green Chemistry, 2017[50] |
| 49 | Co$_3$O$_4$/NiCo$_2$O$_4$ | 1M KOH | NF | 1 | 340 | 88 | — | — | JACS, 2015[51] |
| 50 | CoSe | 1M KOH | CC | 0.2 | 345 | 89.3 | — | — | Nano-Micro Lett., 2019[27] |
| 51 | CoFe$_{35}$ LDH | 0.1M KOH | GC | 0.25 | 350 | 49 | (NF) CP @10 mA·cm$^{-2}$ | 48 | ChemSusChem, 2016[52] |
| 52 | CoTe$_2$ nanofleeces | 0.1M KOH | GC | 0.25 | 357 | 32 | CV 2000 cycles | — | Angew. Chem., 2017[53] |
| 53 | PrBa$_{0.5}$Sr$_{0.5}$Co$_{1.5}$Fe$_{0.5}$O$_5$ | 0.1M KOH | GC | 0.202 | 358 | 52 | CP @10 mA·cm$^{-2}$ | 12 | Nat. Comm., 2017[54] |
| 54 | a-CoVO$_x$/GC | 1M KOH | GC | 0.14 | 358 | 51 | — | — | ACS Catalysis, 2018[20] |
| 55 | Ni$_{0.5}$Co$_{0.5}$Se | 1M KOH | CC | 0.2 | 360 | 98 | — | — | Nano-Micro Lett., 2019[27] |
| 56 | Co$_3$S$_4$ nanosheets | 0.1M KOH | GC | 0.283 | 363 | 90 | CV 1000 cycles | — | ACS Nano, 2014[55] |
| 57 | NG-CoSe$_2$ | 0.1M KOH | GC | 0.2 | 366 | 40 | CV 2000 cycles η = +6% @10 mA·cm$^{-2}$ | — | ACS Nano, 2014[56] |
| 58 | NiCo LDH | 1M KOH | CP | 0.17 | 367 | 40 | CP @20 mA·cm$^{-2}$ | 6 | Nano Lett., 2015[57] |
| 59 | NiCo$_2$O$_4$ | 1M KOH | GC | 0.07 | 377 | 91 | — | — | Green Chemistry, 2017[50] |
| 60 | CoO/hi-Mn$_3$O$_4$ | 1M KOH | GC | — | 378 | 61 | CA @370 mV | 2.2 | Angew. Chem., 2017[58] |
| 61 | Ba$_{0.5}$Sr$_{0.5}$Co$_{0.8}$Fe$_{0.2}$O$_x$ | | RDE | 0.25 | 380 | 60 | — | — | Science, 2011[59] |
| 62 | α-Co(OH)$_2$ | 1M KOH | GC | 0.28 | 380 | 67 | CP @5 mA·cm$^{-2}$ | 7 | Dalton Trans., 2017[60] |
| 63 | CoS-βCo(OH)$_2$@aMoS$_{2+x}$ | 1M KOH | NF | 0.2 | 380 | 68 | CP @10 mA·cm$^{-2}$ | 28 | Adv. Fun. Mat., 2016[61] |
| 64 | NiSe | 1M KOH | CC | 0.2 | 390 | 225.6 | — | — | Nano-Micro Lett., 2019[27] |
| 65 | Co$_3$O$_4$ nanowire | 1M KOH | GC | 0.136 | 400 | 72 | CA @420 mV j = −31% | 1.7 | Adv. Ener. Mat., 2014[62] |
| 66 | Co$_9$S$_8$@MoS$_2$/CNFs | 1M KOH | GC | 0.212 | 430 | 61 | CV 1000 cycles | — | Adv. Mat., 2015[63] |

[a]GC: glassy carbon, CP: carbon paper, NF: nickel foam, CC: Carbon Cloth, GF: Graphite Foil
[b]Taken @10 mA·cm$^{-2}$
[c]CP chronopotentiometry, CA: chronoamperometry, CV: cyclic voltammetry
[d]η obtained using Tafel slope.

TABLE

Interatomic distance of Ni—O (Å) for OER mechanism intermediates for Ni—Se, Ni—Se$_{vac}$, Ni—Co—Se, and Ni—Co—Se$_{vac}$ surfaces with species reacting at Ni and Co sites.
Interatomic distance (Å)

| | | Structure | | | | | |
|---|---|---|---|---|---|---|---|
| | | Ni—O Ni—Se | Ni—O Ni—Se$_{vac}$ | Ni—O Ni—Co—Se (Ni Site) | Ni—O Ni—Co—Se (Co Site) | Ni—O Ni—Co—Se$_{vac}$ (Ni Site) | Ni—O Ni—Co—Se$_{vac}$ (Co Site) |
| NiSe (001) | H$_2$O | 4.323 | 2.169 | 4.039 | 5.247 | 2.265 | 4.120 |
| | OH | 3.486 | 2.179 | 3.653 | 4.994 | 2.265 | 3.810 |
| | O | 3.528 | 1.942 | 3.549 | 5.025 | 2.042 | 3.843 |

TABLE-continued

|  |  |  |  |  |  |  |  |
|---|---|---|---|---|---|---|---|
|  | OOH | 3.466 | 2.135 | 3.641 | 4.918 | 2.278 | 3.915 |
|  | $O_2$ | 4.953 | 2.148 | 4.933 | 5.878 | 2.794 | 3.859 |
| NiSe (101) | $H_2O$ | 3.727 | 3.525 | 3.5456 | 4.797 | 3.266* |  |
|  | OH | 3.355 | 1.969 | 1.947 | 3.422 | 1.912 |  |
|  | O | 3.299 | 1.970 | 1.909 | 3.394 | 1.797 |  |
|  | OOH | 3.291 | 1.995 | 1.936 | 3.599 | 1.910 |  |
|  | $O_2$ | 4.297 | 1.986 | 2.101 | 4.820 | 1.811 |  |

Interatomic distance of Se—O (Å) for OER mechanism intermediates for Ni—Se, Ni—Se$_{vac}$, Ni—Co—Se, and Ni—Co—Se$_{vac}$ surfaces with species reacting at Ni and Co sites.
Interatomic distance (Å)

|  |  | Structure | | | | | |
|---|---|---|---|---|---|---|---|
|  |  | Se—O Ni—Se | Se—O Ni—Se$_{vac}$ | Se—O Ni—Co—Se (Ni Site) | Se—O Ni—Co—Se (Co Site) | Se—O Ni—Co—Se$_{vac}$ (Ni Site) | Se—O Ni—Co—Se$_{vac}$ (Co Site) |
| NiSe (001) | $H_2O$ | 3.463 | 3.203 | 3.554 | 3.443 | 3.338 | 3.175 |
|  | OH | 1.871 | 2.926 | 1.878 | 1.874 | 2.879 | 2.752 |
|  | O | 1.684 | 2.788 | 1.684 | 1.687 | 2.804 | 2.884 |
|  | OOH | 1.943 | 2.892 | 1.948 | 1.943 | 2.890 | 2.785 |
|  | $O_2$ | 3.354 | 2.904 | 3.397 | 3.319 | 2.994 | 2.752 |
| NiSe (101) | $H_2O$ | 3.552 | 3.119 | 3.430 | 3.572 | 3.453* |  |
|  | OH | 1.926 | 2.338 | 2.753 | 1.937 | 3.031 |  |
|  | O | 1.702 | 1.799 | 1.804 | 1.694 | 3.048 |  |
|  | OOH | 2.057 | 1.876 | 2.664 | 2.056 | 2.869 |  |
|  | $O_2$ | 3.231 | 1.695 | 2.856 | 3.120 | 2.767 |  |

Interatomic distance of Co—O (Å) for OER mechanism intermediates for Ni—Co—Se, and Ni—Co—Se$_{vac}$ surfaces with species reacting at Ni and Co sites.
Interatomic distance (Å)

|  |  | Structure | | | |
|---|---|---|---|---|---|
|  |  | Co—O Ni—Co—Se (Ni Site) | Co—O Ni—Co—Se (Co Site) | Co—O Ni—Co—Se$_{vac}$ (Ni Site) | Co—O Ni—Co—Se$_{vac}$ (Co Site) |
| NiSe (001) | $H_2O$ | 5.479 | 4.089 | 3.077 | 2.107 |
|  | OH | 3.432 | 3.475 | 2.082 | 2.129 |
|  | O | 3.493 | 3.522 | 1.878 | 1.726 |
|  | OOH | 3.557 | 3.485 | 2.009 | 2.093 |
|  | $O_2$ | 4.849 | 4.866 | 1.889 | 2.034 |
| NiSe (101) | $H_2O$ | 4.483 | 3.964 | 3.898* |  |
|  | OH | 3.498 | 3.594 | 1.933 |  |
|  | O | 3.659 | 3.512 | 1.735 |  |
|  | OOH | 3.851 | 3.583 | 1.915 |  |
|  | $O_2$ | 3.720 | 4.340 | 1.736 |  |

*The distinction between a Ni and a Co site is lost on the Ni—Co—Se$_{vac}$ (101) surface due to the adsorbed oxygen species filling the Se vacancy and bridging a surface Co and Ni atom.

The following references are hereby incorporated herein by reference in their entirety:

1. S. Ghobrial, D. W. Kirk and S. J. Thorpe, Amorphous Ni—Nb—Y Alloys as Hydrogen Evolution Electrocatalysts, *Electrocatalysis*, 2019, 10, 243-252.
2. B. Zhang, X. Zheng, O. Voznyy, R. Comin, M. Bajdich, F. P. G. De Arquer, C. T. Dinh, F. Fan, M. Yuan, A. Janmohamed, H. L. Xin and H. Yang, Homogeneously dispersed, multimetal oxygen-evolving catalysts, *Science*, 2016, 352, 333-338.
3. G. Li, L. Anderson, Y. Chen, M. Pan and P.-Y. Abel Chuang, New insights into evaluating catalyst activity and stability for oxygen evolution reactions in alkaline media, *Sustain. Energy Fuels*, 2018, 2, 237-251.
4. H. Zhang, J. Zheng, Y. Chao, K. Zhang and Z. Zhu, Surface engineering of FeCo-based electrocatalysts non-noble metals for water oxidation †, 2018, 7254-7261.
5. B. Ravel and M. Newville, ATHENA, ARTEMIS, HEPHAESTUS: Data analysis for X-ray absorption spectroscopy using IFEFFIT, *J. Synchrotron Radiat.*, 2005, 12, 537-541.
6. F. Yu, H. Zhou, Y. Huang, J. Sun, F. Qin, J. Bao, W. A. Goddard, S. Chen and Z. Ren, High-performance bifunctional porous non-noble metal phosphide catalyst for overall water splitting, *Nat. Commun.*, 2018, 9, 1-9.
7. H. Zhou, F. Yu, Q. Zhu, J. Sun, F. Qin, L. Yu, J. Bao, Y. Yu, S. Chen and Z. Ren, Water splitting by electrolysis at high current densities under 1.6 volts, *Energy Environ. Sci.*, 2018, 11, 2858-2864.
8. P. Zhang, L. Li, D. Nordlund, H. Chen, L. Fan, B. Zhang, X. Sheng, Q. Daniel and L. Sun, Dendritic core-shell nickel-iron-copper metal/metal oxide electrode for efficient electrocatalytic water oxidation, *Nat. Commun.*, 2018, 9, 1-10.
9. W. Zhou, X. J. Wu, X. Cao, X. Huang, C. Tan, J. Tian, H. Liu, J. Wang and H. Zhang, Ni3S2 nanorods/Ni foam composite electrode with low overpotential for electrocatalytic oxygen evolution, *Energy Environ. Sci.*, 2013, 6, 2921-2924.
10. D. Wu, Y. Wei, X. Ren, X. Ji, Y. Liu, X. Guo, Z. Liu, A. M. Asiri, Q. Wei and X. Sun, Co(OH)2 Nanoparticle-Encapsulating Conductive Nanowires Array:

Room-Temperature Electrochemical Preparation for High-Performance Water Oxidation Electrocatalysis, *Adv. Mater.,* 2018, 30, 1-7.

11 X. Lu and C. Zhao, Electrodeposition of hierarchically structured three-dimensional nickel-iron electrodes for efficient oxygen evolution at high current densities, *Nat. Communications,* 2015, 122, 128-136.

12 C. Xia, Q. Jiang, C. Zhao, M. N. Hedhili and H. N. Alshareef, Selenide-Based Electrocatalysts and Scaffolds for Water Oxidation Applications, *Adv. Mater.,* 2016, 28, 77-85.

13 B. Zhang, B. Zhang, X. Zheng, O. Voznyy, R. Comin, M. Bajdich, M. Garcia-melchor, L. Han, J. Xu, M. Liu, L. Zheng, F. P. G. De Arquer, C. T. Dinh, F. Fan, M. Yuan, E. Yassitepe, N. Chen, T. Regier, P. Liu, Y. Li, P. De Luna, H. L. Xin, H. Yang, A. Vojvodic and E. H. Sargent, Homogeneously dispersed, multimetal oxygen-evolving catalysts, *Science (80-.).* 2016, 352, 333.

14 T. Liu, A. M. Asiri and X. Sun, Electrodeposited Co-doped NiSe2 nanoparticles film: A good electrocatalyst for efficient water splitting, *Nanoscale,* 2016, 8, 3911-3915.

15 Z. Wang, J. Li, X. Tian, X. Wang, Y. Yu, K. A. Owusu, L. He and L. Mai, Porous Nickel-Iron Selenide Nanosheets as Highly Efficient Electrocatalysts for Oxygen Evolution Reaction, *ACS Appl. Mater. Interfaces,* 2016, 8, 19386-19392.

16 J. X. Feng, H. Xu, Y. T. Dong, S. H. Ye, Y. X. Tong and G. R. Li, FeOOH/Co/FeOOH Hybrid Nanotube Arrays as High-Performance Electrocatalysts for the Oxygen Evolution Reaction, *Angew. Chemie—Int. Ed.,* 2016, 55, 3694-3698.

17 Z. Wang, H. Liu, R. Ge, X. Ren, J. Ren, D. Yang, L. Zhang and X. Sun, Phosphorus-Doped Co3O4 Nanowire Array: A Highly Efficient Bifunctional Electrocatalyst for Overall Water Splitting, *ACS Catal.,* 2018, 8, 2236-2241.

18 C. Tang, N. Cheng, Z. Pu, W. Xing and X. Sun, NiSe Nanowire Film Supported on Nickel Foam: An Efficient and Stable 3D Bifunctional Electrode for Full Water Splitting, *Angew. Chemie—Int. Ed.,* 2015, 54, 9351-9355.

19 J. Ping, Y. Wang, Q. Lu, B. Chen, J. Chen, Y. Huang, Q. Ma, C. Tan, J. Yang, X. Cao, Z. Wang, J. Wu, Y. Ying and H. Zhang, Self-Assembly of Single-Layer CoAl-Layered Double Hydroxide Nanosheets on 3D Graphene Network Used as Highly Efficient Electrocatalyst for Oxygen Evolution Reaction, *Adv. Mater.,* 2016, 28, 7640-7645.

20 L. Liardet and X. Hu, Amorphous Cobalt Vanadium Oxide as a Highly Active Electrocatalyst for Oxygen Evolution, *ACS Catal.,* 2018, 8, 644-650.

21 P. Chen, K. Xu, Z. Fang, Y. Tong, J. Wu, X. Lu, X. Peng, H. Ding, C. Wu and Y. Xie, Metallic Co4N porous nanowire arrays activated by surface oxidation as electrocatalysts for the oxygen evolution reaction, *Angew. Chemie—Int. Ed.,* 2015, 54, 14710-14714.

22 M. Gong, Y. Li, H. Wang, Y. Liang, J. Z. Wu, J. Zhou, J. Wang, T. Regier, F. Wei and H. Dai, An advanced Ni—Fe layered double hydroxide electrocatalyst for water oxidation, *J. Am. Chem. Soc.,* 2013.135, 8452-8455.

23 Y. Liu, X. Liang, L. Gu, Y. Zhang, G. D. Li, X. Zou and J. S. Chen, Corrosion engineering towards efficient oxygen evolution electrodes with stable catalytic activity for over 6000 hours, *Nat. Commun.,* 2018, 9, 1-10.

24 Z. Liang, Z. Huang, H. Yuan, Z. Yang, C. Zhang, Y. Xu, W. Zhang, H. Zheng and R. Cao, Quasi-single-crystalline CoO hexagrams with abundant defects for highly efficient electrocatalytic water oxidation, *Chem. Sci.,* 2018, 9, 6961-6968.

25 B. B. Li, Y. Q. Liang, X. J. Yang, Z. D. Cui, S. Z. Qiao, S. L. Zhu, Z. Y. Li and K. Yin, MoO2-CoO coupled with a macroporous carbon hybrid electrocatalyst for highly efficient oxygen evolution, *Nanoscale,* 2015, 7, 16704-16714.

26 S. Chen, Z. Kang, X. Zhang, J. Xie, H. Wang, W. Shao, X. Zheng, W. Yan, B. Pan and Y. Xie, Highly Active Fe Sites in Ultrathin Pyrrhotite Fe7S8 Nanosheets Realizing Efficient Electrocatalytic Oxygen Evolution, *ACS Cent. Sci.,* 2017, 3, 1221-1227.

27 Z. Qian, Y. Chen, Z. Tang, Z. Liu, X. Wang, Y. Tian and W. Gao, Hollow Nanocages of NixCo1-xSe for Efficient Zinc-Air Batteries and Overall Water Splitting, *Nano-Micro Lett.,* DOI:10.1007/s40820-019-0258-0.

28 Y. Hou, M. Qiu, M. G. Kim, P. Liu, G. Nam, T. Zhang, X. Zhuang, B. Yang, J. Cho, M. Chen, C. Yuan, L. Lei and X. Feng, Atomically dispersed nickel-nitrogen-sulfur species anchored on porous carbon nanosheets for efficient water oxidation, *Nat. Commun.,* 2019, 10, 1-9.

29 Y. Zhang, C. Zhang, Y. Guo, D. Liu, Y. Yu and B. Zhang, Selenium vacancy-rich CoSe2 ultrathin nanomeshes with abundant active sites for electrocatalytic oxygen evolution, 2019, 2536-2540.

30 L. A. Stem, L. Feng, F. Song and X. Hu, Ni2P as a Janus catalyst for water splitting: The oxygen evolution activity of Ni2P nanoparticles, *Energy Environ. Sci.,* 2015, 8, 2347-2351.

31 P. Cai, J. Huang, J. Chen and Z. Wen, Oxygen-Containing Amorphous Cobalt Sulfide Porous Nanocubes as High-Activity Electrocatalysts for the Oxygen Evolution Reaction in an Alkaline/Neutral Medium, *Angew. Chemie—Int. Ed.,* 2017, 56, 4858-4861.

32 T. Y. Ma, S. Dai, M. Jaroniec and S. Z. Qiao, Metal-organic framework derived hybrid Co3O4-carbon porous nanowire arrays as reversible oxygen evolution electrodes, *J. Am. Chem. Soc.,* 2014, 136, 13925-13931.

33 X. Gao, H. Zhang, Q. Li, X. Yu, Z. Hong, X. Zhang, C. Liang and Z. Lin, Hierarchical NiCo2O4 hollow microcuboids as bifunctional electrocatalysts for overall water-splitting, *Angew. Chemie—Int. Ed.,* 2016, 55, 6290-6294.

34 H. Jin, S. Mao, G. Zhan, F. Xu, X. Bao and Y. Wang, Fe incorporated α-Co(OH)$_2$ nanosheets with remarkably improved activity towards the oxygen evolution reaction, *J. Mater. Chem. A,* 2017, 5, 1078-1084.

35 Z. W. Seh, J. Kibsgaard, C. F. Dickens, I. Chorkendorff, J. K. Nerskov and T. F. Jaramillo, Combining theory and experiment in electrocatalysis: Insights into materials design, *Science (80-.).* 2017, 355, 4998.

36 Z. Liu, R. Ma, M. Osada, K. Takada and T. Sasaki, Selective and controlled synthesis of α- and β-cobalt hydroxides in highly developed hexagonal platelets, *J. Am. Chem. Soc.,* 2005, 127.13869-13874.

37 G. Li, L. Anderson and Y. Chen, New insights into evaluating catalyst activity and stability for oxygen evolution reactions in alkaline media †, *Sustain. Energy Fuels,* 2017, 2, 237-251.

38 K. Fan, H. Chen, Y. Ji, H. Huang, P. M. Claesson, Q. Daniel, B. Philippe, H. Rensmo, F. Li, Y. Luo and L.

Sun, Nickel-vanadium monolayer double hydroxide for efficient electrochemical water oxidation, *Nat. Commun.*, 2016, 7, 1-9.
39 L. Zhuang, L. Ge, Y. Yang, M. Li, Y. Jia, X. Yao and Z. Zhu, Ultrathin Iron-Cobalt Oxide Nanosheets with Abundant Oxygen Vacancies for the Oxygen Evolution Reaction, *Adv. Mater.*, DOI:10.1002/adma.201606793.
40 F. Lyu, Y. Bai, Z. Li, W. Xu, Q. Wang, J. Mao, L. Wang, X. Zhang and Y. Yin, Self-Templated Fabrication of CoO—MoO2 Nanocages for Enhanced Oxygen Evolution, *Adv. Funct. Mater.*, 2017, 27, 2-9.
41 F. Song, K. Schenk and X. Hu, A nanoporous oxygen evolution catalyst synthesized by selective electrochemical etching of perovskite hydroxide CoSn(OH)6 nanocubes, *Energy Environ. Sci.*, 2016, 9, 473-477.
42 J. Bao, X. Zhang, B. Fan, J. Zhang, M. Zhou, W. Yang, X. Hu, H. Wang, B. Pan and Y. Xie, Ultrathin Spinel-Structured Nanosheets Rich in Oxygen Deficiencies for Enhanced Electrocatalytic Water Oxidation, *Angew. Chemie—Int. Ed.*, 2015, 54, 7399-7404.
43 Y. Liu, H. Cheng, M. Lyu, S. Fan, Q. Liu, W. Zhang, Y. Zhi, C. Wang, C. Xiao, S. Wei, B. Ye and Y. Xie, Low overpotential in vacancy-rich ultrathin CoSe2 nanosheets for water oxidation, *J. Am. Chem. Soc.*, 2014, 136, 15670-15675.
44 J. Yang, G. Zhu, Y. Liu, J. Xia, Z. Ji, X. Shen and S. Wu, $Fe_3O_4$-Decorated Co9S8 Nanoparticles In Situ Grown on Reduced Graphene Oxide: A New and Efficient Electrocatalyst for Oxygen Evolution Reaction, *Adv. Funct. Mater.*, 2016, 26, 4712-4721.
45 X. Zhao, H. Zhang, Y. Yan, J. Cao, X. Li, S. Zhou, Z. Peng and J. Zeng, Engineering the Electrical Conductivity of Lamellar Silver-Doped Cobalt(II) Selenide Nanobelts for Enhanced Oxygen Evolution, *Angew. Chemie—Int. Ed.*, 2017, 56, 328-332.
46 F. Song and X. Hu, Ultrathin cobalt-manganese layered double hydroxide is an efficient oxygen evolution catalyst, *J. Am. Chem. Soc.*, 2014, 136, 16481-16484.
47 X. Han, C. Yu, S. Zhou, C. Zhao, H. Huang, J. Yang, Z. Liu, J. Zhao and J. Qiu, Ultrasensitive Iron-Triggered Nanosized Fe—CoOOH Integrated with Graphene for Highly Efficient Oxygen Evolution, *Adv. Energy Mater.* DOI:10.1002/aenm.201602148.
48 M. Gao, W. Sheng, Z. Zhuang, Q. Fang, S. Gu, J. Jiang and Y. Yan, Efficient water oxidation using nanostructured α-nickel-hydroxide as an electrocatalyst, *J. Am. Chem. Soc.*, 2014, 136, 7077-7084.
49 C. Tang, H. Sen Wang, H. F. Wang, Q. Zhang, G. L. Tian, J. Q. Nie and F. Wei, Spatially Confined Hybridization of Nanometer-Sized NiFe Hydroxides into Nitrogen-Doped Graphene Frameworks Leading to Superior Oxygen Evolution Reactivity, *Adv. Mater.*, 2015, 27, 4516-4522.
50 J. Jiang, C. Yan, X. Zhao, H. Luo, Z. Xue and T. Mu, A PEGylated deep eutectic solvent for controllable solvothermal synthesis of porous NiCo2S4 for efficient oxygen evolution reaction, *Green Chem.*, 2017, 19, 3023-3031.
51 H. Hu, B. Guan, B. Xia and X. W. Lou, Designed formation of Co3O4/NiCo2O4 double-shelled nanocages with enhanced pseudocapacitive and electrocatalytic properties, *J. Am. Chem. Soc.*, 2015, 137, 5590-5595.
52 F. Yang, K. Sliozberg, I. Sinev, H. Antoni, A. Bahr, K. Ollegott, W. Xia, J. Masa, W. Grünert, B. R. Cuenya, W. Schuhmann and M. Muhler, Synergistic Effect of Cobalt and Iron in Layered Double Hydroxide Catalysts for the Oxygen Evolution Reaction, *ChemSusChem*, 2017, 10, 156-165.
53 Q. Gao, C. Q. Huang, Y. M. Ju, M. R. Gao, J. W. Liu, D. An, C. H. Cui, Y. R. Zheng, W. X. Li and S. H. Yu, Phase-Selective Syntheses of Cobalt Telluride Nanofleeces for Efficient Oxygen Evolution Catalysts, *Angew. Chemie—Int. Ed.*, 2017, 56, 7769-7773.
54 B. Zhao, L. Zhang, D. Zhen, S. Yoo, Y. Ding, D. Chen, Y. Chen, Q. Zhang, B. Doyle, X. Xiong and M. Liu, A tailored double perovskite nanofiber catalyst enables ultrafast oxygen evolution, *Nat. Commun.*, 2017, 8, 1-9.
55 W. Zhao, C. Zhang, F. Geng, S. Zhuo and B. Zhang, Nanoporous hollow transition metal chalcogenide nanosheets synthesized via the anion-exchange reaction of metal hydroxides with chalcogenide ions, *ACS Nano*, 2014, 8, 10909-10919.
56 M. R. Gao, X. Cao, Q. Gao, Y. F. Xu, Y. R. Zheng, J. Jiang and S. H. Yu, Nitrogen-doped graphene supported CoSe2 nanobelt composite catalyst for efficient water oxidation, *ACS Nano*, 2014, 8, 3970-3978.
57 H. Liang, F. Meng, M. Cabin-Acevedo, L. Li, A. Forticaux, L. Xiu, Z. Wang and S. Jin, Hydrothermal continuous flow synthesis and exfoliation of NiCo layered double hydroxide nanosheets for enhanced oxygen evolution catalysis, *Nano Lett.*, 2015, 15, 1421-1427.
58 C. Guo, Y. Zheng, J. Ran, F. Xie, M. Jaroniec and S. Z. Qiao, Engineering High-Energy Interfacial Structures for High-Performance Oxygen-Involving Electrocatalysis, *Angew. Chemie—Int. Ed.*, 2017, 56, 8539-8543.
59 J. Suntivich, K. J. May, H. a Gasteiger, J. B. Goodenough and Y. Shao-horn, A Perovskite Oxide Optimized for Molecular Orbital Principles, *Science (80-.).* 2011, 334, 2010-2012.
60 F. Lyu, Y. Bai, Q. Wang, L. Wang, X. Zhang and Y. Yin, Phase-controllable synthesis of cobalt hydroxide for electrocatalytic oxygen evolution, *Dalt. Trans.*, 2017, 46, 10545-10548.
61 T. Yoon and K. S. Kim, One-Step Synthesis of CoS-Doped β-Co(OH)2@Amorphous MoS2+x Hybrid Catalyst Grown on Nickel Foam for High-Performance Electrochemical Overall Water Splitting, *Adv. Funct. Mater.*, 2016, 26, 7386-7393.
62 Y. Wang, T. Zhou, K. Jiang, P. Da, Z. Peng, J. Tang, B. Kong, W. Bin Cai, Z. Yang and G. Zheng, Reduced mesoporous Co3O4 nanowires as efficient water oxidation electrocatalysts and supercapacitor electrodes, *Adv. Energy Mater.*, 2014, 4, 1-7.
63 H. Zhu, J. Zhang, R. Yanzhang, M. Du, Q. Wang, G. Gao, J. Wu, G. Wu, M. Zhang, B. Liu, J. Yao and X. Zhang, When Cubic Cobalt Sulfide Meets Layered Molybdenum Disulfide: A Core-Shell System Toward Synergetic Electrocatalytic Water Splitting, *Adv. Mater.*, 2015, 27, 4752-4759.

The invention claimed is:
1. A process for producing a nanochalcogenide for use in electrocatalysis, comprising:
 subjecting at least two transition metals and at least one chalcogen to cryogenic milling to produce an alloyed chalcogenide material;
 subjecting the alloyed chalcogenide material to surfactant-assisted milling to produce a slurry comprising a nanochalcogenide; and separating the nanochalcogenide from the slurry,
wherein the surfactant-assisted milling comprises surfactant-assisted ball milling performed in the presence of at least one surfactant and a solvent; and
wherein the solvent comprises an alcohol and the least one surfactant comprises diphenylphosphoryl acid (DPPA), or oleic acid, or CTAB surfactant.

2. The process of claim 1, wherein the cryogenic milling comprises cryogenic ball milling.

3. The process of claim 2, wherein the cryogenic milling comprises linear vibrational milling performed at speeds of 25 Hz to 35 Hz.

4. The process of claim 2, wherein the cryogenic ball milling is performed at a ball-to-powder ratio (BPR) of 8:1 to 12:1 on a mass basis.

5. The process of claim 1, wherein the alloyed chalcogenide material produced by cryogenic milling comprises particles having an average size above 1000 nm, measured using DLS or SEM.

6. The process of claim 1, wherein the alloyed chalcogenide material produced by cryogenic milling comprises $M^1M^2E$ and/or $(M^1M^2)_3E_4$, wherein $M^1$ is a first transition metal, $M^2$ is a second transition metal and E is a chalcogen, and is a single phase.

7. The process of claim 1, wherein the least one surfactant is present in an amount of 1:3 to 1:5 surfactant-to-powder ratio on a mass basis with respect to the mass of the alloyed chalcogenide material.

8. The process of claim 1, wherein the surfactant-assisted milling is performed at a ball-to-powder ratio (BPR) of 30:1 to 70:1 on a mass basis.

9. The process of claim 1, wherein the surfactant-assisted milling is performed to produce the nanochalcogenide in the form of chalcogenide nanoparticles.

10. The process of claim 9, wherein the surfactant-assisted milling produces the slurry comprising the chalcogenide nanoparticles and a milling liquid, and the separating comprises centrifuging, and wherein the chalcogenide nanoparticles separated by centrifuging have an average size smaller than 100 nm, measured using DLS or SEM.

11. The process of claim 10, wherein the centrifuging comprises a first centrifuging stage to remove larger particles followed by a second centrifuging stage to remove at least a portion of the chalcogenide nanoparticles.

12. The process of claim 1, further comprising sonicating the slurry prior to the separating.

13. The process of claim 1, wherein the at least two transition metals are selected from Ni, Co, and Fe.

14. The process of claim 1, wherein the at least two transition metals are Ni and Co.

15. The process of claim 14, wherein the at least one chalcogen is Se.

16. The process of claim 1, further comprising activating the separated nanochalcogenide to produce an activated electrocatalyst, wherein the activating comprises:
selectively etching the at least one chalcogen out of the nanochalcogenide, leaching the at least one chalcogen out of the nanochalcogenide, or transforming the at least two transition metals into active oxyhydroxides thereof.

17. The process of claim 1, wherein the at least two transition metals and the at least one chalcogen are atomically dispersed in the nanochalcogenide, and wherein the nanochalcogenide has an average particle size less than 100 nm, measured using DLS or SEM, and wherein the at least two transition metals comprise Ni and Co, and the chalcogen comprises Se.

18. The process of claim 1, wherein the at least one chalcogen comprises Se.

19. The process of claim 18, wherein the at least two transition metals comprise Ni and Co.

20. A process for producing a nanochalcogenide for use in electrocatalysis, comprising:
subjecting at least two transition metals and at least one chalcogen to a first milling stage to produce an alloyed chalcogenide material having an average particle size above 1 micrometer and a disordered structure including amorphous and nanocrystalline structures;
subjecting the alloyed chalcogenide material to a second milling stage to produce a slurry comprising nanochalcogenides having a particle size below 100 nm, measured using DLS or SEM; and
separating the nanochalcogenides from the slurry,
wherein:
the second milling stage comprises surfactant-assisted milling that comprises surfactant-assisted ball milling performed in the presence of at least one surfactant and a solvent; and the solvent comprises an alcohol and the least one surfactant comprises diphenylphosphoryl acid (DPPA), or oleic acid, or CTAB surfactant;
the second milling stage comprises surfactant-assisted milling that comprises surfactant-assisted ball milling performed in the presence of at least one surfactant and a solvent; and wherein the surfactant-assisted milling is performed at a ball-to-powder ratio (BPR) of 30:1 to 70:1 on a mass basis; or
the first milling stage comprises cryogenic ball milling and wherein: the cryogenic ball milling comprises linear vibrational milling performed at speeds of 25 Hz to 35 Hz, or the cryogenic ball milling is performed at a ball-to-powder ratio (BPR) of 8:1 to 12:1 on a mass basis.

21. A process for producing a nanochalcogenide for use in electrocatalysis, comprising:
subjecting at least two transition metals and at least one chalcogen to cryogenic milling to produce an alloyed chalcogenide material;
subjecting the alloyed chalcogenide material to surfactant-assisted milling to produce a slurry comprising a nanochalcogenide; and
separating the nanochalcogenide from the slurry;
wherein the surfactant-assisted milling comprises surfactant-assisted ball milling performed in the presence of at least one surfactant and a solvent; and wherein the surfactant-assisted milling is performed at a ball-to-powder ratio (BPR) of 30:1 to 70:1 on a mass basis.

22. A process for producing a nanochalcogenide for use in electrocatalysis, comprising:
subjecting at least two transition metals and at least one chalcogen to cryogenic milling to produce an alloyed chalcogenide material;
subjecting the alloyed chalcogenide material to surfactant-assisted milling to produce a slurry comprising a nanochalcogenide; and
separating the nanochalcogenide from the slurry;
wherein the cryogenic milling comprises cryogenic ball milling; and
wherein:
the cryogenic milling comprises linear vibrational milling performed at speeds of 25 Hz to 35 Hz; or
the cryogenic ball milling is performed at a ball-to-powder ratio (BPR) of 8:1 to 12:1 on a mass basis.

* * * * *